US009600005B2

(12) United States Patent
Hayashi et al.

(10) Patent No.: US 9,600,005 B2
(45) Date of Patent: Mar. 21, 2017

(54) SEMICONDUCTOR INTEGRATED CIRCUIT AND METHOD FOR OPERATING THE SAME FOR A STABILIZING POWER SUPPLY

(71) Applicant: Renesas Electronics Corporation, Kawasaki-shi (JP)

(72) Inventors: Kentaro Hayashi, Kawasaki (JP); Yutaka Hayashi, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 134 days.

(21) Appl. No.: 14/593,912

(22) Filed: Jan. 9, 2015

(65) Prior Publication Data
US 2015/0205314 A1 Jul. 23, 2015

(30) Foreign Application Priority Data
Jan. 17, 2014 (JP) .................................. 2014-006361

(51) Int. Cl.
*G05F 1/567* (2006.01)
*H02M 1/14* (2006.01)
(Continued)

(52) U.S. Cl.
CPC ............... *G05F 1/567* (2013.01); *G05F 1/56* (2013.01); *H02M 3/156* (2013.01); *H02M 1/14* (2013.01); *H02M 2001/0025* (2013.01)

(58) Field of Classification Search
CPC G05F 1/465; G05F 1/567; H02M 2001/0025; H02M 1/14; H02M 2001/327; H02M 3/156; H02M 3/158; H02M 3/1588
See application file for complete search history.

(56) References Cited

U.S. PATENT DOCUMENTS

| 6,163,143 A | * | 12/2000 | Shimamori | H02M 3/157 323/284 |
| 2002/0057125 A1 | * | 5/2002 | Demizu | H02M 3/156 327/538 |

(Continued)

FOREIGN PATENT DOCUMENTS

| JP | 2000-284843 A | 10/2000 |
| JP | 2002-044938 A | 2/2002 |

(Continued)

OTHER PUBLICATIONS

Machine translation of JP 2002-136123A, orig. published May 10, 2002. Obtained frrom https://dossier1.j- platpat.inpit.go.jp/tri/all/odse/ODSE_GM101_Top.action on Jul. 18, 2016.*

(Continued)

*Primary Examiner* — Fred E Finch, III
(74) *Attorney, Agent, or Firm* — McGinn IP Law Group, PLLC

(57) ABSTRACT

A semiconductor integrated circuit that is used for a stabilizing power supply circuit which supplies an output power supply voltage to a parallel connection of a smoothing capacitor and a load, from an input power supply voltage, includes an error amplifier that detects an error of the output power supply voltage, an output control circuit that is connected between the input terminal and the output terminal, a phase compensation circuit that is connected to the error amplifier, and a detection control circuit that is connected to the phase compensation circuit.

20 Claims, 17 Drawing Sheets

(51) Int. Cl.
*H02M 3/156* (2006.01)
*G05F 1/56* (2006.01)
*H02M 1/00* (2006.01)

(56) References Cited

U.S. PATENT DOCUMENTS

| | | | |
|---|---|---|---|
| 2007/0120545 A1 | 5/2007 | Hata et al. | |
| 2009/0066300 A1* | 3/2009 | Lotfi | H01F 17/0033 323/247 |
| 2009/0284235 A1 | 11/2009 | Weng et al. | |
| 2010/0117615 A1* | 5/2010 | Prodic | H02M 3/157 323/283 |
| 2010/0134081 A1 | 6/2010 | Oki | |
| 2012/0229114 A1* | 9/2012 | Yang | H02M 3/1584 323/299 |
| 2013/0076322 A1* | 3/2013 | Tateno | H02M 1/38 323/271 |
| 2013/0187619 A1* | 7/2013 | Dunipace | H02M 3/156 323/225 |
| 2014/0002042 A1* | 1/2014 | Wismar | H02M 3/157 323/282 |
| 2014/0077780 A1* | 3/2014 | Teong | G05F 1/46 323/282 |
| 2015/0048877 A1* | 2/2015 | Shen | H02M 5/04 327/513 |

FOREIGN PATENT DOCUMENTS

| | | |
|---|---|---|
| JP | 2002-136123 A | 5/2002 |
| JP | 2007-151246 A | 6/2007 |

OTHER PUBLICATIONS

Machine translation of JP 2002-044938A, orig. published Feb. 8, 2002. Obtained from https://dossier1.j-platpat.inpit.go.jp/tri/all/odse/ODSE_GM101_Top.action on Jul. 18, 2016.*
'Application to smoothing capacitor of switching power supply' pp. 65-69. http://itonet.co.jp/DataSheets/Sanyo Electrie/OS-CON/pld/65.pdf [accessed on Nov. 7, 2013].
'Application note surface mounted chopper type switching regulator IC SI-8000JD series' pp. 1-29, Sanken Electric Co., Ltd., 2010, 01 http://www.semicon.sanken-ele.co.jp/sk_content/si-80xxjdseries_an_jp.pdf [accessed on Nov. 7, 2013].
'Notes on use of operational amplifier with small phase and gain margin' pp. 1-8, http://tij.co.jp/jp/lit/an/jaja130/jaja130.pdf [accessed on Nov. 7, 2013].
Extended European Search Report dated Jun. 3, 2015.

* cited by examiner

| Cnt1 | 0 | 1 | 2 | 3 |
|---|---|---|---|---|
| Cnt11 | Off | On | On | On |
| Cnt12 | Off | Off | On | On |
| Cnt13 | Off | Off | Off | On |
| VC1 | C10 | C10 +C11 | C10 +C11 +C12 | C10 +C11 +C12 +C13 |

| TEMPERATURE [°C] | <−25 | −25 ~ 0 | 0 ~ 20 | 20 < |
|---|---|---|---|---|
| VFs[V] | >7.5 | 7.5 ~ 7.0 | 7.0 ~ 6.6 | 6.6 > |
| Cnt1 | 0 | 1 | 2 | 3 |
| Cnt11 | Off | On | On | On |
| Cnt12 | Off | Off | On | On |
| Cnt13 | Off | Off | Off | On |
| VC1 | C10 | C10 +C11 | C10 +C11 +C12 | C10 +C11 +C12 +C13 |

| Cnt1  | 3   | 2   | 1   | 0   |
|-------|-----|-----|-----|-----|
| Cnt11 | On  | Off | Off | Off |
| Cnt12 | On  | On  | Off | Off |
| Cnt13 | On  | On  | On  | Off |
| VC1   | C10 | $\dfrac{1}{\dfrac{1}{C10}+\dfrac{1}{C11}}$ | $\dfrac{1}{\dfrac{1}{C10}+\dfrac{1}{C11}+\dfrac{1}{C12}}$ | $\dfrac{1}{\dfrac{1}{C10}+\dfrac{1}{C11}+\dfrac{1}{C12}+\dfrac{1}{C13}}$ |

| Cnt1 | 0 | 1 | 2 | 3 | 4 | 5 | 6 | 7 |
|---|---|---|---|---|---|---|---|---|
| Cnt11 | Off | On | Off | On | Off | On | Off | On |
| Cnt12 | Off | Off | On | On | Off | Off | On | On |
| Cnt13 | Off | Off | Off | Off | On | On | On | On |
| VC1 | C10 | C10 +1c | C10 +2c | C10 +3c | C10 +4c | C10 +5c | C10 +6c | C10 +7c |

| Cnt1 | 0 | 1 | 2 | 3 |
|---|---|---|---|---|
| /Cnt11 | On | Off | Off | Off |
| /Cnt12 | On | On | Off | Off |
| /Cnt13 | On | On | On | Off |
| VR4 | R30 | R30+R31 | R30+R31+R32 | R30+R31+R32+R33 |

SEMICONDUCTOR INTEGRATED CIRCUIT AND METHOD FOR OPERATING THE SAME FOR A STABILIZING POWER SUPPLY

CROSS-REFERENCE TO RELATED APPLICATIONS

The Present application claims priority from Japanese application JP 2014-006361 filed on Jan. 17, 2014, the content of which is hereby incorporated by reference into this application.

BACKGROUND

The present invention relates to a semiconductor integrated circuit which is used for a stabilizing power supply and a method for operating the same, and particularly, to a technology that is effective to reduce an increase of the number of external components, in a case that instability or abnormal oscillation of a stabilizing power supply due to an increase of an equivalent series resistance (ESR) of an electrolytic capacitor at the time of low temperature is prevented.

As well known, stabilized power supplies include a series regulator and a switching regulator.

The series regulator has an output control circuit which is connected in series between an input voltage and a load, and a voltage drop of the output control circuit is controlled by an error amplifier. The error amplifier compares a fractional voltage of the output voltage of the load with a reference voltage, controls the output control circuit in such a manner that the fractional voltage of the output voltage of the load is equal to the reference voltage, and thus, the output voltage of the load is stabilized. The series regulator is described in, for example, JP-A-2000-284843.

Switching regulators are divided into a type having a voltage step-down function and a type having a voltage boosting function. A switching regulator having a voltage step-down function is configured by a switching circuit having a first switching element and a second switching element, a low pass filter having a smoothing coil and a smoothing capacitor, an error amplifier, and a switching control circuit. An input voltage can be supplied to an end of the smoothing coil via the first switching element, a ground voltage can be supplied to an end of the smoothing coil via the second switching element, and the other end of the smoothing coil is connected to the ground voltage via a parallel connection of the smoothing capacitor and the load. During an ON period when the first switching element is controlled to have an ON state and the second switching element is controlled to have an OFF state by the switching control circuit, a coil current and the output voltage of the load increase, and during an OFF period when the first switching element is controlled to have an OFF state and the second switching element is controlled to have an ON state by the switching control circuit, the coil current and the output voltage of the load decrease. The error amplifier compares the fractional voltage of the output voltage of the load with the reference voltage, controls the switching control circuit in such a manner that the fractional voltage of the output voltage of the load is equal to the reference voltage, adjusts an ON period $T_{ON}$ and an OFF period $T_{OFF}$, and thus, the output voltage of the load is stabilized. The output voltage $V_{OUT}$ of the switching regulator having the voltage step-down function is represented by the following Formula (1) with an input voltage $V_{IN}$, the ON period $T_{on}$, and the OFF period $T_{OFF}$.

$$V_{OUT}=V_{IN} \cdot T_{ON}/(T_{ON}+T_{OFF}) \qquad \text{Formula (1)}$$

A switching regulator having a voltage boosting function is configured with a smoothing coil, a switching circuit having a first switching element and a second switching element, a smoothing capacitor, an error amplifier, and a switching control circuit. An input voltage is supplied to an end of the smoothing coil, the other end of the smoothing coil is connected to an end of the first switching element and an end of the second switching element, the other end of the first switching element is connected to a ground voltage via a parallel connection of the smoothing capacitor and a load, and the other end of the second switching element is connected to the ground voltage. During an ON period when the first switching element is controlled to have an OFF state and the second switching element is controlled to have an ON state by the switching control circuit, a coil current increases, and during an OFF period when the first switching element is controlled to have an ON state and the second switching element is controlled to have an OFF state by the switching control circuit, the coil current decreases. The error amplifier compares the fractional voltage of the output voltage of the load with the reference voltage, controls the switching control circuit in such a manner that the fractional voltage of the output voltage is equal to the reference voltage, adjusts an ON period $T_{ON}$ and an OFF period $T_{OFF}$, and thus, the output voltage of the load is stabilized. The output voltage $V_{OUT}$ of the switching regulator having the voltage boosting function is represented by the following Formula (2) with an input voltage $V_{IN}$, the ON period $T_{on}$, and the OFF period $T_{OFF}$.

$$V_{OUT}=(1+T_{ON}/T_{OFF}) \cdot V_{IN} \qquad \text{Formula (2)}$$

A switching regulator having the voltage step-down function and the voltage boosting function is described in, for example, JP-A-2007-151246.

In "'Application to smoothing capacitor of switching power supply' pp. 65-69. [accessed on 2013 Nov. 7]", it is described that if a small equivalent series resistance (ESR) is selected so as to suppress an output ripple voltage for an output smoothing capacitor of a switching power supply, a phenomenon which is called an abnormal oscillation of the output voltage is generated. In "Application to smoothing capacitor of switching power supply' pp. 65-69. [accessed on 2013 Nov. 7]", it is described that the switching power supply has a negative feedback circuit for stabilizing the output voltage, and thus, if the output smoothing capacitor having a small equivalent series resistance (ESR) is used, the output smoothing capacitor becomes an ideal LC filter below a higher frequency band, and the phase is delayed by approximately 180 degrees, thereby oscillation easily occurs. Furthermore, in "'Application to smoothing capacitor of switching power supply' pp. 65-69. [accessed on 2013 Nov. 7]", it is described that a feedback circuit of the error amplifier performs phase compensation and thus, the oscillation of the output voltage is prevented. A phase compensation circuit for preventing oscillation is configured with a series connection or a parallel connection of an input resistor and an input capacitor and is provided between an output terminal of a junction of a smoothing coil L of the switching power supply and an output smoothing capacitor Cout and an inverting input terminal of the error amplifier, or with a series connection or a parallel connection of a feedback resistor and a feedback capacitor and is provided between an inverting input terminal of the error amplifier and an output terminal of the error amplifier.

In "'Application note surface mounted chopper type switching regulator IC SI-8000JD series' pp. 1-29, Sanken Electric Co., Ltd., 2010 January [accessed on 2013 Nov. 7]", in the same manner as in "'Application to smoothing capacitor of switching power supply' pp. 65-69. [accessed on 2013 Nov. 7]", it is described that in a PWM control chopper type regulator, a phase delay of −180.degree. is generated by an LC filter configured with a smoothing coil and an output smoothing capacitor, a phase delay of −180.degree. is generated by a negative feedback loop, and a total phase gap reaches 360.degree., and thereby abnormal oscillation is generated. Furthermore, in "'Application note surface mounted chopper type switching regulator IC SI-8000JD series' pp. 1-29, Sanken Electric Co., Ltd., 2010 January [accessed on 2013 Nov. 7]", it is described that the phase delay of the LC filter is smaller than 180.degree. by an influence of the equivalent series resistance (ESR) of the output smoothing capacitor, and a phase margin of the regulator can be secured by a phase compensation effect of the equivalent series resistance (ESR). In addition, in "'Application note surface mounted chopper type switching regulator IC SI-8000JD series' pp. 1-29, Sanken Electric Co., Ltd., 2010 January [accessed on 2013 Nov. 7]", it is described that if the equivalent series resistance (ESR) is large, the phase delay of the LC filter is small, but a phase margin for a gain increase is decreased due to a decrease of the attenuation rate of the LC filter, and an abnormal oscillation can occur due to an increase of an output ripple voltage. Furthermore, in "'Application note surface mounted chopper type switching regulator IC SI-80001D series' pp. 1-29, Sanken Electric Co., Ltd., 2010, January [accessed on 2013 Nov. 7]", it is described that if a capacitor having an extremely small equivalent series resistance (ESR), such as a tantalum capacitor or a laminated ceramic capacitor, is used for the LC filter, the phase delay of the filter is large, and thus, from a viewpoint of phase margin security, using an electrolytic capacitor for an output filter is appropriate.

In "'Notes on use of operational amplifier with small phase and gain margin' pp. 1-8, [accessed on 2013 Nov. 7]", it is described that if an input signal is supplied to a non-inverting input terminal of an operational amplifier, and a voltage follower circuit is configured by connecting an inverting input terminal of the operational amplifier to an output terminal of the operational amplifier, a phase delay having a peak with a gain of more than 0 dB at a frequency of approximately 100 MHz to 200 MHz reaches −180.degree., and the operation is unstable. Furthermore, in "'Notes on use of operational amplifier with small phase and gain margin' pp. 1-8, [accessed on 2013 Nov. 7]", it is described that a series connection of an input resistor and an input capacitor is connected between a non-inverting input terminal and an inverting input terminal of the operational amplifier, thereby compensating for the phase, and thus, there is no peak with a gain of more than 0 dB, and oscillation can be prevented. In addition, in "'Notes on use of operational amplifier with small phase and gain margin' pp. 1-8, [accessed on 2013 Nov. 7]", it is described that a series connection of a compensation resistor and a compensation capacitor is connected between an output terminal of the operational amplifier and a ground voltage, thereby compensating for the phase, and thus, there is no peak with a gain of more than 0 dB, and oscillation can be prevented.

In JP-A-2002-136123, there are described problems of increase in the output ripple voltage because an equivalent series resistance (ESR) of an electrolytic capacitor connected to a secondary coil of a transformer of the switching power supply increases at a low temperature, and stability of a control system being affected because the equivalent series resistance (ESR) decreases at a high temperature. In order to solve these problems, in JP-A-2002-136123, in consideration of temperature characteristics of the electrolytic capacitor, the deeper negative feedback is set so as to be used stably in a wide temperature range. Thus, in JP-A-2002-136123, an output voltage control circuit which is connected to the secondary coil of the transformer of the switching power supply includes a phase compensation circuit with a temperature compensation function, and specifically in the phase compensation circuit with a temperature compensation function, a series connection of a thermistor, a capacitor, and a resistor, which are temperature elements, are connected between the secondary coil of the transformer and a reference terminal of the shunt regulator. At a low temperature, the equivalent series resistance (ESR) of the electrolytic capacitor increases, and thereby the output ripple voltage increases, but the resistance value of the thermistor of the phase compensation circuit with a temperature compensation function is increased at the low temperature, and thus an amount of superimposition of output ripple components with the reference terminal of the shunt regulator is reduced, and thereby a phase leading signal of the shunt regulator becomes small. At a high temperature, the equivalent series resistance (ESR) of the electrolytic capacitor decreases, the resistance value of the thermistor of the phase compensation circuit with a temperature compensation function is decreased, and thus, an amount of superimposition of the output ripple components with the reference terminal of the shunt regulator is increased, and thereby a phase leading signal of the shunt regulator is maintained constant. Meanwhile, in the switching power supply, an amount of received feedback light of a light receiving element of a photocoupler changes according to an amount of emitted light of a light emitting element of the photocoupler according to the output voltage of the secondary coil of the transformer. An IC for control which is connected to a primary coil of the transformer controls ON and OFF duty of two switching elements which are connected to the primary coil, according to an amount of the received feedback light, and thus, the output voltage of the secondary coil of the transformer is maintained constant. Furthermore, a phase compensation circuit on a primary side which is configured by a series connection of a resistor and a capacitor is connected in parallel between both ends of the light-receiving element of the photocoupler.

In JP-A-2002-044938, there are described problems of destabilizing of an output voltage caused by an increase of an output ripple voltage because an equivalent series resistance (ESR) of an output smoothing capacitor in an LC filter which is configured by a smoothing coil and the output smoothing capacitor increases at a low temperature, and of generating unintended activation of a switching power supply device, in a voltage step-down DC-DC converter as the switching power supply device. In order to solve these problems, it is described that a ripple voltage detection circuit, a comparator, a switching circuit, and a ripple voltage suppressing circuit are connected to an inverting input terminal of a differential amplifier as an error amplifier, in a control unit that controls ON and OFF duty of a switching element which drives the LC filter in JP-A-2002-044938. The ripple voltage detection circuit detects a ripple voltage included in the output voltage of the switching power supply device, and supplies the detected value to the comparator. If the ripple voltage included in the output voltage of the switching power supply device is increased more than a comparison DC voltage, the comparator supplies a switching signal to the switching circuit. If the ripple voltage included in the output voltage of the switching power supply device is decreased more than the comparison DC voltage, the ripple voltage suppressing circuit which is a low pass filter is not connected to an inverting input terminal of the differential amplifier by the switching circuit. In contrast, if the ripple voltage included in the output voltage of the switching power supply device is increased more than the comparison DC voltage, the ripple voltage suppressing circuit which is a low pass filter is connected to an inverting input terminal of the differential amplifier by the switching circuit. As a result, it is described in JP-A-2002-044938 that a signal with higher frequency components than those of the ripple voltage included in the output voltage of the switching power supply device is blocked, a signal with only frequency components which have low frequency compared to the frequency components of the ripple voltage included in the output voltage of the switching power supply device is supplied to the inverting input terminal of the differential amplifier, and thus, a feedback system becomes stable. Thus, it is described in JP-A-2002-044938 that the ripple voltage suppressing circuit makes a gain of the differential amplifier effectively small, and thus, even if the equivalent series resistance (ESR) of the capacitor increases at a low temperature and thereby the ripple voltage increases, the feedback system can be stabilized.

SUMMARY

Prior to the present invention, the present inventors have worked with development of a semiconductor integrated circuit for a vehicle that can be used for a stabilizing power supply which is mounted on a vehicle. Since the semiconductor integrated circuit is used for a vehicle, it is required that the semiconductor integrated circuit stably operates at an ambient temperature from low temperature of −40° to high temperature of +110°. Furthermore, since it is difficult to integrate an output smoothing capacitor of a stabilizing power supply into a semiconductor chip of the semiconductor integrated circuit, the output smoothing capacitor becomes an external component.

In a stabilizing power supply, it is required that a cost of the semiconductor integrated circuit (IC) be reduced and an external component be manufactured as cheaply as possible. Thus, in order to reduce the cost of the stabilizing power supply, the output smoothing capacitor being changed from a high cost ceramic capacitor to a low-cost aluminum electrolytic capacitor has been studied.

However, as described in JP-A-2002-136123 and JP-A-2002-044938, the equivalent series resistance (ESR) of an aluminum electrolytic capacitor or the like has a greater resistance increase at a low temperature than that of the equivalent series resistance (ESR) of the ceramic capacitor. As a result, it was found that abnormal oscillation occurs or a negative feedback loop of a stabilizing power supply circuit becomes unstable due to an increase of the equivalent series resistance (ESR) of the aluminum electrolytic capacitor at a low temperature.

Thus, in order to prevent instability or abnormal oscillation of the stabilizing power supply circuit caused by the increase of the equivalent series resistance (ESR) of the electrolytic capacitor at a low temperature from occurring, the present inventors have studied the methods described in JP-A-2002-136123 and JP-A-2002-044938, prior to the present invention.

According to the method described in JP-A-2002-136123, it is necessary to install a temperature sensing element (thermister) near the electrolytic capacitor as an external component, and thereby component costs increase. In addition, it has been apparent from study of the present inventors prior to the present invention that there is a problem of increasing manufacturing costs of the stabilizing power supply circuit device, because it is necessary for a user of an IC for a constant voltage power supply to install the temperature sensing element (thermister) on a wiring substrate as an external component, and thereby the width of the wiring substrate and the number of manufacturing processes increase.

According to the method described in JP-A-2002-044938, if a resistance value of the equivalent series resistance (ESR) of the smoothing capacitor increases, the gain of the differential amplifier is decreased effectively, and thus a loop gain of the negative feedback loop that determines a constant voltage setting operation performance which suppresses output voltage variation decreases. As a result, according to the method, it is difficult to realize the constant voltage setting operation performance for suppressing the output voltage variation which is an original objective of the stabilizing power supply. That is, according to the method, it has been apparent from study of the present inventors prior to the present invention that there is a problem of lowering of an original performance of the stabilizing power supply circuit, which suppresses the output voltage variation due to input voltage variation or load current variation, even though it is possible to suppress the output voltage ripple caused by an increase of the equivalent series resistance (ESR) of the smoothing capacitor.

Means or the like for solving the problems will be described hereinafter, but other problems and new characteristics will be apparent from the description of the present specification and the accompanying drawings.

A simple description of a representative embodiment disclosed in the present application will be made as follows.

That is, the representative embodiment is a semiconductor integrated circuit (10) that is used for a stabilizing power supply circuit (1) which supplies an output power supply voltage (Vout) to a parallel connection of a smoothing capacitor (C) and a load (3) which are connected to an output terminal, from an input power supply voltage (Vin) which is supplied to an input terminal.

The semiconductor integrated circuit (10) includes an error amplifier (11) which detects an error of the output power supply voltage (Vout), an output control circuit (12) which is connected between the input terminal and the output terminal, a phase compensation circuit (14) which is connected to the error amplifier (11), and a detection control circuit (15) which is connected to the phase compensation circuit (14).

The output control circuit (12) generates the output power supply voltage (Vout) by being controlled by the error amplifier (11) that detects the error of the output power supply voltage (Vout).

The detection control circuit (15) detects temperature variation of an equivalent series resistance (ESR) of the smoothing capacitor (C) or resistance variation due to the temperature variation, and variably controls the phase compensation circuit (14), according to the detected result (refer to FIG. 1).

A simple description of advantages which are obtained by the representative one of the embodiments disclosed in the present application is as follows.

That is, according to a semiconductor integrated circuit of the embodiment, it is possible to reduce the increase of the number of external components, in a case that instability or abnormal oscillation of a stabilizing power supply due to an increase of an equivalent series resistance (ESR) of an electrolytic capacitor at a low temperature is prevented.

DETAILED DESCRIPTION

1. Summary of the Embodiments

Figure 1:
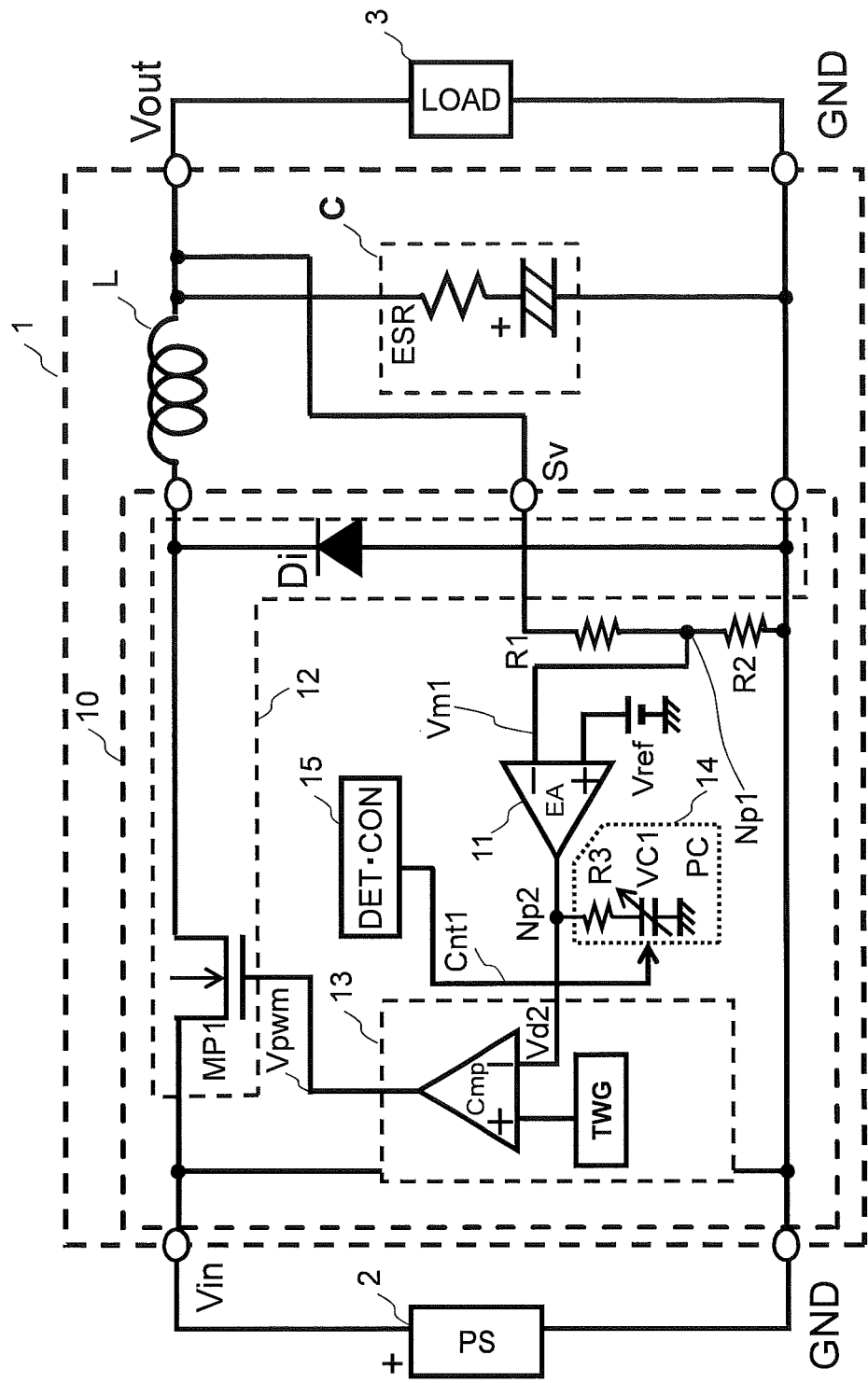
FIG. 1 is a diagram illustrating a configuration of an electronic apparatus that uses a stabilizing power supply circuit which uses a semiconductor integrated circuit according to a first embodiment.

First, summary of representative embodiments of the invention disclosed in the application will be described. Reference numerals in drawings in parentheses referred to in description of the summary of the representative embodiments just denote components included in the concept of the components to which the reference numerals are designated.

[1] A representative embodiment is a semiconductor integrated circuit (10) that is used for a stabilizing power supply circuit (1) which supplies an output power supply voltage (Vout) to a parallel connection of a smoothing capacitor (C) and a load (3) which are connected to an output terminal, from an input power supply voltage (Vin) which is supplied to an input terminal.

The semiconductor integrated circuit (10) includes an error amplifier (11) which detects an error of the output power supply voltage (Vout), an output control circuit (12) which is connected between the input terminal and the output terminal, a phase compensation circuit (14) which is connected to the error amplifier (11), and a detection control circuit (15) which is connected to the phase compensation circuit (14).

The output control circuit (12) generates the output power supply voltage (Vout) by being controlled by the error amplifier (11) responding to the error of the output power supply voltage (Vout).

The detection control circuit (15) detects temperature variation of an equivalent series resistance (ESR) of the smoothing capacitor (C) or resistance variation due to the temperature variation, and variably controls the phase compensation circuit (14), according to the detected result (refer to FIG. 1).

According to the embodiment, it is possible to reduce the increase of the number of external components, in a case that instability or abnormal oscillation of a stabilizing power supply caused by the increase of an equivalent series resistance (ESR) of an electrolytic capacitor at a low temperature is prevented.

In a preferred embodiment, in a state where the temperature of the smoothing capacitor (C) is lower than a predetermined temperature, the detection control circuit (15) sets a time constant (R3VC1) of the phase compensation circuit (14) to a smaller time constant (R3C10) than a predetermined time constant.

In a state where the temperature of the smoothing capacitor (C) is higher than a predetermined temperature, the detection control circuit (15) sets the time constant (R3VC1) of the phase compensation circuit (14) to another time constant (R3(C10+C11+C12+C13)) larger than the predetermined time constant (refer to FIG. 1).

In another preferred embodiment, in a state where the temperature of the smoothing capacitor (C) is lower than the predetermined temperature, a pole frequency which is set by phase compensation of the smalltime constant is set to a higher frequency (fp(LT)) than a predetermined frequency.

Figure 21:
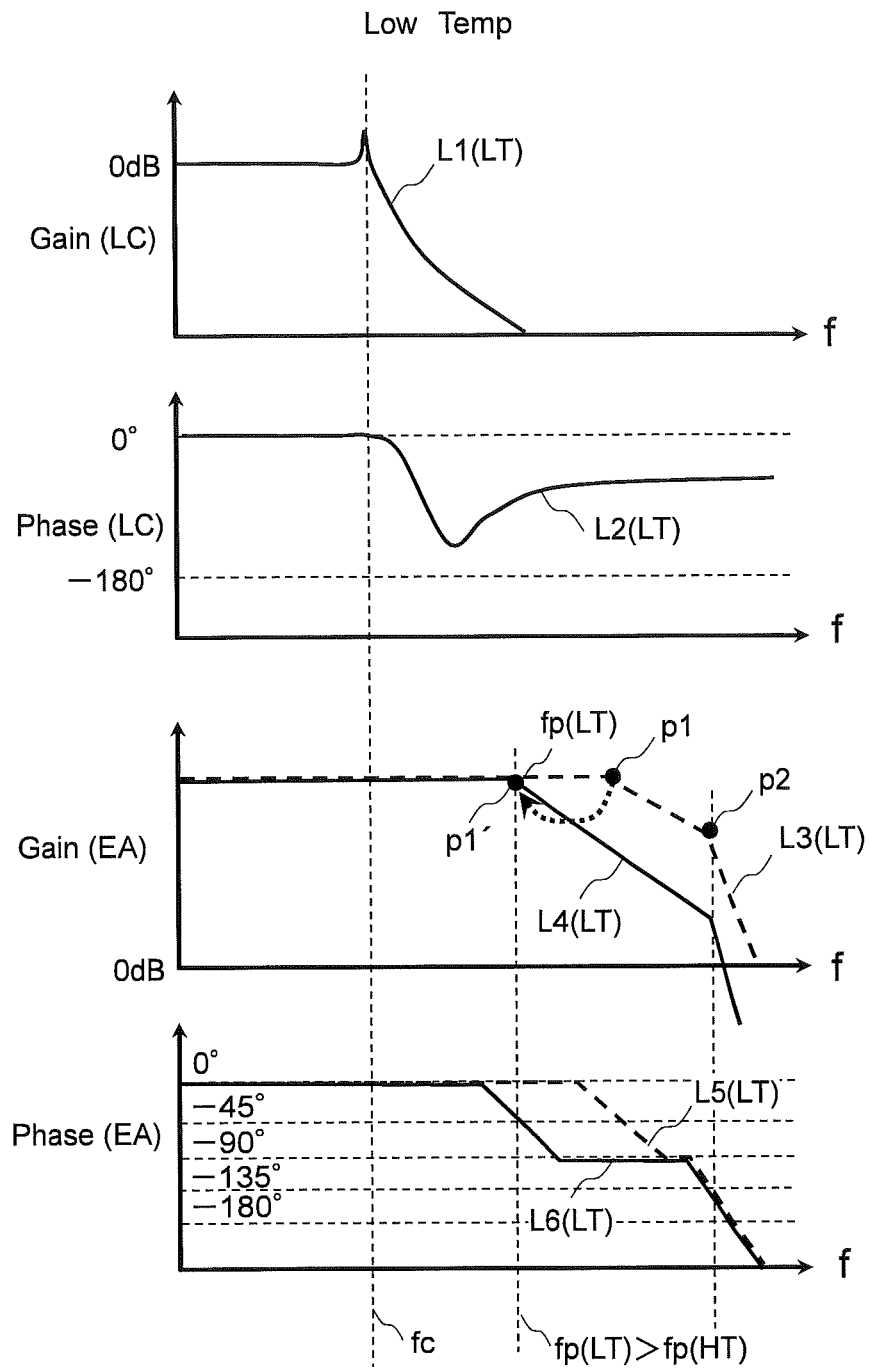
FIG. 21 is a diagram illustrating phase compensation characteristics at the time of minimum temperature (a state of temperature lower than −25° C.) of the stabilizing power supply circuit which uses the semiconductor integrated circuit according to the first embodiment, which is described with reference to FIGS. 1 to 20.
Figure 22:
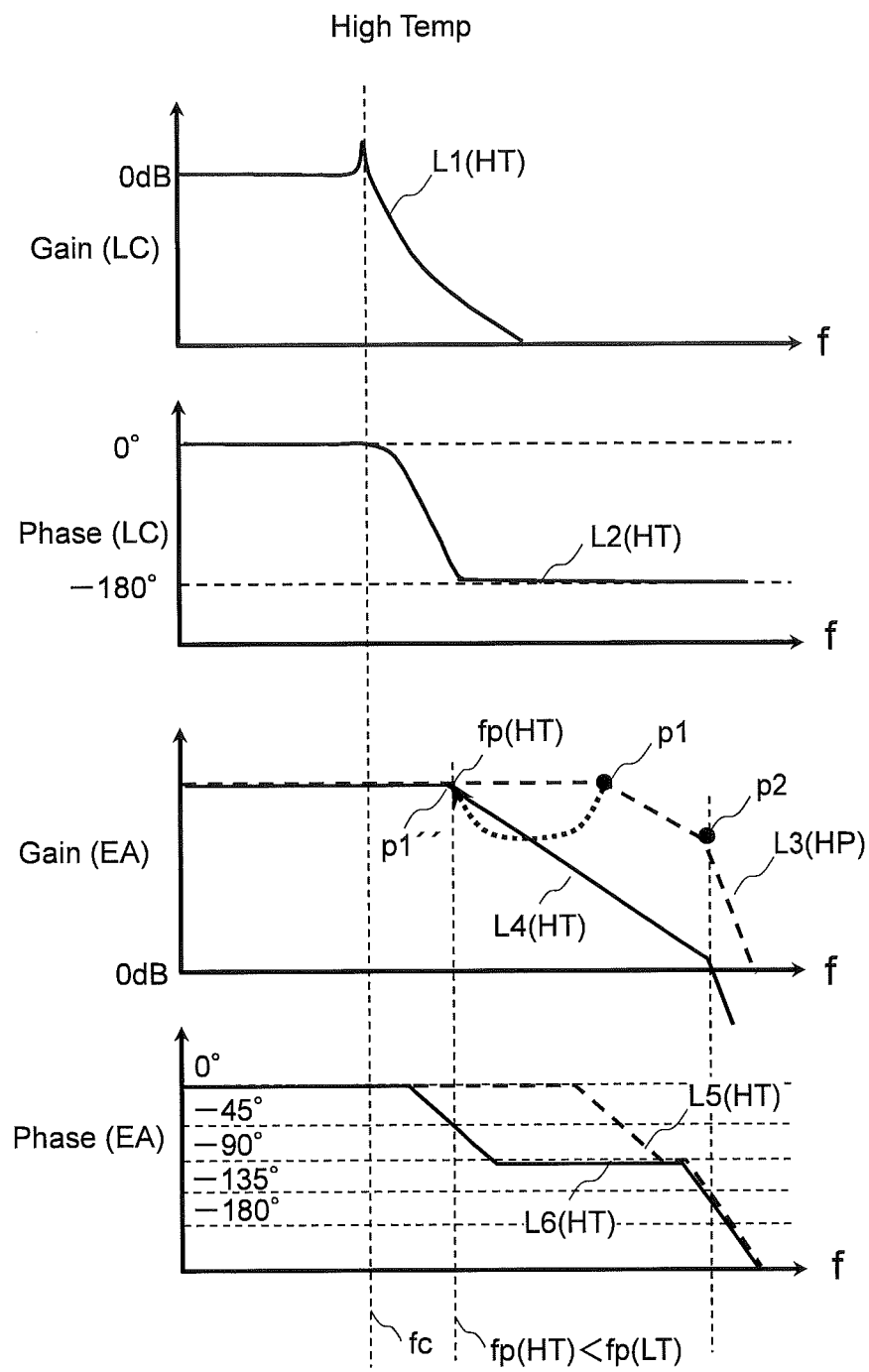
FIG. 22 is a diagram illustrating phase compensation characteristics at the time of maximum temperature (a state of temperature higher than +25° C.) of the stabilizing power supply circuit which uses the semiconductor integrated circuit according to the first embodiment, which is described with reference to FIGS. 1 to 20.

In a state where the temperature of the smoothing capacitor (C) is higher than the predetermined temperature, a pole frequency which is set by phase compensation of the large time constant is set to a lower frequency (fp(HT)) than the predetermined frequency (refer to FIG. 21 and FIG. 22).

Figure 5:
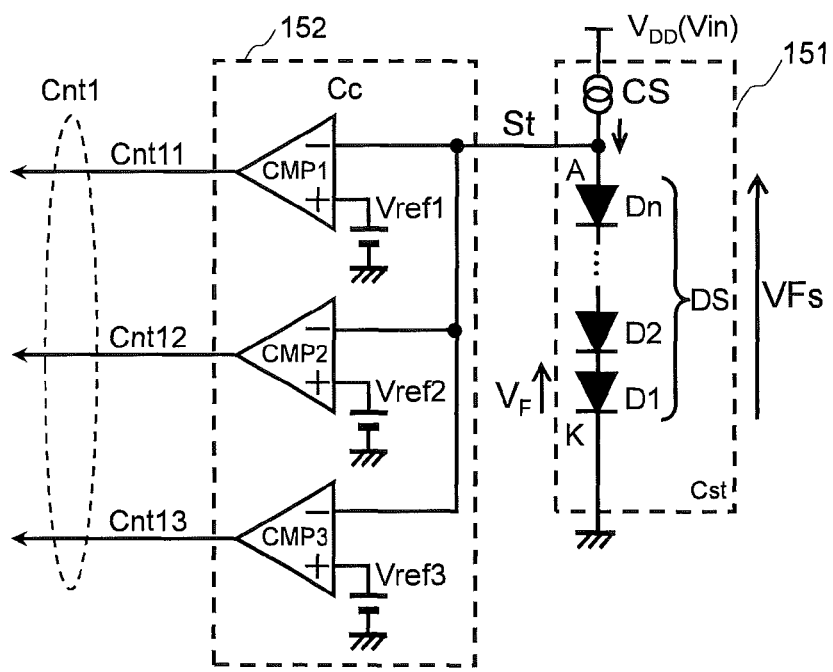
FIG. 5 is a diagram illustrating a configuration of a temperature measurement circuit and a code generating circuit which are included in the detection control circuit according to the first embodiment illustrated in FIG. 4.
Figure 9:
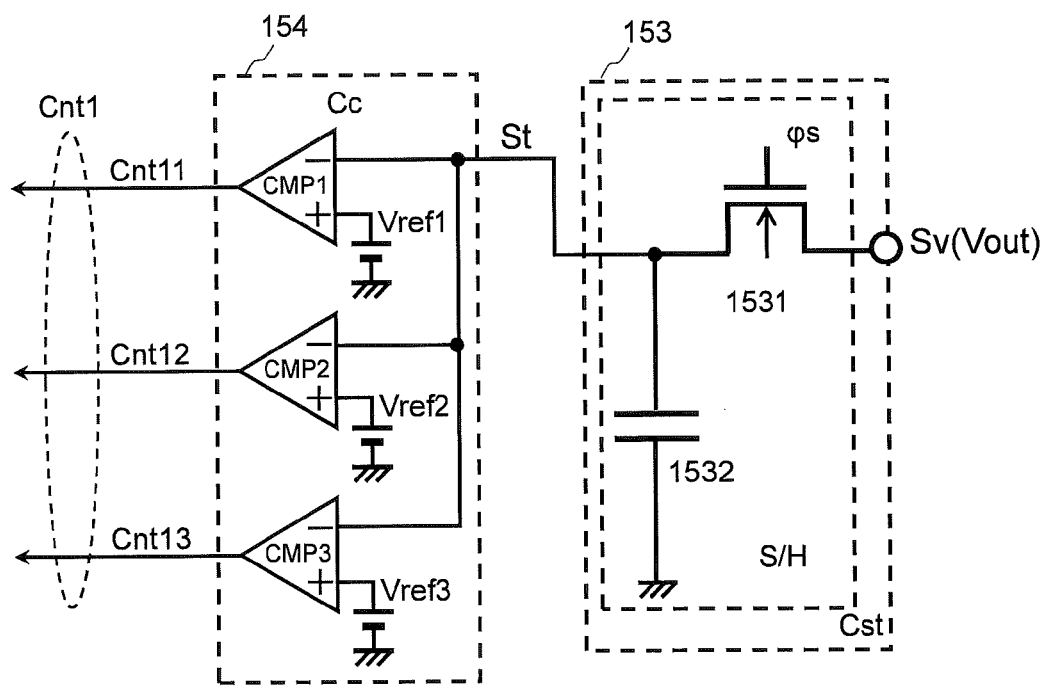
FIG. 9 is a diagram illustrating a configuration of a ripple voltage measurement circuit and a code generating circuit which are included in the detection control circuit of another type illustrated in FIG. 8.

Furthermore, in another preferred embodiment, the detection control circuit (15) detects the temperature variation or the resistance variation of the equivalent series resistance (ESR) of the smoothing capacitor (C) in at least four stages, thereby variably controlling the phase compensation characteristics of the phase compensation circuit (14) in at least four stages (refer to FIG. 5 and FIG. 9).

In a more preferred embodiment, the detection control circuit (15) performs an A/D conversion that determines an analog input signal having temperature variation or resistance variation as at least four multi-value levels, using at least three reference values (refer to FIG. 5 and FIG. 9).

In another more preferred embodiment, the A/D conversion is performed by any one of a flash type A/D converter, a sequential comparison type A/D converter, and a pipeline type A/D converter.

Furthermore, in another more preferred embodiment, the detection control circuit (15) uses a rate of change of forward voltage drop of a PN junction diode with respect to temperature ($\Delta V_F$), thereby detecting variation of the temperature of the smoothing capacitor (C) which is an ambient temperature of the stabilizing power supply circuit (1) (refer to FIG. 5).

Furthermore, in another more preferred embodiment, the detection control circuit (15) detects variation of a voltage amplitude level of a ripple voltage included in the output power supply voltage (Vout), thereby detecting the resistance variation of the equivalent series resistance (ESR) of the smoothing capacitor (C) due to the temperature variation (refer to FIG. 9).

In another more preferred embodiment, a smoothing coil (L) of a low pass filter is connected between the output terminal and the parallel connection of the smoothing capacitor (C) and the load (3).

The output control circuit (12) includes a first switching element (MP1) that is connected between the input terminal and the output terminal, and a second switching element (Di) that is connected between the output terminal and a ground voltage (GND).

The semiconductor integrated circuit (10) further includes a switching control circuit (13) that controls switching of the first switching element (MP1) and the second switching element (Di) of the output control circuit (12), according to an error detection output signal (Vd2) of the error amplifier (11).

A period in which the first switching element (MP1) is controlled so as to be in an ON state and the second switching element (Di) is controlled so as to be in an OFF state by the switching control circuit (13) is an ON period ($T_{ON}$) in which magnetic energy is accumulated in the smoothing coil (L) of the low pass filter.

A period in which the first switching element (MP1) is controlled so as to be in an OFF state and the second switching element (Di) is controlled so as to be in an ON state by the switching control circuit (13) is an OFF period ($T_{OFF}$) in which the magnetic energy accumulated in the smoothing coil (L) of the low pass filter is consumed.

The switching control circuit (13) respectively sets the ON period ($T_{ON}$) and the OFF period ($T_{OFF}$) to a predetermined value according to the error detection output signal (Vd2) of the error amplifier (11), and thereby the output power supply voltage (Vout) that is dropped to a voltage lower than the input power supply voltage (Vin) is generated by the stabilizing power supply circuit (1) (refer to FIG. 1, FIG. 7, FIG. 17 and FIG. 18).

Furthermore, in another more preferred embodiment, one end of a smoothing coil (L) is connected to the input terminal to which the input power supply voltage (Vin) is supplied, and the other end of the smoothing coil (L) is connected to the output control circuit (12).

The output control circuit (12) includes a first switching element (Di) that is connected between the other end of the smoothing coil (L) and the output terminal, and a second switching element (MN1) that is connected between the other end of the smoothing coil (L) and a ground voltage (GND).

The semiconductor integrated circuit (10) further includes a switching control circuit (13) that controls switching of the first switching element (Di) and the second switching element (MN1) of the output control circuit (12), according to an error detection output signal (Vd2) of the error amplifier (11).

A period in which the second switching element (MN1) is controlled so as to be in an ON state and the first switching element (Di) is controlled so as to be in an OFF state by the switching control circuit (13) is an ON period ($T_{ON}$) in which magnetic energy is accumulated in the smoothing coil (L).

A period in which the second switching element (MN1) is controlled so as to be in an OFF state and the first switching element (Di) is controlled so as to be in an ON state by the switching control circuit (13) is an OFF period ($T_{OFF}$) when the magnetic energy accumulated in the smoothing coil (L) is consumed.

Figure 23:
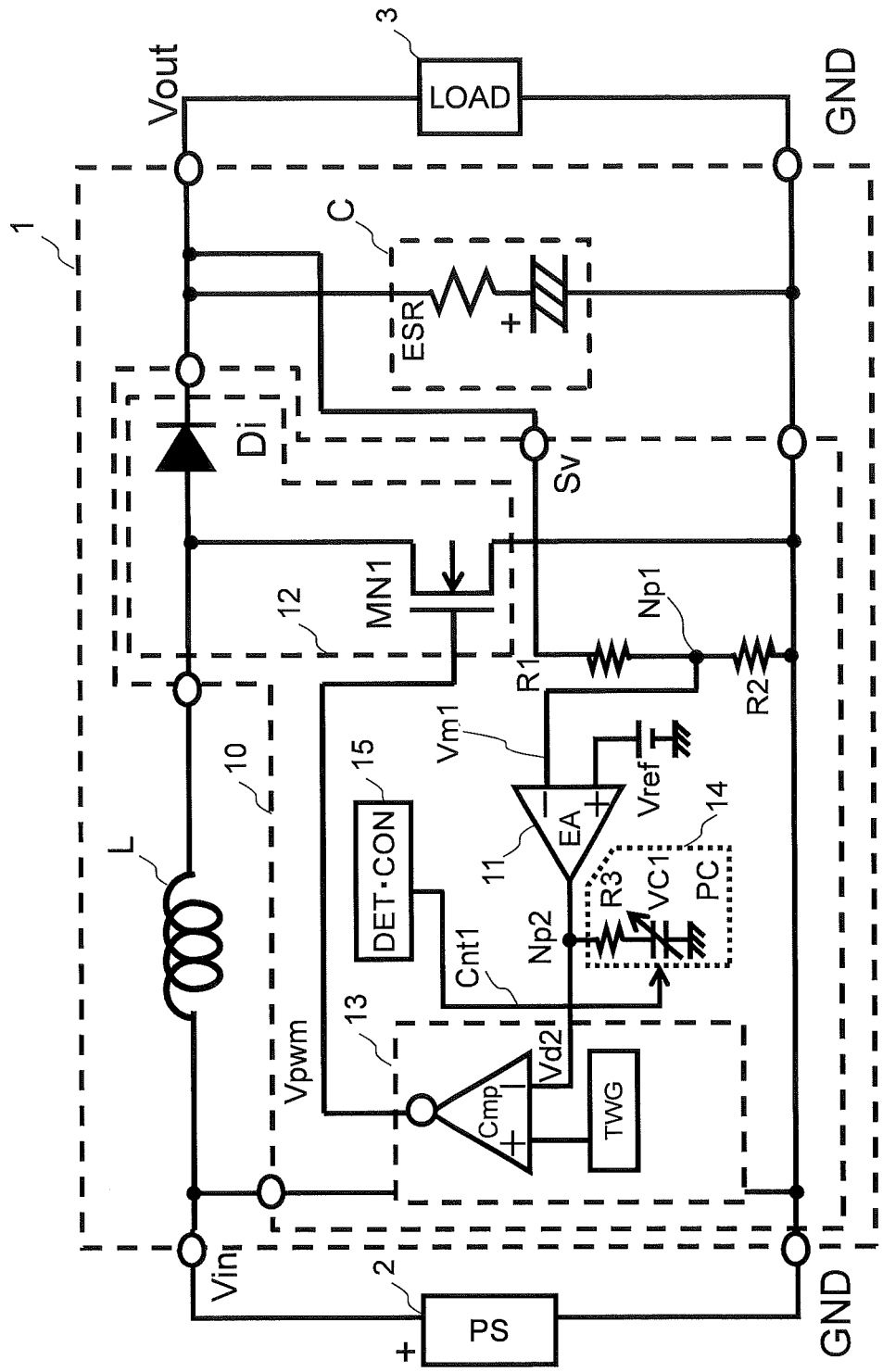
FIG. 23 is a diagram illustrating a configuration of an electronic apparatus that uses a stabilizing power supply circuit which uses a semiconductor integrated circuit according to a second embodiment.

The switching control circuit (13) respectively sets the ON period ($T_{ON}$) and the OFF period ($T_{OFF}$) to a predetermined value according to the error detection output signal (Vd2) of the error amplifier (11), and thereby the output power supply voltage (Vout) that is boosted to a value higher than the input power supply voltage (Vin) is generated from the stabilizing power supply circuit (1) (refer to FIG. 23).

In a specific embodiment, the output terminal is connected to the parallel connection of the smoothing capacitor (C) and the load (3).

Figure 24:
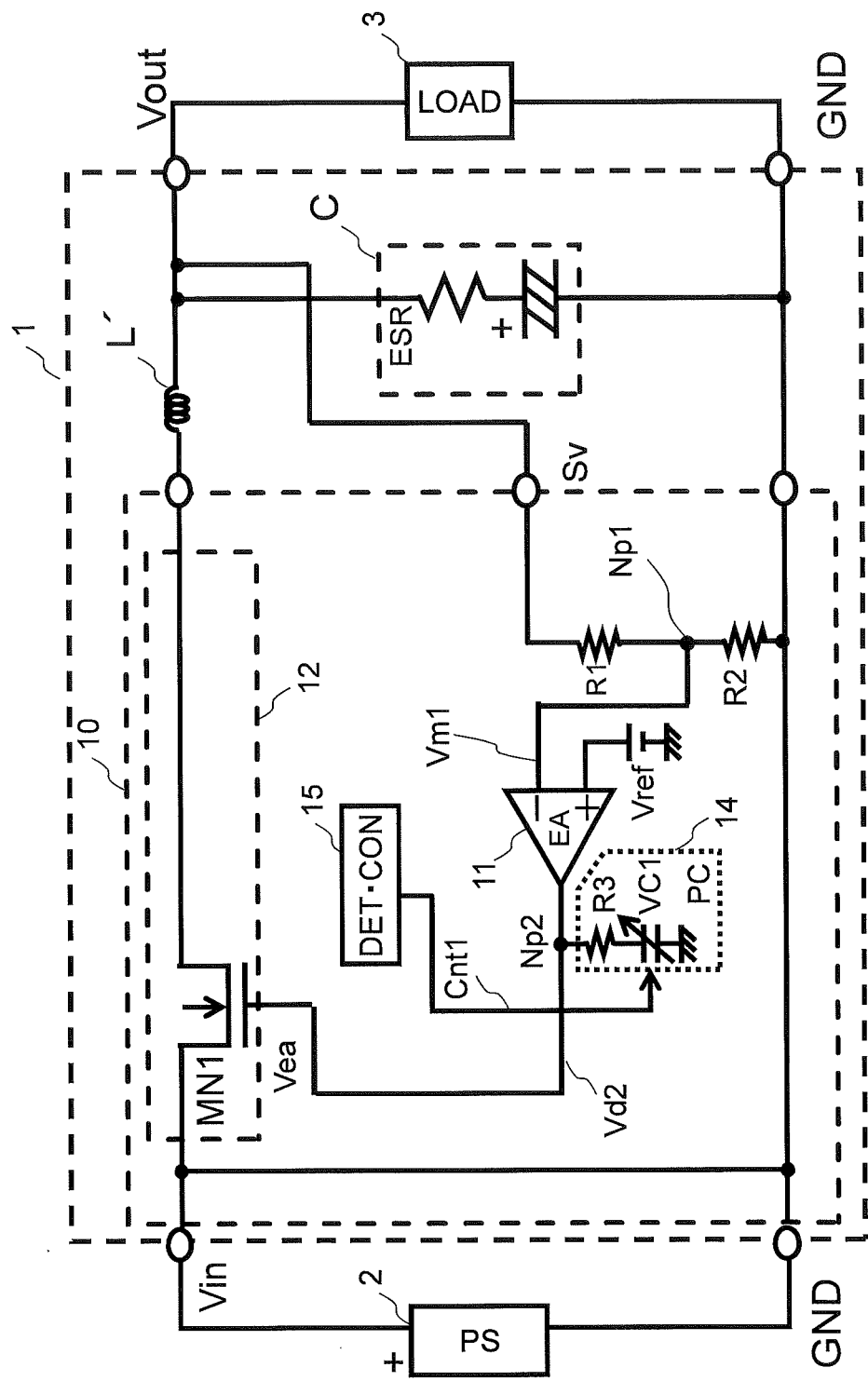
FIG. 24 is a diagram illustrating a configuration of an electronic apparatus that uses a stabilizing power supply circuit which uses a semiconductor integrated circuit according to a third embodiment.

The stabilizing power supply circuit (1) operates as a series regulator in which a voltage drop of the output control circuit (12) is adjusted by the error detection output signal (Vd2) of the error amplifier (11), in such a manner that the output power supply voltage is substantially constant, even if the input power supply voltage varies, and variation of the input power supply voltage (Vin) is absorbed by the voltage drop of the output control circuit (refer to FIG. 24).

In another specific embodiment, the phase compensation circuit (14 or 14') includes a compensation resistor and a compensation capacitor, that are connected in series to at least one of an input terminal and an output terminal of the error amplifier (11).

Anyone of the compensation resistor and the compensation capacitor of the phase compensation circuit (14 or 14') is a variable constant element that is variably controlled by the detection control circuit (15).

In a more specific embodiment, the variable constant element is one of a variable resistor element and a variable capacitor element that are variably controlled by the detection control circuit (15).

In another more specific embodiment, the error amplifier (11), the output control circuit (12), the switching control circuit (13), the phase compensation circuit (14), and the detection control circuit (15) are integrated into a single semiconductor chip of the semiconductor integrated circuit (10).

In the most specific embodiment, the error amplifier (11), the output control circuit (12), the switching control circuit (13), the phase compensation circuit (14), and the detection control circuit (15) are formed in a single resin-sealed package of the semiconductor integrated circuit (10) that is configured with one of a system-in-package (SIP) and a multi-chip module (MCP).

Figure 25:
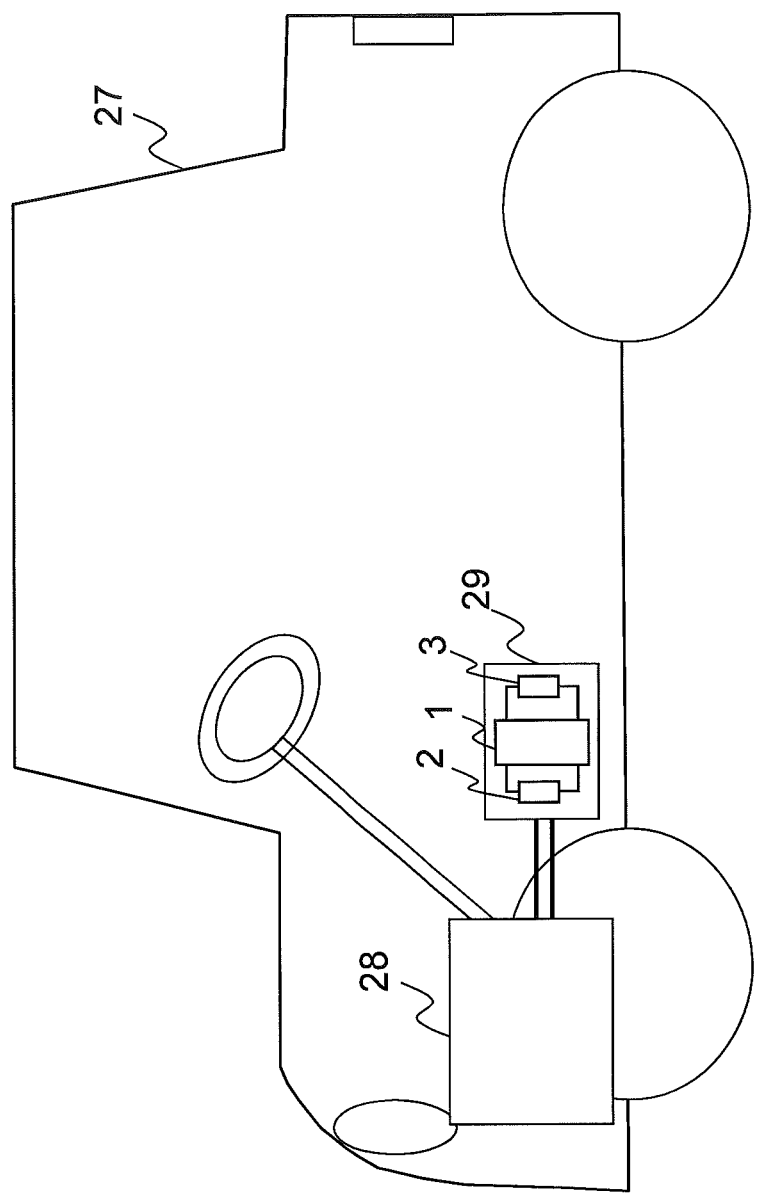
FIG. 25 is a view illustrating a state where the destabilizing power supply, the load circuit, and the stabilizing power supply circuit using any one of the semiconductor integrated circuits according to any one of the first embodiment to the third embodiment are mounted on a vehicle.
Figure 26:
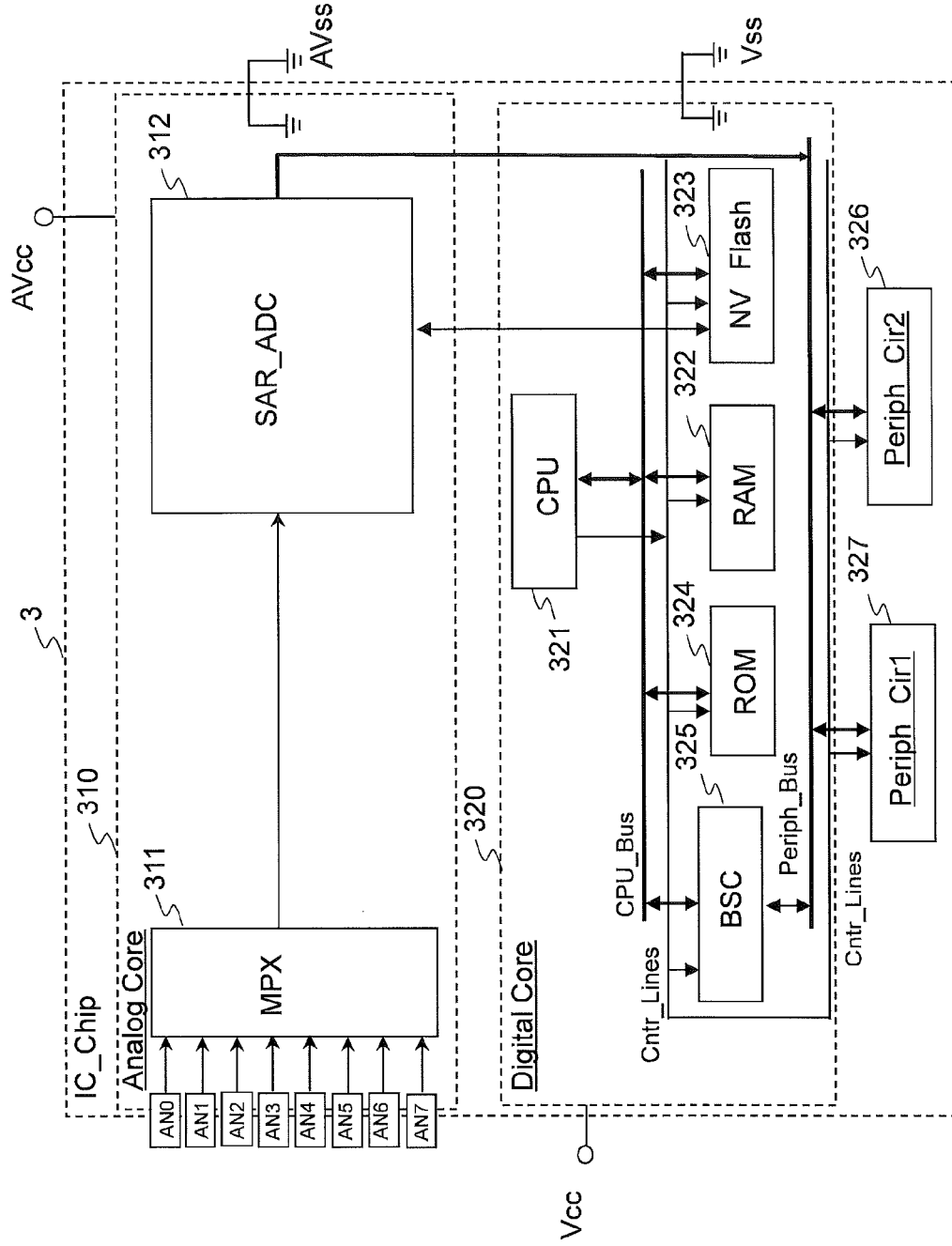
FIG. 26 is a diagram illustrating a configuration of the semiconductor integrated circuit as the micro controller which is the load circuit in the electronic control unit (ECU) illustrated in FIG. 25.

In the second most specific embodiment, the load (3) includes an electronic control unit (29) that controls any one (28) of an engine and a motor which are power sources of a vehicle (FIGS. 25 and 26).

[2] A representative embodiment of another aspect is a method of operating the semiconductor integrated circuit (10) that is used for a stabilizing power supply circuit (1) which supplies an output power supply voltage (Vout) to a parallel connection of a smoothing capacitor (C) and a load (3) which are connected to an output terminal, from an input power supply voltage (Vin) which is supplied to an input terminal.

The semiconductor integrated circuit (10) includes the error amplifier (11) that detects an error of the output power supply voltage (Vout), an output control circuit (12) that is connected between the input terminal and the output terminal, a phase compensation circuit (14) that is connected to the error amplifier (11), and a detection control circuit (15) that is connected to the phase compensation circuit (14).

The method including causing the output control circuit (12) to generate the output power supply voltage (Vout) by being controlled by the error amplifier (11) responding to the error of the output power supply voltage (Vout).

The method further including causing the detection control circuit (15) to detect temperature variation of the equivalent series resistance (ESR) of the smoothing capacitor (C) and resistance variation due to the temperature variation, and to variably control the phase compensation circuit (14) according to the detected result (refer to FIG. 1).

According to the embodiment, it is possible to reduce the increase of the number of external components, in a case that instability or abnormal oscillation of the stabilizing power supply caused by the increase of the equivalent series resistance (ESR) of the electrolytic capacitor at a low temperature is prevented.

2. Further Detailed Description of the Embodiments

Next, an embodiment will be described in detail. Meanwhile, in all the drawings for describing the best mode for realizing the invention, the same reference numbers or symbols are attached to components having the same functions as those of a previous figure, and description thereof will not be repeated.

[First Embodiment]

<<Configuration of Electronic Apparatus Using Stabilizing Power Supply Circuit>>

FIG. 1 is a diagram illustrating a configuration of an electronic apparatus that uses a stabilizing power supply circuit 1 which uses a semiconductor integrated circuit 10 according to a first embodiment.

The electronic apparatus is configured with a destabilizing power supply 2, the stabilizing power supply circuit 1, and a load circuit 3. An output voltage (Vin) of the destabilizing power supply 2 can be set to a voltage out of a recommended operation power supply range of the load circuit 3. A high voltage side terminal (+) of the destabilizing power supply 2 is connected to an input terminal yin of the stabilizing power supply circuit 1, and a low voltage side terminal (−) of the destabilizing power supply 2 is connected to a ground voltage GND. The stabilizing power supply circuit 1 is configured in such a manner that an output voltage Vout which is generated by converting the input voltage Vin into a voltage in the recommended operation power supply range of the load circuit 3 is supplied to the load circuit 3. The load circuit 3 receives the output voltage Vout of the stabilizing power supply circuit 1 and an operation power (voltage× current) from the ground voltage GND, and performs a desired operation.

As illustrated at the beginning, the stabilizing power supply circuit 1 has two types: one type having a voltage step-down function, and the other type having a voltage boosting function. That is, the one type has the voltage Vin, which is higher than the recommended operation power supply voltage range of the load circuit 3, of the destabilizing power supply 2, and is a voltage step-down type stabilizing power supply circuit. The other type has the voltage Vin, which is lower than the recommended operation power supply voltage range of the load circuit 3, of the destabilizing power supply 2, and is a voltage boosting type stabilizing power supply circuit. The stabilizing power supply circuit 1 that uses the semiconductor integrated circuit 10 according to the first embodiment illustrated in FIG. 1 is a voltage step-down type stabilizing power supply circuit.

<<Configuration of Stabilizing Power Supply Circuit Using Semiconductor Integrated Circuit>>

The stabilizing power supply circuit 1 that uses the semiconductor integrated circuit 10 according to the first embodiment illustrated in FIG. 1 is a switching regulator having a voltage step-down function described at the beginning, and thus, the output voltage Vout is supplied to the load circuit 3 via a low pass filter configured with a smoothing coil L and a smoothing capacitor C.

In order to configure the stabilizing power supply circuit as a voltage step-down type switching regulator, the semiconductor integrated circuit 10 includes an error amplifier 11, an output control circuit 12, and a PWM control circuit 13. The output voltage Vout that is generated by the low pass filter which is configured with the smoothing coil L and the smoothing capacitor C, is divided into two voltages by two voltage dividing resistors R1 and R2, as an output detection voltage Sv. A fractional voltage Vm1 at a connection node Np1 of the two voltage dividing resistors R1 and R2 is supplied to an inverting input terminal (−) of the error amplifier 11, and a reference voltage Vref for error detection is supplied to a non-inverting input terminal (+) of the error amplifier 11. An error detection output voltage Vd2 at an output terminal Np2 of the error amplifier 11 is supplied to the PWM control circuit 13.

The PWM control circuit 13 is configured with a comparator Cmp and a triangular wave generator TWG, the error detection output voltage Vd2 at the output terminal Np2 of the error amplifier 11 is supplied to an inverting input terminal (−) of the comparator Cmp, and a triangular wave signal that is generated in the triangular wave generator TWG is supplied to a non-inverting input terminal (+) of the comparator Cmp.

In the PWM control circuit 13, if a voltage level of the triangular wave signal of the triangular wave generator TWG which is supplied to the non-inverting input terminal (+) of the comparator Cmp is lower than a voltage level of the error detection output voltage Vd2 of the output terminal Np2 of the error amplifier 11 which is supplied to the inverting input terminal (−) of the comparator Cmp, an output voltage Vpwm of the comparator Cmp of the PWM control circuit 13 becomes a low level. As a result, according to the low level of the output voltage Vpwm of the comparator Cmp, the output control circuit 12 controls in such a manner that a P channel MOS transistor MP1 is turned on, and controls in such a manner that a diode Di is turned off. In this state, an output current Iout that flows from the destabilizing power supply 2 to the smoothing coil L via a source-drain current path of the P channel MOS transistor MP1, and the output voltage Vout increase as time passes. As a result, a period when the P channel MOS transistor MP1 is controlled so as to be in an ON state and the diode Di is controlled so as to be in an OFF state, becomes an ON period $T_{ON}$ when magnetic energy is accumulated in the smoothing coil L of the low pass filter.

In the PWM control circuit 13, if the voltage level of the triangular wave signal of the triangular wave generator TWG which is supplied to the non-inverting input terminal (+) of the comparator Cmp is higher than the voltage level of the error detection output voltage Vd2 of the output terminal Np2 of the error amplifier 11 which is supplied to the inverting input terminal (−) of the comparator Cmp, an output voltage Vpwm of the comparator Cmp of the PWM control circuit 13 becomes a high level. As a result, according to the high level of the output voltage Vpwm of the comparator Cmp, the output control circuit 12 controls in such a manner that the P channel MOS transistor MP1 is turned off, and controls in such a manner that the diode Di is turned on. In this state, the output current Iout flows from the ground voltage GND to the smoothing coil L via an anode and a cathode of the diode Di, and the output current Iout and the output voltage Vout decrease as time passes. As a result, a period when the P channel MOS transistor MP1 is controlled so as to be in an OFF state and the diode Di is controlled so as to be in an ON state, becomes an OFF period $T_{OFF}$ when magnetic energy accumulated in the smoothing coil L of the low pass filter is consumed.

If the output voltage Vout increases according to a decrease of the output current Iout that flows through the load circuit 3, the fractional voltage Vm1 that is supplied to the inverting input terminal (−) of the error amplifier 11 also increases, and the error detection output voltage Vd2 at the output terminal Np2 of the error amplifier 11 decreases. As a result, in the PWM control circuit 13, the time of an ON period $T_{ON}$ when a voltage level of the triangular wave signal of the triangular wave generator TWG which is supplied to the non-inverting input terminal (+) of the comparator Cmp becomes lower than a voltage level of the error detection output voltage Vd2 of the error amplifier 11 which is supplied to the inverting input terminal (−) of the comparator Cmp, is reduced. Thus, as is apparent from the above-described Formula (1), according to reduction of the time of the ON period $T_{ON}$, the output voltage Vout of the stabilizing power supply circuit 1 that is configured as a voltage step-down type switching regulator decreases, and the output voltage Vout is maintained substantially constant.

If the output voltage Vout decreases according to an increase of the output current Iout that flows through the load circuit 3, the fractional voltage Vm1 that is supplied to the inverting input terminal (−) of the error amplifier 11 also decreases, and the error detection output voltage Vd2 at the output terminal Np2 of the error amplifier 11 increases. As a result, in the PWM control circuit 13, the time of an ON period $T_{ON}$ when a voltage level of the triangular wave signal of the triangular wave generator TWG which is supplied to the non-inverting input terminal (+) of the comparator Cmp becomes lower than a voltage level of the error detection output voltage Vd2 of the error amplifier 11 which is supplied to the inverting input terminal (−) of the comparator Cmp, is increased. Thus, as is apparent from the above-described Formula (1), according to the increase of the time of the ON period $T_{ON}$, the output voltage Vout of the stabilizing power supply circuit 1 that is configured as a voltage step-down type switching regulator increases, and the output voltage Vout is maintained substantially constant.

The semiconductor integrated circuit 10 according to the first embodiment illustrated in FIG. 1 includes the error amplifier 11, the output control circuit 12, the PWM control circuit 13, and the two voltage dividing resistors R1 and R2 which are described above, the phase compensation circuit 14 which will be described hereinafter, and the detection control circuit 15. In the preferred embodiment, the error amplifier 11, the output control circuit 12, the PWM control circuit 13, and the two voltage dividing resistors R1 and R2, the phase compensation circuit 14, and the detection control circuit 15 are integrated into a single semiconductor chip of the semiconductor integrated circuit 10.

In the output control circuit 12, the P channel MOS transistor MP1 can be replaced with a PNP type bipolar transistor. In order to improve a power efficiency of the stabilizing power supply circuit 1 that uses the semiconductor integrated circuit 10 according to the first embodiment illustrated in FIG. 1, it is necessary to use a power transistor with a large size, so as to reduce a voltage drop of the transistor. However, if it is difficult to integrate the power transistor into a single semiconductor chip of the semiconductor integrated circuit 10 described above, the power transistor may be formed in a semiconductor chip different from the single semiconductor chip of the semiconductor integrated circuit 10 described above.

In the output control circuit 12, the diode Di can be formed by a PN junction diode, but furthermore, in order to improve the power efficiency of the stabilizing power supply circuit 1, the diode may be formed by a Schottky barrier diode having a smaller forward voltage than the forward voltage of a PN junction diode. In order to decrease the forward voltage of the Schottky barrier diode Di, a special metal is used for a barrier metal, and thereby a barrier height which is dependent on a difference between a work function of the barrier metal and a Fermi potential of semiconductor silicon is lowered. However, if it is difficult to integrate a Schottky barrier diode Di that uses a special metal for a barrier metal into a single semiconductor chip of the semiconductor integrated circuit 10 described above, the diode Di may be formed in a semiconductor chip different from the single semiconductor chip of the semiconductor integrated circuit 10 described above.

As described above, the technology of forming a plurality of semiconductor chops in a single resin-sealed package of the semiconductor integrated circuit 10 is called a system-in-package (SIP) or a multi-chip module (MCP).

The P channel MOS transistor MP1 in the output control circuit 12 can be replaced with an N channel MOS transistor or an NPN type bipolar transistor. In this case, a bootstrap capacitor is connected to a gate or a base of the transistor, and the gate or the base is driven to a higher voltage than the output voltage Vout of the stabilizing power supply circuit 1 by the PWM control circuit 13 and the bootstrap capacitor. As a result, it is possible to reduce the voltage drop at the time of being in an ON state of the N channel MOS transistor or the NPN type bipolar transistor.

In addition, the diode Di of the output control circuit 12 can be replaced with an N channel MOS transistor or an NPN type bipolar transistor. In this case, the transistor can also be integrated into a single semiconductor chip of the semiconductor integrated circuit 10, and can also be formed in a semiconductor chip different from the single semiconductor chip of the semiconductor integrated circuit 10.

<<Phase Compensation Circuit>>

Since the stabilizing power supply circuit 1 is configured as a voltage step-down type switching regulator which uses the low pass filter including the smoothing coil L and the smoothing capacitor C, the phase compensation circuit 14 is connected to the error amplifier 11 in the semiconductor integrated circuit 10. That is, the phase compensation circuit 14 that is connected to the error amplifier 11 of the semiconductor integrated circuit 10 according to the first embodiment of FIG. 1 has a function of preventing abnormal oscillation that occurs when a phase delay of the low pass filter including the smoothing coil L and the smoothing capacitor C reaches approximately 180 degrees, if the equivalent series resistance (ESR) of the smoothing capacitor C of the low pass filter is small, as described in "'Application to smoothing capacitor of switching power supply' pp. 65-69. http://itonet.co.jp/DataSheets/Sanyo Electric/OS-CON/pld/65.pdf [accessed on 2013 Nov. 7]". Meanwhile, the phase compensation circuit 14 is configured with a series connection of a compensation resistor R3 and the compensation capacitor VC1 connected between the output terminal Np2 of the error amplifier 11 and the ground voltage GND.

<<Temperature Dependence of Equivalent Series Resistance of Detection Control Circuit and Electrolytic Capacitor>>

Furthermore, in consideration of the fact that, if the smoothing capacitor C of the low pass filter is configured with an aluminum electrolytic capacitor, the resistance value of the equivalent series resistance (ESR) of the smoothing capacitor C increases significantly at a low temperature, and thereby abnormal oscillation occurs due to an unstable switching regulator, the detection control circuit 15 is connected to the phase compensation circuit 14 of the semiconductor integrated circuit 10 according to the first embodiment illustrated in FIG. 1.

Figure 2:
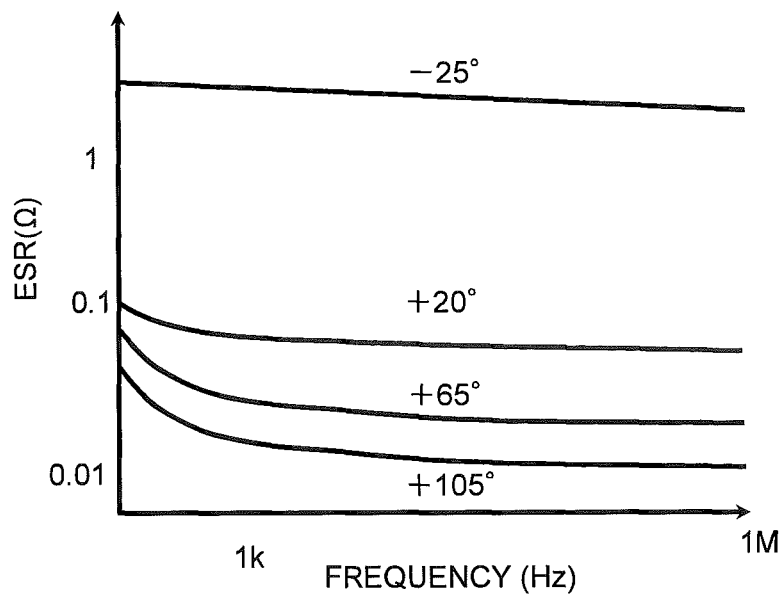
FIG. 2 is a diagram illustrating temperature dependence of an equivalent series resistance (ESR) of an aluminum electrolytic capacitor configuring a smoothing capacitor of a low pass filter that is used for the stabilizing power supply circuit which uses the semiconductor integrated circuit according to the first embodiment illustrated in FIG. 1.

FIG. 2 is a diagram illustrating temperature dependence of the equivalent series resistance (ESR) of the aluminum electrolytic capacitor configuring the smoothing capacitor C of the low pass filter that is used for the stabilizing power supply circuit 1 which uses the semiconductor integrated circuit 10 according to the first embodiment illustrated in FIG. 1.

In FIG. 2, a vertical axis denotes a resistance value of the equivalent series resistance (ESR) of the aluminum electrolytic capacitor configuring the smoothing capacitor C, and a horizontal axis denotes a frequency of the triangular wave signal of the triangular wave generator TWG of the PWM control circuit 13.

The value of the equivalent series resistance ESR increases at a high temperature of +20°, +65°, and +105° as the frequency decreases, particularly when decreasing to a frequency equal to or lower than 1 kHz, but the equivalent series resistance ESR at a high temperature has a smaller resistance value than that of the equivalent series resistance ESR at a low temperature of −25°. The equivalent series resistance ESR at a low temperature of −25° has little dependence on frequency of the triangular wave signal, and has a larger resistance value than that of the equivalent series resistance ESR at a high temperature.

Figure 3:
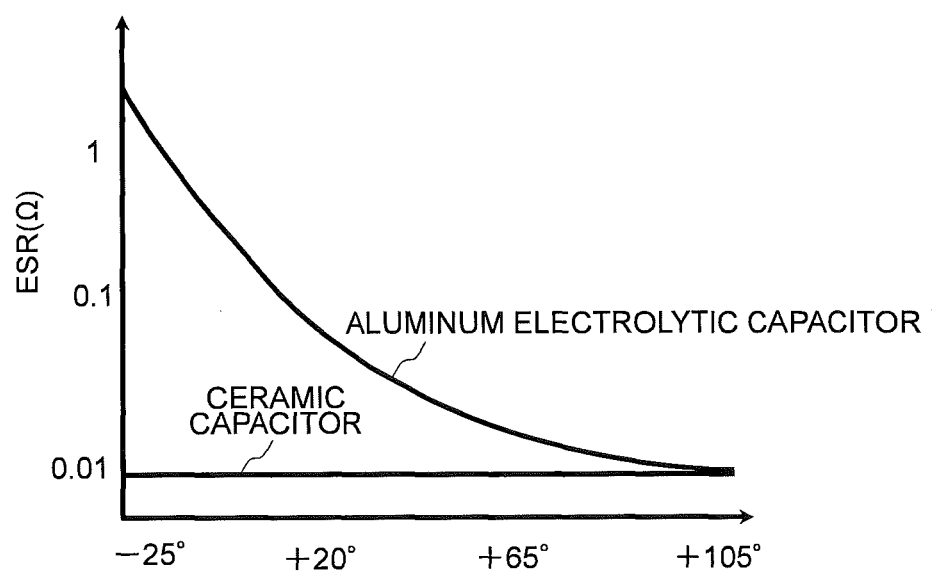
FIG. 3 is a diagram illustrating a comparison result between temperature dependence of the equivalent series resistance of a ceramic capacitor and temperature dependence of the frequency of a specific triangular wave signal of, for example, 1 MHz of the equivalent series resistance of the aluminum electrolytic capacitor configuring the smoothing capacitor of the low pass filter that is used for the stabilizing power supply circuit which uses the semiconductor integrated circuit according to the first embodiment illustrated in FIG. 1.

FIG. 3 is a diagram illustrating a comparison between temperature dependence of the equivalent series resistance (ESR) of a ceramic capacitor and temperature dependence of the frequency of a specific triangular wave signal of, for example, 1 MHz of the equivalent series resistance (ESR) of the aluminum electrolytic capacitor configuring the smoothing capacitor C of the low pass filter that is used for the stabilizing power supply circuit 1 which uses the semiconductor integrated circuit 10 according to the first embodiment illustrated in FIG. 1.

When the magnitude of the equivalent series resistance (ESR) of a low-cost aluminum electrolytic capacitor is compared with temperature dependence of the equivalent series resistance (ESR) of a ceramic capacitor, it can be seen that temperature dependence of the equivalent series resistance (ESR) of a ceramic capacitor with a high cost is extremely small. In addition, furthermore, at a low temperature of −25°, it can be seen that the resistance value of the equivalent series resistance (ESR) of a low-cost aluminum electrolytic capacitor is approximately one hundred times or more than that of the equivalent series resistance (ESR) of a ceramic capacitor with a high cost.

In consideration of the large temperature dependence illustrated in FIG. 2 and FIG. 3, the detection control circuit 15 that is connected to the phase compensation circuit 14 of the semiconductor integrated circuit 10 according to the first embodiment of FIG. 1, detects the temperature variation of the smoothing capacitor C which is configured by an aluminum electrolytic capacitor or the resistance variation due to the temperature variation, and according to the detected result, controls phase compensation characteristics of the phase compensation circuit 14.

In the stabilizing power supply circuit 1 that uses the semiconductor integrated circuit 10 according to the first embodiment of FIG. 1, if the ambient temperature is high, the temperature of the semiconductor integrated circuit 10 and the temperature of the smoothing capacitor C that is configured by an aluminum electrolytic capacitor also become high. At a high temperature, the resistance value of the equivalent series resistance (ESR) of the smoothing capacitor C that is configured by an aluminum electrolytic capacitor in the low pass filter is significantly decreased, and the phase delay of the low pass filter that is configured with the smoothing coil L and the smoothing capacitor C reaches approximately 180 degrees. Meanwhile, since a phase delay of 180 degrees between the inverting input terminal (−) of the error amplifier 11 and the output terminal Np2 exists, the total phase delay of the low pass filter and the error amplifier 11 reaches 360 degrees, and there is a danger that abnormal oscillation may occur due to an unstable switching regulator. In consideration of the danger, in the stabilizing power supply circuit 1 that uses the semiconductor integrated circuit 10 according to the first embodiment illustrated in FIG. 1, the detection control circuit 15 detects the high temperature state and according to the detected result, controls and sets the phase compensation circuit 14 so as to have good phase compensation characteristics. By the operation of the phase compensation circuit 14 that is set so as to have good phase compensation characteristics, the phase delay of the error amplifier 11 having a frequency with a total loop gain of 0 dB of the low pass filter and the error amplifier 11 is controlled so as to be smaller than 180 degrees. As a result, a frequency margin of the frequency in which the total loop gain is 0 dB is secured, and it is possible to reduce a danger that an unstable operation of the switching regulator and abnormal oscillation will occur, at a high temperature. The good phase compensation characteristics of the phase compensation circuit 14 are realized by setting the time constant of a series connection of the compensation resistor R3 and the compensation capacitor VC1 in the phase compensation circuit 14 to a large value, according to the detection control circuit 15. That is, in the example illustrated in FIG. 1, the capacitance value of the compensation capacitor VC1 as a variable capacitance element is set to a large capacitance by the detection control circuit 15.

In the stabilizing power supply circuit 1 that uses the semiconductor integrated circuit 10 according to the first embodiment illustrated in FIG. 1, if the ambient temperature is low, the temperature of the semiconductor integrated circuit 10 and the temperature of the smoothing capacitor C that is configured by an aluminum electrolytic capacitor also become low. At a low temperature, the resistance value of the equivalent series resistance (ESR) of the smoothing capacitor C that is configured by an aluminum electrolytic capacitor in the low pass filter is significantly increased, the phase delay of the low pass filter that is configured with the smoothing coil L and the smoothing capacitor C is less than 180 degrees, and a danger that an unstable operation and abnormal oscillation will occur is reduced. Meanwhile, as the resistance value of the equivalent series resistance (ESR) of the smoothing capacitor C increases, the output voltage ripple of the low pass filter that includes the smoothing coil L and the smoothing capacitor C increases, and thus, there is a danger that a negative feedback control system of the switching regulator may become unstable. In consideration of the danger, in the stabilizing power supply circuit 1 that uses the semiconductor integrated circuit 10 according to the first embodiment illustrated in FIG. 1, the detection control circuit 15 detects the low temperature state and according to the detected result, controls and sets the phase compensation circuit 14 so as to have poor phase compensation characteristics. By the operation of the phase compensation circuit 14 that is set so as to have poor phase compensation characteristics, the gain and the loop gain of the error amplifier 11 having high frequency components of the output voltage ripple are set to be relatively high values. As a result, according to a large loop gain of high frequency components of the output voltage ripple, a strong negative feedback control for the switching regulator is performed, and thus, it is possible to reduce a danger that the negative feedback control system of the switching regulator will become unstable. The poor phase compensation characteristics of the phase compensation circuit 14 are realized by setting the time constant of a series connection of the compensation resistor R3 and the compensation capacitor VC1 in the phase compensation circuit 14 to a small value, according to the detection control circuit 15. That is, in the example illustrated in FIG. 1, the capacitance value of the compensation capacitor VC1 as a variable capacitance element is set to a small capacitance by the detection control circuit 15.

According to a preferred embodiment, the phase compensation circuit 14 and the detection control circuit 15 which are integrated into a single semiconductor chip of the semiconductor integrated circuit 10 according to the first embodiment illustrated in FIG. 1 detect the temperature variation or the resistance variation of the smoothing capacitor C that is configured by an aluminum electrolytic capacitor, using four stages, and according to the detected result, control the phase compensation characteristics of the phase compensation circuit 14, using four stages. Since the detection control circuit 15 can perform four-stage detection, three reference values are used. As a result, it is possible to obtain the phase compensation characteristics of the phase compensation circuit 14 which are optimal for the temperature value or the resistance value of the smoothing capacitor C which is detected at the four stages, using a single low-cost semiconductor chip of the semiconductor integrated circuit 10.

<<<Configuration of Detection Control Circuit>>>

Figure 4:
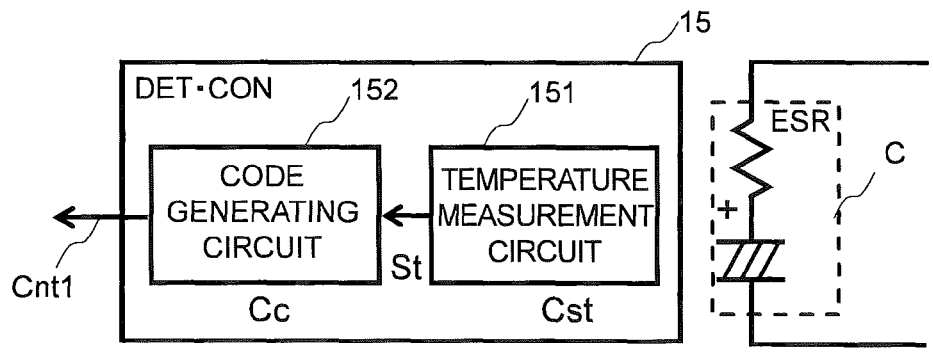
FIG. 4 is a diagram illustrating a configuration of a detection control circuit of the semiconductor integrated circuit according to the first embodiment illustrated in FIG. 1.

FIG. 4 is a diagram illustrating a configuration of the detection control circuit 15 of the semiconductor integrated circuit 10 according to the first embodiment illustrated in FIG. 1.

As illustrated in FIG. 4, the detection control circuit 15 includes a temperature measurement circuit 151 and a code generating circuit 152.

In order to enable an accurate detection of the temperature variation or the resistance variation of the smoothing capacitor C that is configured with an aluminum electrolytic capacitor by means of the detection control circuit 15, it is necessary for the temperature of the temperature measurement circuit 151 of the detection control circuit 15 to accurately coincide with the temperature of the smoothing capacitor C.

After a long time passes, the temperature of the temperature measurement circuit 151 of the detection control circuit 15 and the temperature of the smoothing capacitor C coincide with the ambient temperature of an electronic apparatus that uses the stabilizing power supply circuit 1 which uses the semiconductor integrated circuit 10 according to the first embodiment illustrated in FIG. 1. Thus, after a long time passes, particular means is not required to make the temperature of the temperature measurement circuit 151 of the detection control circuit 15 coincide with the temperature of the smoothing capacitor C.

Meanwhile, after a short time passes, there is a possibility that the temperature of the temperature measurement circuit 151 of the detection control circuit 15 which is embedded in the semiconductor integrated circuit 10 may not coincide with the temperature of the smoothing capacitor C that is configured by an aluminum electrolytic capacitor. For example, if heat generation of the semiconductor integrated circuit 10 is increased by an increase of power consumption of the semiconductor integrated circuit 10, the temperature of the temperature measurement circuit 151 of the detection control circuit 15 will not coincide with the temperature of the smoothing capacitor C that is configured by an aluminum electrolytic capacitor, after a short time, and thus it is difficult to perform a precise detection of the temperature variation or the resistance variation of the smoothing capacitor C.

In order to enable an accurate detection in a short time, it is necessary to couple (thermally couple) the temperature measurement circuit 151 of the detection control circuit 15 that is embedded in the semiconductor integrated circuit 10 and the smoothing capacitor C that is configured by an aluminum electrolytic capacitor together with a low thermal resistance. In order to realize specifically the thermal coupling, on a circuit wiring substrate of an electronic apparatus that uses the stabilizing power supply circuit 1 which uses the semiconductor integrated circuit 10 according to the first embodiment illustrated in FIG. 1, a package in which a semiconductor chip of the semiconductor integrated circuit 10 is sealed is disposed at a short distance from the smoothing capacitor C that is configured by an aluminum electrolytic capacitor. More preferably, by disposing in such a manner that the package and the smoothing capacitor C are indirect contact with each other on the circuit wiring substrate, the thermal coupling can be made between the two, and it is possible to perform an accurate detection of the temperature variation or the resistance variation of the smoothing capacitor C, in a short time.

As a result, the temperature measurement circuit 151 measures the temperature of the smoothing capacitor C that is configured by an aluminum electrolytic capacitor, and supplies an analog signal St resulting from the temperature measurement to an input terminal of the code generating circuit 152. The code generating circuit 152 generates a code signal Cnt1 which is a digital control signal that controls the phase compensation characteristics of the phase compensation circuit 14, according to the analog signal St resulting from the temperature measurement. That is, the code generating circuit 152 performs an A/D conversion that converts the analog signal St into the code signal Cnt1 which is a digital control signal. In addition, the code generating circuit 152 can also include a look-up table for converting the A/D-converted digital signal into another code signal. Furthermore, according to a preferred embodiment, the code signal Cnt1 that is a digital control signal and that is generated by the code generating circuit 152 controls the phase compensation characteristics of the phase compensation circuit 14 using four stages, as described above.

FIG. 5 is a diagram illustrating a configuration of the temperature measurement circuit 151 and the code generating circuit 152 which are included in the detection control circuit 15 according to the first embodiment illustrated in FIG. 4.

As illustrated in FIG. 5, the temperature measurement circuit 151 includes a series connected diode DS and a constant current source CS which are connected in series to each other, and the series connected diode DS is configured with n diodes D1 to Dn which are connected in series to each other. An operation voltage $V_{DD}$ which is an input voltage Vin of the stabilizing power supply circuit 1 is supplied to one end of the constant current source CS, and the other end of the constant current source CS is connected to an anode A of the series connected diodes DS, and thereby the analog signal St is generated. It can be said that in the series connected diodes DS, an anode of the diode D2 is connected to a cathode of the diode Dn, and an anode of the diode D1 is connected to a cathode of the diode D2, and thus, the n diodes D1 to Dn are connected in series in a forward direction. Thus, a constant current from the constant current source flows into the anode A of the series connected diodes DS in a forward direction of the diodes. A cathode K of the series-connected diodes DS is connected to a reference power supply GND. As a result, the n diodes D1 to Dn of the series connected diodes DS respectively generate a forward voltage drop $V_F$.

As is well known, a value of the forward voltage drop $V_F$ of the diode changes due to change in temperature. In a PN junction diode of silicon, a rate of change $\Delta V_F$ of the forward voltage drop $V_F$ varies depending on a value of the current flowing to the diode, but in general, $\Delta V_F$–2 [mV/° C.].

Since the series connected diodes DS of the temperature measurement circuit 151 illustrated in FIG. 5 are configured by the n diodes D1 to Dn that are connected in series, a rate of voltage change $\Delta VF_S$ with respect to the change in temperature of a forward voltage drop $VF_S$ of the series connected diodes DS is $\Delta VF_S$=−2×n [mV/° C.].

Thus, the value of the forward voltage drop $V_F$ of the diode in a case of an ambient temperature T0=25° C. is referred to as $V_{F0}$, and if the number of the diodes D1 to Dn that are connected in series is referred to as n, the forward voltage drop $VF_S$ of the series connected diodes DS in a case of an arbitrary ambient temperature T is represented by the following formula.

$$VF_S=(V_{F0}+\Delta VF\times(T-T0))\times n \qquad \text{Formula (3)}$$

If it is assumed that the forward voltage drop of the diode is $V_{F0}$=0.65 yin a case where the number of series connections n=10 and ambient temperature T0=25° C., the forward voltage drop $VF_S$ of the series connected diodes DS is as follows, in a case where the respective ambient temperatures T are +25° C., +20° C., +° C., and −25° C.

If the ambient temperature T=+25° C., $$VF_S0=(0.65-0.002\times(25-(+25)))\times10=6.5 \text{ [V]}$$

If the ambient temperature T=+20° C., $$VF_S0=(0.65-0.002\times(20-(+25)))\times10=6.6 \text{ [V]}$$

If the ambient temperature T=+0° C., $$VF_S0=(0.65-0.002\times(0-(+25)))\times10=7.0 \text{ [V]}$$

If the ambient temperature T=−25° C., $$VF_S0=(0.65-0.002\times(-25-(+25)))\times10=7.5 \text{ [V]}$$

As illustrated in FIG. 5, the code generating circuit 152 is configured with three voltage comparators CMP1 to CMP3 that perform a parallel operation for configuring a flash type A/D converter which converts the analog signal St into the code signal Cnt1 which is a digital control signal, and three reference voltages Vref1 to Vref3.

The analog signal St resulting from the temperature measurement of the temperature measurement circuit 151 is supplied commonly to inverting input terminals (−) of the three voltage comparators CMP1, CMP2, and CMP3. Meanwhile, a first reference voltage Vref1 is supplied to a non-inverting input terminal (+) of a first voltage comparator CMP1, a second reference voltage Vref2 is supplied to a non-inverting input terminal (+) of a second voltage comparator CMP2, and a third reference voltage Vref3 is supplied to a non-inverting input terminal (+) of a third voltage comparator CMP3.

In order to be able to determine whether or not the ambient temperature T is lower than −25° C. by the first voltage comparator CMP1, the first reference voltage Vref1 is set to 7.5 [V], and in order to be able to determine whether or not the ambient temperature T is lower than +0° C. by the second voltage comparator CMP2, the second reference voltage Vref2 is set to 7.0 [V]. Furthermore, in order to be able to determine whether or not the ambient temperature T is lower than +20° C. by the third voltage comparator CMP3, the third reference voltage Vref3 is set to 6.6 [V].

The code signal Cnt1 which is a digital control signal is configured by three control bit signals Cnt11, Cnt12, and Cnt13 of the three voltage comparators CMP1, CMP2, and CMP3.

If the ambient temperature T is lower than −25° C., the forward voltage drop $VF_S$ of the series connected diodes DS becomes a voltage higher than 7.5 [V]. As a result, the first control bit signal Cnt11 of the first voltage comparator CMP1, the second control bit signal Cnt12 of the second voltage comparator CMP2, and the third control bit signal Cnt13 of the third voltage comparator CMP3 all become a low level "0".

If the ambient temperature T is higher than −25° C. and lower than 0° C., the forward voltage drop $VF_S$ of the series connected diodes DS becomes an intermediate voltage between 7.5 [V] and 7.0 [V]. As a result, the first control bit signal Cnt11 of the first voltage comparator CMP1 becomes a high level "1", and meanwhile, the second control bit signal Cnt12 of the second voltage comparator CMP2, and the third control bit signal Cnt13 of the third voltage comparator CMP3 become a low level "0".

If the ambient temperature T is higher than +0° C. and lower than +25° C., the forward voltage drop $VF_S$ of the series connected diodes DS becomes an intermediate voltage between 7.0 [V] and 6.5 [V]. As a result, the first control bit signal Cnt11 of the first voltage comparator CMP1, and the second control bit signal Cnt12 of the second voltage comparator CMP2 become a high level "1", and meanwhile, the third control bit signal Cnt13 of the third voltage comparator CMP3 becomes a low level "0".

If the ambient temperature T is higher than +25° C., the forward voltage drop $VF_S$ of the series connected diodes DS becomes a voltage lower than 6.5 [V]. As a result, the first control bit signal Cnt11 of the first voltage comparator CMP1, the second control bit signal Cnt12 of the second voltage comparator CMP2, and the third control bit signal Cnt13 of the third voltage comparator CMP3 all become a high level "1".

Figure 6:
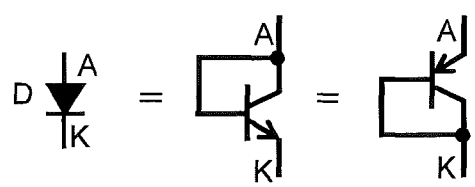
FIG. 6 is a diagram illustrating configurations of each of n diodes of a series connected diode of the temperature measurement circuit illustrated in FIG. 5.

FIG. 6 is a diagram illustrating configurations of each diode of the n diodes D1 to Dn of the series connected diodes DS of the temperature measurement circuit 151 illustrated in FIG. 5.

As illustrated in FIG. 6, an anode A and a cathode k of each diode D can be configured by a common connection point of a collector and a base of an NPN bipolar transistor and an emitter thereof, respectively, and can be configured by an emitter and a common connection point of a base and a collector of a PNP bipolar transistor, respectively.

<<Detection Control Circuit of Another Type>>

Figure 7:
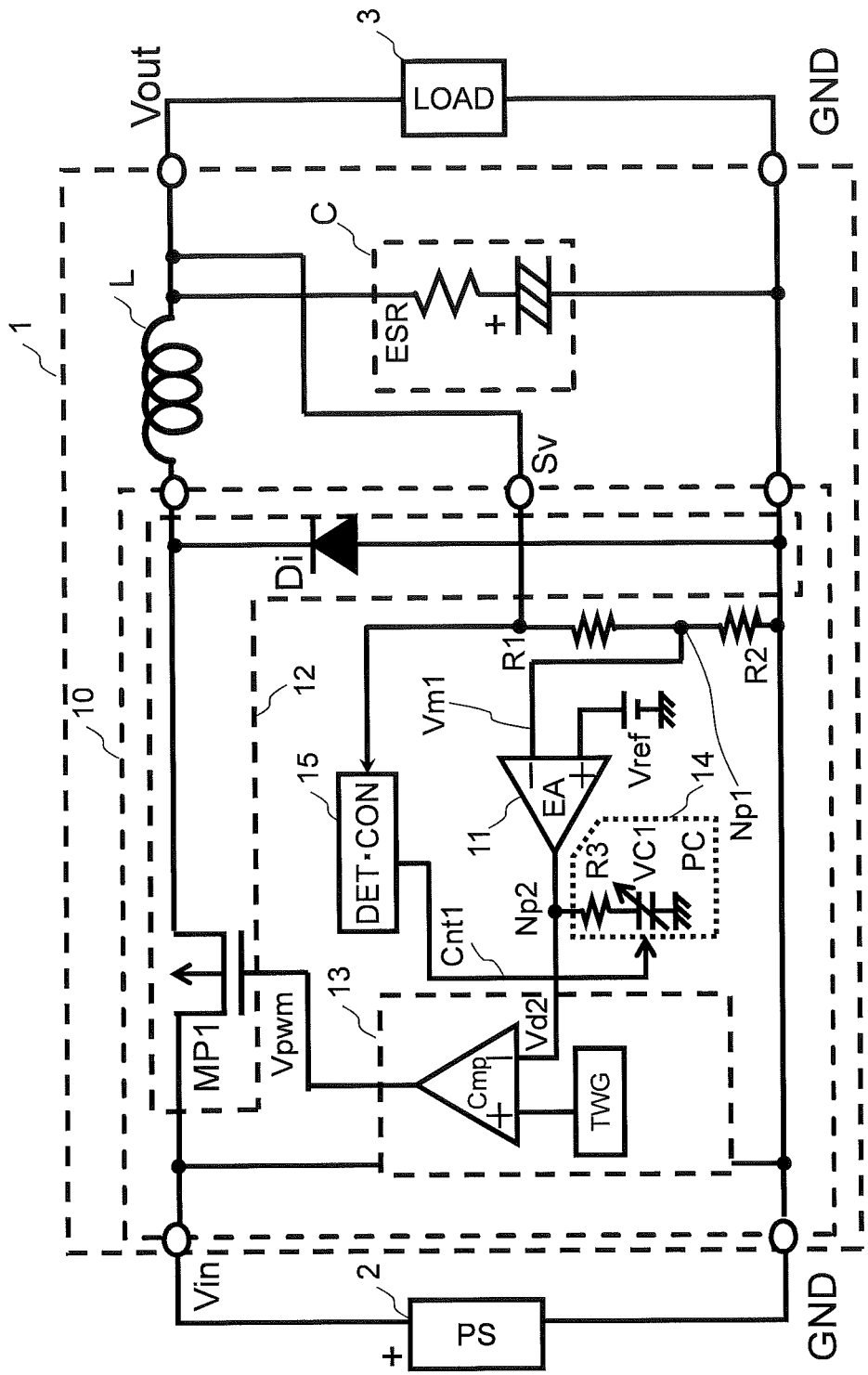
FIG. 7 is a diagram illustrating a configuration of a semiconductor integrated circuit which can detect temperature variation or resistance variation of the smoothing capacitor that is configured by an aluminum electrolytic capacitor, by employing the detection control circuit of another type according to the first embodiment.

FIG. 7 is a diagram illustrating a configuration of the semiconductor integrated circuit 10 which can detect the temperature variation or the resistance variation of the smoothing capacitor C that is configured by an aluminum electrolytic capacitor, by employing the detection control circuit 15 of another type according to the first embodiment. The other configuration of the semiconductor integrated circuit 10 illustrated in FIG. 7 is the same as that of the semiconductor integrated circuit 10 illustrated in FIG. 1, and thus duplicated description thereof will be omitted.

As illustrated in FIG. 7, an input terminal of the detection control circuit 15 of another type is connected to one end of the voltage dividing resistor R1, and furthermore, the output voltage Vout that is generated by the low pass filter which is configured with the smoothing coil L and the smoothing capacitor C is supplied via an external terminal Sv. As a result, the detection control circuit 15 of another type illustrated in FIG. 7 detects a voltage amplitude of the ripple voltage included in the output voltage Vout that is generated by the low pass filter which is configured with the smoothing coil L and the smoothing capacitor C.

A voltage amplitude level of the ripple voltage, which is included in the output voltage Vout of the low pass filter, detected by the detection control circuit 15 of another type illustrated in FIG. 7 is directly proportional to the magnitude of the resistance value of the equivalent series resistance (ESR) of the smoothing capacitor C. Thus, if the smoothing capacitor C is configured by an aluminum electrolytic capacitor, the magnitude of the resistance value of the equivalent series resistance (ESR) of the smoothing capacitor C increases according to a decrease of the ambient temperature, and thereby the voltage amplitude level of the ripple voltage included in the output voltage Vout is also increased.

If the ambient temperature T is higher than +25° C., the resistance value of the equivalent series resistance (ESR) of the smoothing capacitor C becomes a minimum value, the voltage amplitude level of the ripple voltage included in the output voltage Vout also becoming a minimum value.

If the ambient temperature T is higher than +0° C. and lower than +25° C., the resistance value of the equivalent series resistance (ESR) of the smoothing capacitor C becomes a resistance value slightly higher than the minimum value, the voltage amplitude level of the ripple voltage included in the output voltage Vout also becoming a level slightly higher than the minimum value.

If the ambient temperature T is higher than −25° C. and lower than +0° C., the resistance value of the equivalent series resistance (ESR) of the smoothing capacitor C becomes a resistance value considerably higher than the minimum value, the voltage amplitude level of the ripple voltage included in the output voltage Vout also becoming a level considerably higher than the minimum value.

If the ambient temperature T is lower than −25° C., the resistance value of the equivalent series resistance (ESR) of the smoothing capacitor C becomes a maximum value, the voltage amplitude level of the ripple voltage included in the output voltage Vout also becoming a maximum value.

Figure 8:
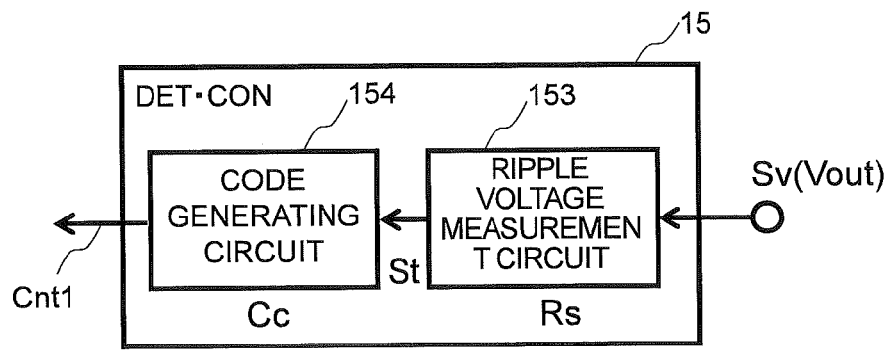
FIG. 8 is a diagram illustrating another configuration of the detection control circuit of the semiconductor integrated circuit according to the first embodiment illustrated in FIG. 1.

FIG. 8 is a diagram illustrating another configuration of the detection control circuit 15 of the semiconductor integrated circuit 10 according to the first embodiment illustrated in FIG. 1.

As illustrated in FIG. 8, the detection control circuit 15 of another type illustrated in FIG. 7 includes a ripple voltage measurement circuit 153 and a code generating circuit 154.

The ripple voltage measurement circuit 153 measures the voltage amplitude level of the ripple voltage included in the output voltage Vout that is generated by the low pass filter which is configured with the smoothing coil L and the smoothing capacitor C, and supplies the analog signal St resulting from the ripple voltage measurement to an input terminal of the code generating circuit 154. The code generating circuit 154 generates the code signal Cnt1 which is a digital control signal that controls the phase compensation characteristics of the phase compensation circuit 14, according to the analog signal St resulting from the ripple voltage measurement. That is, the code generating circuit 154 performs an A/D conversion that converts the analog signal St into the code signal Cnt1 which is a digital control signal. In addition, the code generating signal 154 can also include a look-up table for converting the A/D-converted digital signal into another code signal. Furthermore, according to a preferred embodiment, the code signal Cnt1 that is a digital control signal and that is generated by the code generating circuit 154 controls the phase compensation characteristics of the phase compensation circuit 14 using four stages, as described above.

FIG. 9 is a diagram illustrating a configuration of the ripple voltage measurement circuit 153 and the code generating circuit 154 which are included in the detection control circuit 15 of another type illustrated in FIG. 8.

As illustrated in FIG. 9, the ripple voltage measurement circuit 153 includes a sample and hold circuit S/H, and the output voltage Vout that is generated by the low pass filter which is configured with the smoothing coil L and the smoothing capacitor C is supplied to an input terminal of the sample and hold circuit S/H via an external terminal Sv. Thus, the sample and hold circuit S/H samples and holds a peak value of the voltage amplitude level of the ripple voltage included in the output voltage Vout, and then supplies the analog signal St resulting from the ripple voltage measurement to an input terminal of the code generating circuit 154. As illustrated in FIG. 9, the sample and hold circuit S/H of the ripple voltage measurement circuit 153 is configured with a sampling switch 1531 and a hold capacitor 1532. Since the sampling switch 1531 is controlled so as to be in an ON state while being sampled by a sampling clock φs, the peak value of the voltage amplitude level of the ripple voltage included in the output voltage Vout is sampled in the hold capacitor 1532 via the external terminal Sv. Thereafter, the sampling switch 1531 is controlled so as to be in an OFF state while being held by the sampling clock φs, and the peak value of the voltage amplitude level of the ripple voltage is held in the hold capacitor 1532. In this way, the peak value (analog signal St resulting from the ripple voltage measurement) of the voltage amplitude level of the ripple voltage that is held in the hold capacitor 1532 is supplied to the input terminal of the code generating circuit 154. Meanwhile, in the sample and hold circuit S/H of the ripple voltage measurement circuit 153, the sampling switch 1531 can be configured by a MOS transistor or the like, and the hold capacitor 1532 can be configured by a MOS capacitor, a PN junction capacitor or the like.

A frequency of the ripple voltage of the output voltage Vout can be considered to be equal to a frequency of a triangular wave signal that is generated by a triangular wave generator TWG which controls an ON-OFF-switching operation of a P channel MOS transistor MP1 and a diode Di of the output control circuit 12. Thus, the sampling clock φs that is supplied to the sampling switch 1531 of the sample and hold circuit S/H of the ripple voltage measurement circuit 153 can be generated from the triangular wave signal that is generated by the triangular wave generator TWG.

As illustrated in FIG. 9, the code generating circuit 154 is configured with three voltage comparators CMP1 to CMP3 that perform a parallel operation for configuring a flash type A/D converter which converts the analog signal St into the code signal Cnt1 which is a digital control signal, and three reference voltages Vref1 to Vref3.

The analog signal St resulting from the ripple voltage measurement of the ripple voltage measurement circuit 153 is supplied commonly to inverting input terminals (−) of the three voltage comparators CMP1, CMP2, and CMP3. Meanwhile, a first reference voltage Vref1 is supplied to a non-inverting input terminal (+) of a first voltage comparator CMP1, a second reference voltage Vref2 is supplied to a non-inverting input terminal (+) of a second voltage comparator CMP2, and a third reference voltage Vref3 is supplied to a non-inverting input terminal (+) of a third voltage comparator CMP3.

In order to be able to determine whether or not the ambient temperature T is lower than −25° C. by the first voltage comparator CMP1, the first reference voltage Vref1 is set to a maximum voltage, and in order to be able to determine whether or not the ambient temperature T is lower than +0° C. by the second voltage comparator CMP2, the second reference voltage Vref2 is set to an intermediate voltage. Furthermore, in order to be able to determine whether or not the ambient temperature T is lower than +20° C. by the third voltage comparator CMP3, the third reference voltage Vref3 is set to a minimum voltage.

The code signal Cnt1 which is a digital control signal is configured by three control bit signals Cnt11, Cnt12, and Cnt13 of the three voltage comparators CMP1, CMP2, and CMP3.

If the ambient temperature T is lower than −25° C., the resistance value of the equivalent series resistance (ESR) of the smoothing capacitor C becomes a maximum value, and thereby the analog signal St resulting from the ripple voltage measurement becomes a voltage higher than one of the three reference voltages Vref1, Vref2, and Vref3. As a result, a first control bit signal Cnt11 of the first voltage comparator CMP1, a second control bit signal Cnt12 of the second voltage comparator CMP2, and a third control bit signal Cnt13 of the third voltage comparator CMP3 all become a low level "0".

If the ambient temperature T is higher than −25° C. and lower than +0° C., the resistance value of the equivalent series resistance (ESR) of the smoothing capacitor C becomes a value slightly lower than the maximum value, and thereby the analog signal St resulting from the ripple voltage measurement becomes an intermediate voltage between the first reference voltage Vref1 and the second reference voltage Vref2. As a result, while the first control bit signal Cnt11 of the first voltage comparator CMP1 becomes a high level "1", the second control bit signal Cnt12 of the second voltage comparator CMP2, and the third control bit signal Cnt13 of the third voltage comparator CMP3 become a low level "0".

If the ambient temperature T is higher than +0° C. and lower than +25° C., the resistance value of the equivalent series resistance (ESR) of the smoothing capacitor C becomes a value considerably lower than the maximum value, and thereby the analog signal St resulting from the ripple voltage measurement becomes another intermediate voltage between the second reference voltage Vref2 and the third reference voltage Vref3. As a result, while the first control bit signal Cnt11 of the first voltage comparator CMP1 and the second control bit signal Cnt12 of the second voltage comparator CMP2 become a high level "1", the third control bit signal Cnt13 of the third voltage comparator CMP3 becomes a low level "0".

If the ambient temperature T is higher than +25° C., the resistance value of the equivalent series resistance (ESR) of the smoothing capacitor C becomes a minimum value, and thereby the analog signal St resulting from the ripple voltage measurement becomes a voltage lower than the third reference voltage Vref3. As a result, the first control bit signal Cnt11 of the first voltage comparator CMP1, the second control bit signal Cnt12 of the second voltage comparator CMP2, and the third control bit signal Cnt13 of the third voltage comparator CMP3 all become a high level "1".

<<Configuration and Operation of Phase Compensation Circuit>>

Figures 10, 11, 12:
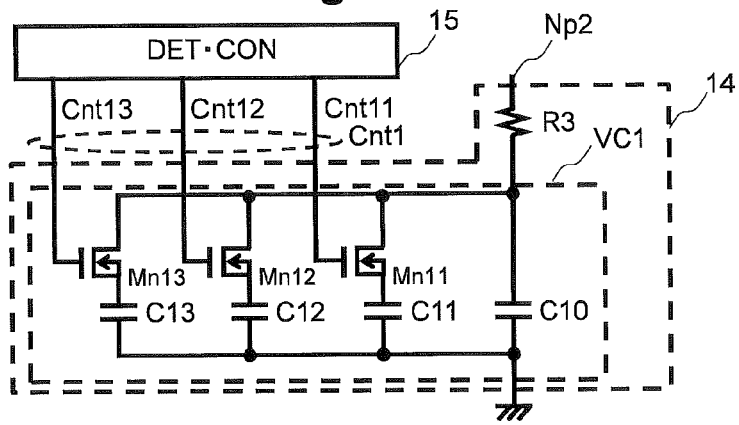
FIG. 10 is a diagram illustrating a configuration of a phase compensation circuit, phase compensation characteristics of which are controlled according to the detected result of the detection control circuit, in the stabilizing power supply circuit which uses the semiconductor integrated circuit according to the first embodiment illustrated in FIG. 1 or FIG. 7.
FIG. 11 is a diagram for explaining an operation of the phase compensation circuit according to the first embodiment illustrated in FIG. 10.
FIG. 12 is a diagram for explaining an operation of the phase compensation circuit according to the first embodiment illustrated in FIGS. 1 to 6.

FIG. 10 is a diagram illustrating a configuration of the phase compensation circuit 14, the phase compensation characteristics of which are controlled according to the detected result of the detection control circuit 15, in the stabilizing power supply circuit 1 which uses the semiconductor integrated circuit 10 according to the first embodiment illustrated in FIG. 1 or FIG. 7.

As illustrated in FIG. 10, the phase compensation circuit 14 is configured with a series connection of a compensation resistor R3 and a compensation capacitor VC1 connected between an output terminal Np2 of the error amplifier 11 and the ground voltage GND. Particularly, the compensation capacitor VC1 is configured with a base capacitor C10, a first capacitor C11, a second capacitor C12, a third capacitor C13, a first switching element Mn11, a second switching element Mn12, and a third switching element Mn13. A first series connection of the first capacitor C11 and the first switching element Mn11, a second series connection of the second capacitor C12 and the second switching element Mn12, and a third series connection of the third capacitor C13 and the third switching element Mn13 are connected in parallel between both ends of the base capacitor C10. In the phase compensation circuit 14 illustrated in FIG. 10, the first switching element Mn11, the second switching element Mn12, and the third switching element Mn13 are respectively configured by an N channel MOS transistor.

As illustrated in FIG. 10, a first control input terminal of the first switching element Mn11, a second control input terminal of the second switching element Mn12, and a third control input terminal of the third switching element Mn13 of the phase compensation circuit 14 are respectively controlled by three control bit signals Cnt11, Cnt12, and Cnt13 of the code signal Cnt1, which is a digital control signal, that is generated by the detection control circuit 15.

FIG. 11 is a diagram for explaining an operation of the phase compensation circuit 14 according to the first embodiment illustrated in FIG. 10.

As described above, the detection control circuit 15 detects the temperature variation or the resistance variation of the smoothing capacitor C that is configured by an aluminum electrolytic capacitor using four stages, and in a first row of FIG. 11, the code signal Cnt1, which is a digital control signal, resulting from the four stage detection is illustrated.

In the code signal Cnt1, which is a digital control signal, in a first state "0" corresponding to a state where the ambient temperature T is lower than −25° C., as illustrated in a second row to a fourth row of a first column in FIG. 11, the first control bit signal Cnt11, the second control bit signal Cnt12, and the third control bit signal Cnt13 all become a low level "0" (Off). As a result, the first switching element Mn11, the second switching element Mn12, and the third switching element Mn13 of the phase compensation circuit 14 all enter an Off state. Thus, as illustrated in a fifth row of the first column in FIG. 11, the compensation capacitor VC1 of the phase compensation circuit 14 becomes the base capacitor C10 only, and the phase compensation circuit 14 is set to a first time constant with a minimum value, which is the product of the compensation resistor R3 and the base capacitor C10. As a result, by the code signal Cnt1, which is a digital control signal, in the first state "0" corresponding to a state where the ambient temperature T is lower than −25° C., the phase compensation circuit 14 is set to the poorest phase compensation characteristics.

In the code signal Cnt1, which is a digital control signal, in a second state "1" corresponding to a state where the ambient temperature T is higher than −25° C. and lower than +0° C., as illustrated in a second row to a fourth row of a second column in FIG. 11, the first control bit signal Cnt11 becomes a high level "1" (On), and the second control bit signal Cnt12 and the third control bit signal Cnt13 become a low level "0" (Off). As a result, in the phase compensation circuit 14, the first switching element Mn11 enters an On state, and the second switching element Mn12 and the third switching element Mn13 enter an Off state. Thus, as illustrated in a fifth row of the second column in FIG. 11, the compensation capacitor VC1 of the phase compensation circuit 14 becomes capacitors C10+C11 in which the base capacitor C10 and the first capacitor C11 are added together, and the phase compensation circuit 14 is set to a second time constant that is slightly larger than the minimum value which is the product of the compensation resistor R3 and the added capacitors C10+C11. As a result, by the code signal Cnt1, which is a digital control signal, in the second state "1" corresponding to a state where the ambient temperature T is higher than −25° C. and lower than +0° C., the phase compensation circuit 14 is set to slightly poor phase compensation characteristics.

In the code signal Cnt1, which is a digital control signal, in a third state "2" corresponding to a state where the ambient temperature T is higher than +0° C. and lower than +25° C., as illustrated in a second row to a fourth row of a third column in FIG. 11, the first control bit signal Cnt11 and the second control bit signal Cnt12 become a high level "1" (On), and the third control bit signal Cnt13 becomes a low level "0" (Off). As a result, in the phase compensation circuit 14, the first switching element Mn11 and the second switching element Mn12 enter an On state, and the third switching element Mn13 enters an Off state. Thus, as illustrated in a fifth row of the third column in FIG. 11, the compensation capacitor VC1 of the phase compensation circuit 14 becomes capacitors C10+C11+C12 in which the base capacitor C10, the first capacitor C11, and the second capacitor C12 are added together, and the phase compensation circuit 14 is set to a third time constant that is considerably larger than the minimum value which is a multiplied value of the compensation resistor R3 and the added capacitors C10+C11+C12. As a result, by the code signal Cnt1, which is a digital control signal, in the third state "2" corresponding to a state where the ambient temperature T is higher than +0° C. and lower than +25° C., the phase compensation circuit 14 is set to slightly good phase compensation characteristics.

In the code signal Cnt1, which is a digital control signal, in a fourth state "3" corresponding to a state where the ambient temperature T is higher than +25° C., as illustrated in a second row to a fourth row of a fourth column in FIG. 11, the first control bit signal Cnt11, the second control bit signal Cnt12, and the third control bit signal Cnt13 all become a high level "1" (On). As a result, the first switching element Mn11, the second switching element Mn12, and the third switching element Mn13 of the phase compensation circuit 14 all enter an On state. Thus, as illustrated in a fifth row of the fourth column in FIG. 11, the compensation capacitor VC1 of the phase compensation circuit 14 becomes capacitors C10+C11+C12+C13 in which the base capacitor C10, the first capacitor C11, the second capacitor C12, and the third capacitor C13 are added together, and the phase compensation circuit 14 is set to a fourth time constant with a maximum value, which is a multiplied value of the compensation resistor R3 and the added capacitors C10+C11+C12+C13. As a result, by the code signal Cnt1, which is a digital control signal, in the fourth state corresponding to a state where the ambient temperature T is higher than +25° C., the phase compensation circuit 14 is set to the best phase compensation characteristics.

FIG. 12 is a diagram for explaining an operation of the phase compensation circuit 14 according to the first embodiment illustrated in FIGS. 1 to 6.

FIG. 12 illustrates that the ambient change in temperature using four stages and the change in temperature of the forward voltage drop $VF_S$ of the series connected diodes DS using four stages are added to FIG. 11.

Figures 13, 14:
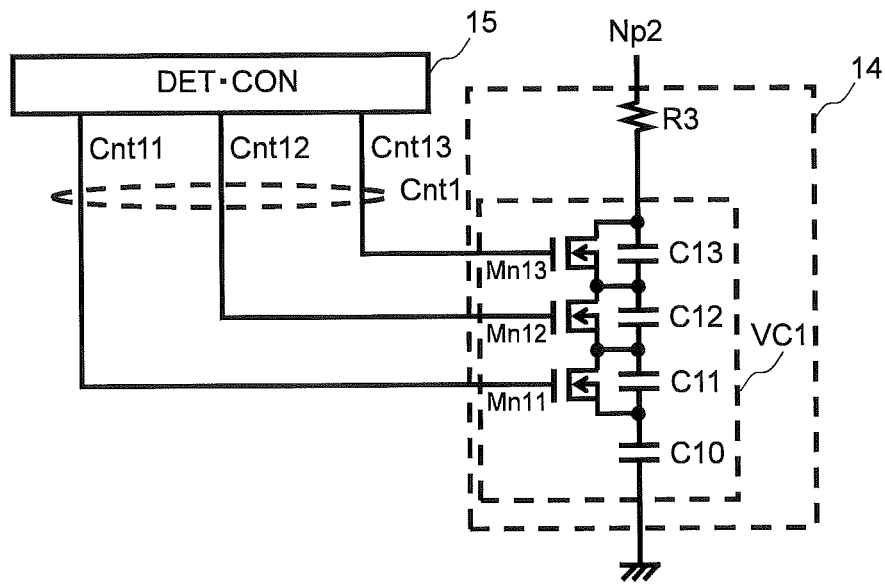
FIG. 13 is a diagram illustrating another configuration of the phase compensation circuit, phase compensation characteristics of which are controlled according to the detected result of the detection control circuit, in the stabilizing power supply circuit which uses the semiconductor integrated circuit according to the first embodiment illustrated in FIG. 1 or 7.
FIG. 14 is a diagram for explaining an operation of the phase compensation circuit according to the first embodiment illustrated in FIG. 13.

FIG. 13 is a diagram illustrating another configuration of the phase compensation circuit 14 in which phase compensation characteristics are controlled according to the detected result of the detection control circuit 15, in the stabilizing power supply circuit 1 which uses the semiconductor integrated circuit 10 according to the first embodiment illustrated in FIG. 1 or 7.

As illustrated in FIG. 13, the phase compensation circuit 14 is configured with the compensation resistor R3 and the compensation capacitor VC1 which are connected in series between the output terminal Np2 of the error amplifier 11 and the ground voltage GND. Particularly, the compensation capacitor VC1 is configured with the base capacitor C10, the first capacitor C11, the second capacitor C12, the third capacitor C13, the first switching element Mn11, the second switching element Mn12, and the third switching element Mn13. A first parallel connection of the first capacitor C11 and the first switching element Mn11, a second parallel connection of the second capacitor C12 and the second switching element Mn12, and a third parallel connection of the third capacitor C13 and the third switching element Mn13 are connected in series to the base capacitor C10 and the compensation capacitor VC1. In the phase compensation circuit 14 illustrated in FIG. 13, the first switching element Mn11, the second switching element Mn12, and the third switching element Mn13 are respectively configured by an N channel MOS transistor.

As illustrated in FIG. 13, the first control input terminal of the first switching element Mn11, the second control input terminal of the second switching element Mn12, the third control input terminal of the third switching element Mn13 of the phase compensation circuit 14 are controlled by the three control bit signals Cnt11, Cnt12, and Cnt13 of the code signal Cnt1 which is a digital control signal and which is generated by the detection control circuit 15, respectively.

FIG. 14 is a diagram for explaining an operation of the phase compensation circuit 14 according to the first embodiment illustrated in FIG. 13.

As illustrated above, the detection control circuit 15 detects the temperature variation or the resistance variation of the smoothing capacitor C that is configured by an aluminum electrolytic capacitor, using four stages, and in a first row of FIG. 11, the code signal Cnt1 which is a digital control signal and which results from the detection using four stages is illustrated.

In the code signal Cnt1, which is a digital control signal, in a first state "0" corresponding to a state where the ambient temperature T is lower than −25° C., as illustrated in a second row to a fourth row of a fourth column in FIG. 14, the first control bit signal Cnt11, the second control bit signal Cnt12, and the third control bit signal Cnt13 all become a low level "0" (Off). As a result, the first switching element Mn11, the second switching element Mn12, and the third switching element Mn13 of the phase compensation circuit 14 all enter an Off state. Thus, as illustrated in a fifth row of the fourth column in FIG. 14, the compensation capacitor VC1 of the phase compensation circuit 14 becomes four serial capacitors of the base capacitor C10, the first capacitor C11, the second capacitor C12, and the third capacitor C13, and the phase compensation circuit 14 is set to a first time constant with a minimum value, which is a multiplied value of the compensation resistor R3 and the four serial capacitors. As a result, by the code signal Cnt1, which is a digital control signal, in the first state "0" corresponding to a state where the ambient temperature T is lower than −25° C., the phase compensation circuit 14 is set to the poorest phase compensation characteristics.

In the code signal Cnt1, which is a digital control signal, in a second state "1" corresponding to a state where the ambient temperature T is higher than −25° C. and lower than +0° C., as illustrated in a second row to a fourth row of a third column in FIG. 14, the first control bit signal Cnt11 and the second control bit signal Cnt12 become a low level "0" (Off), and the third control bit signal Cnt13 becomes a high level "1" (On). As a result, in the phase compensation circuit 14, the first switching element Mn11 and the second switching element Mn12 enter an Off state, and the third switching element Mn13 enters an On state. Thus, as illustrated in a fifth row of the third column in FIG. 14, the compensation capacitor VC1 of the phase compensation circuit 14 becomes three serial capacitors of the base capacitor C10, the first capacitor C11, and the second capacitor C12, and the phase compensation circuit 14 is set to a second time constant that is slightly larger than the minimum value which is a multiplied value of the compensation resistor R3 and the three serial capacitors. As a result, by the code signal Cnt1, which is a digital control signal, in the second state "1" corresponding to a state where the ambient temperature T is higher than −25° C. and lower than +0° C., the phase compensation circuit 14 is set to slightly poor phase compensation characteristics.

In the code signal Cnt1, which is a digital control signal, in a third state "2" corresponding to a state where the ambient temperature T is higher than +0° C. and lower than +25° C., as illustrated in a second row to a fourth row of a third column in FIG. 14, the first control bit signal Cnt11 becomes a low level "0" (Off), and the second control bit signal Cnt12 and the third control bit signal Cnt13 become a high level "1" (On). As a result, in the phase compensation circuit 14, the first switching element Mn11 enters an Off state, and the second switching element Mn12 and the third switching element Mn13 enter an On state. Thus, as illustrated in a fifth row of the third column in FIG. 14, the compensation capacitor VC1 of the phase compensation circuit 14 becomes two serial capacitors of the base capacitor C10 and the first capacitor C11, and the phase compensation circuit 14 is set to a third time constant that is considerably larger than the minimum value which is a multiplied value of the compensation resistor R3 and the two serial capacitors. As a result, by the code signal Cnt1, which is a digital control signal, in the third state "2" corresponding to a state where the ambient temperature T is higher than +0° C. and lower than +25° C., the phase compensation circuit 14 is set to slightly good phase compensation characteristics.

In the code signal Cnt1, which is a digital control signal, in a fourth state "3" corresponding to a state where the ambient temperature T is higher than +25° C., as illustrated in a second row to a fourth row of a fourth column in FIG. 14, the first control bit signal Cnt11, the second control bit signal Cnt12, and the third control bit signal Cnt13 all become a high level "1" (On). As a result, the first switching element Mn11, the second switching element Mn12, and the third switching element Mn13 of the phase compensation circuit 14 all enter an On state. Thus, as illustrated in a fifth row of the fourth column in FIG. 14, the compensation capacitor VC1 of the phase compensation circuit 14 becomes the base capacitor C10 only, and the phase compensation circuit 14 is set to a fourth time constant with a maximum value, which is a multiplied value of the compensation resistor R3 and the base capacitor C10. As a result, by the code signal Cnt1, which is a digital control signal, in the fourth state "3" corresponding to a state where the ambient temperature T is higher than +25° C., the phase compensation circuit 14 is set to the best phase compensation characteristics.

Figures 15, 16:
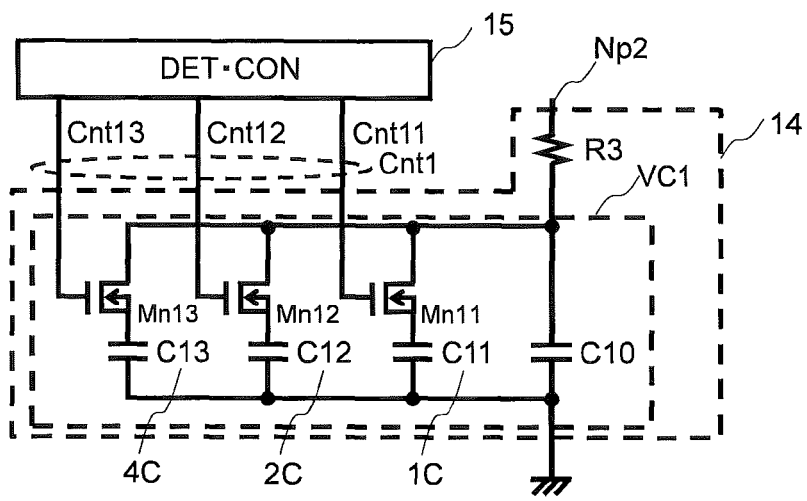
FIG. 15 is a diagram illustrating another configuration of the phase compensation circuit, phase compensation characteristics of which are controlled according to the detected result of the detection control circuit, in the stabilizing power supply circuit which uses the semiconductor integrated circuit according to the first embodiment illustrated in FIG. 1 or FIG. 7.
FIG. 16 is a diagram for explaining an operation of the phase compensation circuit according to the first embodiment illustrated in FIG. 15.

FIG. 15 is a diagram illustrating another configuration of the phase compensation circuit 14 in which the phase compensation characteristics are controlled according to the detected result of the detection control circuit 15, in the stabilizing power supply circuit 1 which uses the semiconductor integrated circuit 10 according to the first embodiment illustrated in FIG. 1 or FIG. 7.

The circuit connection configuration of the phase compensation circuit 14 illustrated in FIG. 15 is entirely the same as the circuit connection configuration of the phase compensation circuit 14 illustrated in FIG. 10. However, the phase compensation circuit 14 illustrated in FIG. 15 is different from the phase compensation circuit 14 illustrated in FIG. 10 in that a capacitance value of the first capacitor C11, a capacitance value of the second capacitor C12, and a capacitance value of the third capacitor C13 are weighted by "1", "2", and "4", respectively, according to the ratio of binary weightings.

FIG. 16 is a diagram explaining an operation of the phase compensation circuit 14 according to the first embodiment illustrated in FIG. 15.

The circuit operation of the phase compensation circuit 14 of FIG. 15 illustrated in FIG. 16 is different from the circuit operation of the phase compensation circuit 14 of FIG. 10 illustrated in FIG. 11, in that the detection control circuit 15 of FIG. 15 detects the temperature variation or the resistance variation of the smoothing capacitor C that is configured by an aluminum electrolytic capacitor or the like, through eight stages, not four stages. For the eight stage detection, a voltage comparison using seven reference values is performed. As such, according to the detected result of the detection control circuit 15 illustrated in FIG. 15 through the eight stages, the time constant of the phase compensation circuit 14 illustrated in FIG. 15 is set to eight stages. That is, in the code signal Cnt1, which is a digital control signal, in a first state "0" corresponding to a state where the ambient temperature T is a minimum temperature, the phase compensation circuit 14 is set to a first time constant with a minimum value which is a multiplied value of the compensation resistor R3 and the base capacitor C10, and the phase compensation circuit 14 is set to the poorest phase compensation characteristics. Furthermore, in the code signal Cnt1, which is a digital control signal, in an eighth state "7" corresponding to a state where the ambient temperature T is a maximum temperature, the phase compensation circuit 14 is set to an eighth time constant with a maximum value which is a multiplied value of the compensation resistor R3 and the added capacitors C10+7c, and the phase compensation circuit 14 is set to the best phase compensation characteristics.

<<Semiconductor Integrated Circuit Employing Phase Compensation Circuit of Another Type>>

Figure 17:
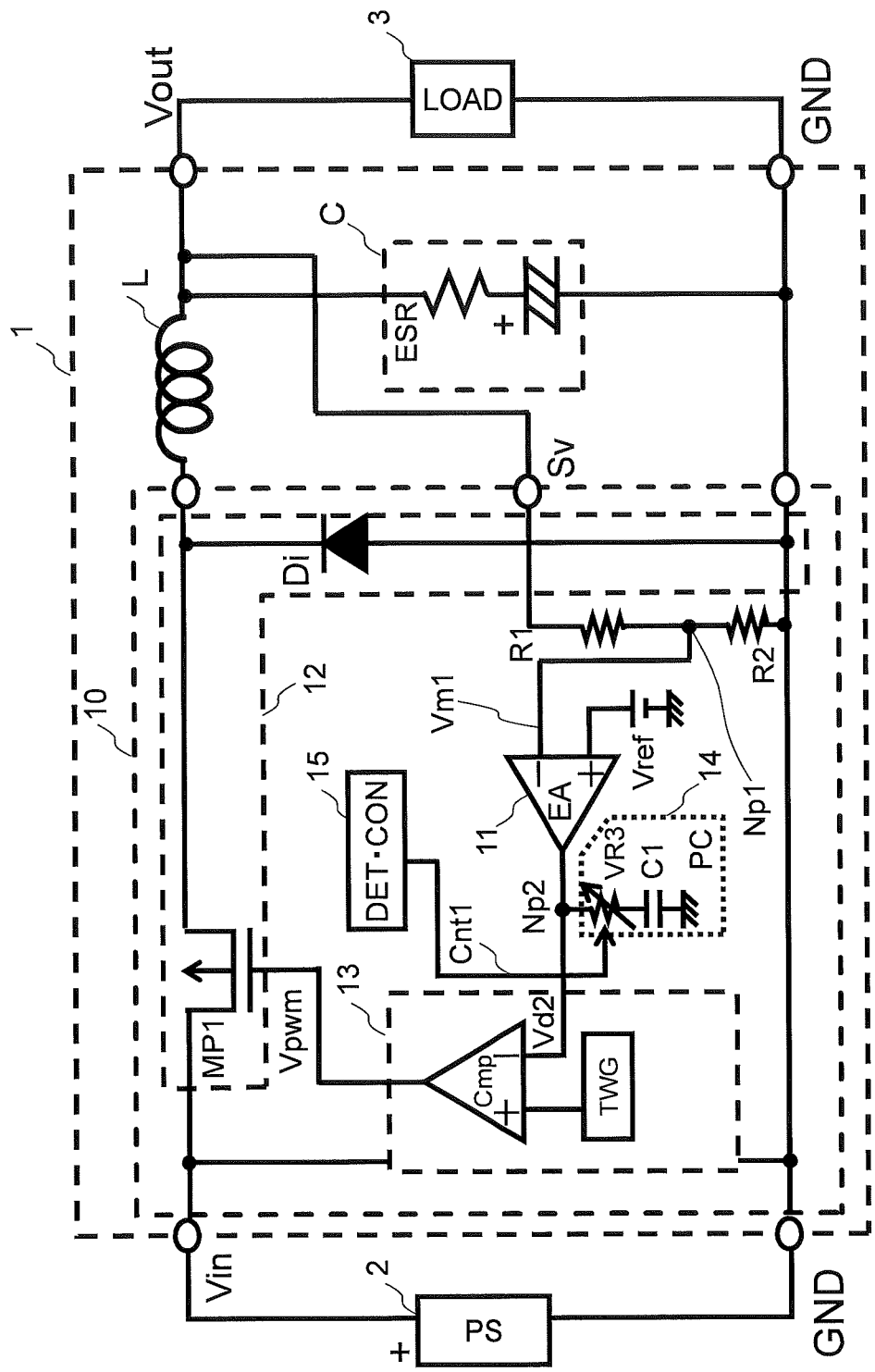
FIG. 17 is a diagram illustrating a configuration of the semiconductor integrated circuit which employs the phase compensation circuit of another type according to the first embodiment.

FIG. 17 is a diagram illustrating a configuration of the semiconductor integrated circuit 10 which employs the phase compensation circuit 14 of another type according to the first embodiment.

The phase compensation circuit 14 of the semiconductor integrated circuit 10 according to the first embodiment illustrated in FIG. 1 and FIG. 7 is configured with a variable capacitor in which a capacitance value of the compensation capacitor VC1 is variably controlled by the code signal Cnt1 which is a digital control signal and which is generated by the detection control circuit 15. In contrast to this, the phase compensation circuit 14 of the semiconductor integrated circuit 10 according to the first embodiment illustrated in FIG. 17, sets a compensation capacitor C1 so as to have a fixed capacitance value, and is configured with a variable resistor VR3 in which a resistance value of the compensation resistor R3 is variably controlled by the code signal Cnt1 which is a digital control signal and which is generated by the detection control circuit 15. Another configuration of the semiconductor integrated circuit 10 according to the first embodiment illustrated in FIG. 17 is entirely the same as that of the semiconductor integrated circuit 10 according to the first embodiment illustrated in FIG. 1 and FIG. 7, and thus, duplicated description thereof will be omitted.

Figure 18:
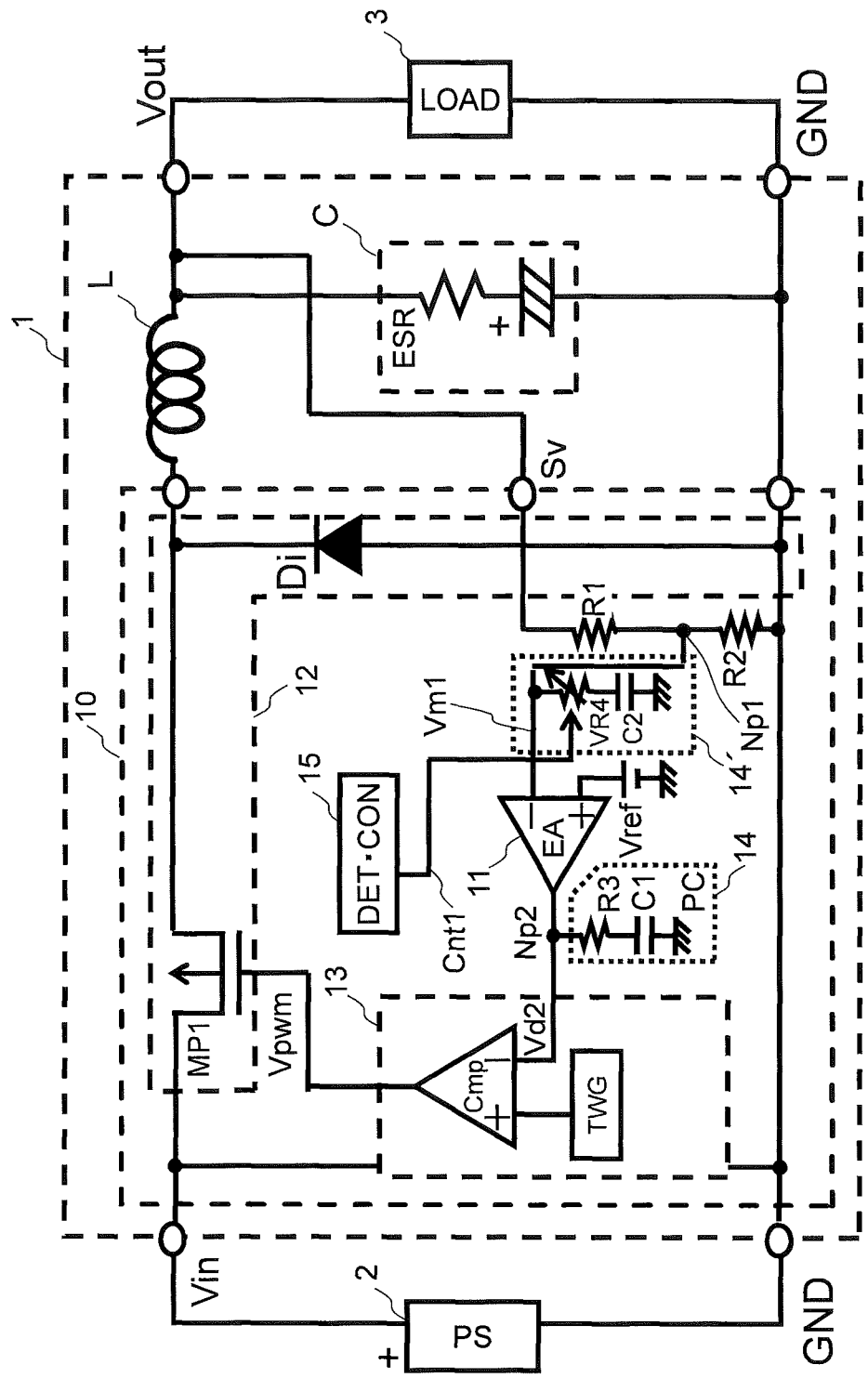
FIG. 18 is a diagram illustrating a configuration of the semiconductor integrated circuit which employs the phase compensation circuit of still another type according to the first embodiment.

FIG. 18 is a diagram illustrating a configuration of the semiconductor integrated circuit 10 which employs the phase compensation circuit 14 of still another type according to the first embodiment.

The semiconductor integrated circuit 10 according to the first embodiment illustrated in FIG. 18 is different from the semiconductor integrated circuit 10 according to the first embodiment illustrated in FIG. 17, in that in the semiconductor integrated circuit 10 of FIG. 18, a compensation capacitor C1 of the phase compensation circuit 14 that is connected between the output terminal Np2 of the error amplifier 11 and the ground voltage GND has a fixed capacitance value, and the compensation resistor R3 has also a fixed resistance value, at an initial time. Another different point is that in the semiconductor integrated circuit 10 according to the first embodiment of FIG. 18, a phase compensation circuit 14', phase compensation characteristics of which are controlled by the detection control circuit 15 that detects the temperature variation or the resistance variation of the smoothing capacitor C configured by an aluminum electrolytic capacitor using four stages, is connected between the inverting input terminal of the error amplifier 11 and the ground voltage GND. The phase compensation circuit 14' is configured with a compensation resistor VR4 and a compensation capacitor C2 which are connected in series between the inverting input terminal of the error amplifier 11 and the ground voltage GND. In the phase compensation circuit 14', the compensation capacitor C2 has a fixed capacitor value, and the resistance value of the compensation resistor VR4 is controlled by a variable resistor that is variably controlled by the code signal Cnt1 which is a digital control signal and which is generated by the detection control circuit 15.

The phase compensation circuit 14' and the detection control circuit 15 which are integrated into a single semiconductor chip of the semiconductor integrated circuit 10 according to the first embodiment illustrated in FIG. 18, detect the temperature variation or the resistance variation of the smoothing capacitor C that is configured by an aluminum electrolytic capacitor using four stages, and control the phase compensation characteristics of the phase compensation circuit 14' using four stages, according to the detected result. As a result, it is possible to realize the phase compensation characteristics of the phase compensation circuit 14', which is optimal for a temperature value or a resistance value of the smoothing capacitor C that is detected through the four stages, by using a single low-cost semiconductor chip of the semiconductor integrated circuit 10.

Figures 19, 20:
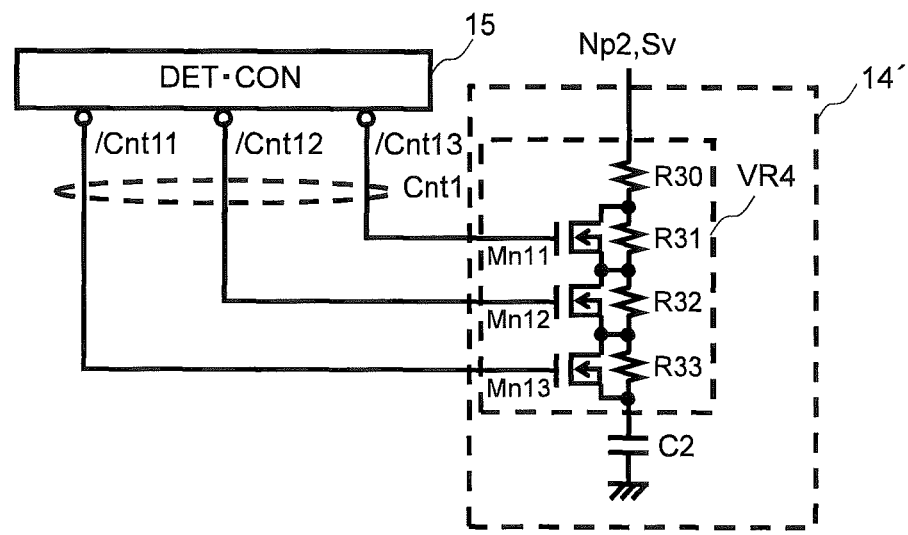
FIG. 19 is a diagram illustrating a configuration of the phase compensation circuit, the phase compensation characteristics of which are controlled according to the detected result of the detection control circuit, in the stabilizing power supply circuit which uses the semiconductor integrated circuit according to the first embodiment illustrated in FIG. 18.
FIG. 20 is a diagram for explaining an operation of the phase compensation circuit according to the first embodiment illustrated in FIG. 19.

FIG. 19 is a diagram illustrating a configuration of the phase compensation circuit 14', the phase compensation characteristics of which are controlled according to the detected result of the detection control circuit 15, in the stabilizing power supply circuit 1 which uses the semiconductor integrated circuit 10 according to the first embodiment illustrated in FIG. 18.

As illustrated in FIG. 19, the phase compensation circuit 14' is configured with a series connection of a compensation resistor VR4 and a compensation capacitor C2 connected between the output terminal Np2 of the error amplifier 11 and the ground voltage GND. Particularly, the compensation resistor VR4 is configured with a base resistor R30, a first resistor R31, a second resistor R32, a third resistor R33, the first switching element Mn11, the second switching element Mn12, and the third switching element Mn13. A first parallel connection of the first resistor R31 and the first switching element Mn11, a second parallel connection of the second resistor R32 and the second switching element Mn12, and a third parallel connection of the third resistor R33 and the third switching element Mn13, are connected in series to the base resistor R30 and the compensation capacitor C2. In the phase compensation circuit 14' illustrated in FIG. 19, the first switching element Mn11, the second switching element Mn12, and the third switching element Mn13 are respectively configured by an N channel MOS transistor.

As illustrated in FIG. 19, a first control input terminal of the first switching element Mn11, a second control input terminal of the second switching element Mn12, and a third control input terminal of the third switching element Mn13 of the phase compensation circuit 14', are controlled by three inverted control bit signals /Cnt11, /Cnt12 and /Cnt13 of the code signal Cnt1 which is a digital control signal and which is generated by the detection control circuit 15, respectively. The three inverted control bit signals /Cnt11, /Cnt12 and /Cnt13 of which are generated by the detection control circuit 15 illustrated in FIG. 19, correspond to the inverted signals of the three control bit signals Cnt11, Cnt12 and Cnt13 of the code signal Cnt1 which is a digital control signal and which is generated by the detection control circuit 15 of FIG. 10.

FIG. 20 is a diagram for explaining an operation of the phase compensation circuit 14' according to the first embodiment illustrated in FIG. 19.

As described above, the detection control circuit 15 detects the temperature variation or the resistance variation of the smoothing capacitor C that is configured by an aluminum electrolytic capacitor using four stages, and in the first row of the FIG. 11, the code signal Cnt1 which is a digital control signal and which results from the four stage detection is illustrated.

In the code signal Cnt1, which is a digital control signal, in a first state "0" corresponding to a state where the ambient temperature T is lower than −25° C., as illustrated in a second row to a fourth row of a first column in FIG. 20, the first inverted control bit signal /Cnt11, the second inverted control bit signal /Cnt12, and the third inverted control bit signal /Cnt13 all become a high level "1" (On). As a result, in the phase compensation circuit 14', the first switching element Mn11, the second switching element Mn12, and the third switching element Mn13 all enter an On state. Thus, as illustrated in a fifth row of the first column in FIG. 20, the compensation resistor VR4 of the phase compensation circuit 14' becomes the base resistor R30 only, and the phase compensation circuit 14' is set to a first time constant with a minimum value, which is a multiplied value of the compensation capacitor C2 and the base resistor R30. As a result, by the code signal Cnt1, which is a digital control signal, in the first state "0" corresponding to a state where the ambient temperature T is lower than −25° C., the phase compensation circuit 14' is set to the poorest phase compensation characteristics.

In the code signal Cnt1, which is a digital control signal, in a second state "1" corresponding to a state where the ambient temperature T is higher than −25° C. and lower than +0° C., as illustrated in a second row to a fourth row of a second column in FIG. 20, the first inverted control bit signal /Cnt11 becomes a low level "0" (Off), and the second inverted control bit signal /Cnt12 and the third inverted control bit signal /Cnt13 become a high level "1" (On). As a result, in the phase compensation circuit 14', the first switching element Mn11 enters an Off state, and the second switching element Mn12 and the third switching element Mn13 enter an On state. Thus, as illustrated in a fifth row of the second column in FIG. 20, the compensation resistor VR4 of the phase compensation circuit 14' becomes two serial resistors of the base resistor R30 and the first resistor R31, and the phase compensation circuit 14' is set to a second time constant with a value slightly larger than the minimum value, which is a multiplied value of the compensation capacitor C2 and the two serial resistors. As a result, by the code signal Cnt1, which is a digital control signal, in the second state "1" corresponding to a state where the ambient temperature T is higher than −25° C. and lower than +0° C., the phase compensation circuit 14' is set to slightly poor phase compensation characteristics.

In the code signal Cnt1, which is a digital control signal, in a third state "2" corresponding to a state where the ambient temperature T is higher than +0° C. and lower than +25° C., as illustrated in a second row to a fourth row of a third column in FIG. 20, the first inverted control bit signal /Cnt11 and the second inverted control bit signal /Cnt12 become a low level "0" (Off), and the third inverted control bit signal /Cnt13 becomes a high level "1" (On). As a result, in the phase compensation circuit 14', the first switching element Mn11 and the second switching element Mn12 enter an Off state, and the third switching element Mn13 enters an On state. Thus, as illustrated in a fifth row of the third column in FIG. 20, the compensation resistor VR4 of the phase compensation circuit 14' becomes three serial resistors of the base resistor R30, the first resistor R31, and the second resistor R32, and the phase compensation circuit 14' is set to a third time constant with a value considerably larger than the minimum value, which is a multiplied value of the compensation capacitor C2 and the three serial resistors. As a result, by the code signal Cnt1, which is a digital control signal, in the third state "2" corresponding to a state where the ambient temperature T is higher than +0° C. and lower than +25° C., the phase compensation circuit 14' is set to slightly good phase compensation characteristics.

In the code signal Cnt1, which is a digital control signal, in a fourth state "3" corresponding to a state where the ambient temperature T is higher than +25° C., as illustrated in a second row to a fourth row of a fourth column in FIG. 20, the first inverted control bit signal /Cnt11, the second inverted control bit signal /Cnt12, and the third inverted control bit signal /Cnt13 all become a low level "0" (Off). As a result, in the phase compensation circuit 14', the first switching element Mn11, the second switching element Mn12, and the third switching element Mn13 all enter an Off state. Thus, as illustrated in a fifth row of the fourth column in FIG. 20, the compensation resistor VR4 of the phase compensation circuit 14' becomes four serial resistors of the base resistor R30, the first resistor R31, the second resistor R32, and the third resistor R33, and the phase compensation circuit 14' is set to a fourth time constant with a maximum value, which is a multiplied value of the compensation capacitor C2 and the four resistors. As a result, by the code signal Cnt1, which is a digital control signal, in the fourth state "3" corresponding to a state where the ambient temperature T is higher than +25° C., the phase compensation circuit 14' is set to the best phase compensation characteristics.

<<Phase Compensation Characteristics According to Temperature Change>>

<<Phase Compensation Characteristics at the Time of Minimum Temperature>>

FIG. 21 is a diagram illustrating phase compensation characteristics at the time of minimum temperature (a state of temperature lower than −25° C.) of the stabilizing power supply circuit 1 which uses the semiconductor integrated circuit 10 according to the first embodiment, which is described with reference to FIGS. 1 to 20.

In the first diagram of FIG. 21, frequency dependence L1 (LT) of the gain Gain (LC) of the low pass filter LC that is configured with the smoothing coil L and the smoothing capacitor C which generate output voltage Vout is illustrated. A cutoff frequency fc of the low pass filter LC is given by the following formula.

$$fc = 1/2\pi\sqrt{LC} \quad \text{Formula (4)}$$

At a frequency f lower than the cutoff frequency fc, the gain Gain (LC) of the low pass filter LC becomes approximately 0 dB, and at a frequency f higher than the cutoff frequency fc, the gain Gain (LC) of the low pass filter LC is attenuated in an attenuation rate of approximately −40 dB/dec. Furthermore, a peak characteristic is illustrated, in which at the frequency f coinciding with the cutoff frequency fc, the gain Gain (LC) of the low pass filter LC rises to a value larger than 0 dB.

In the second diagram of FIG. 21, frequency dependence L2 (LT) of the phase delay Phase (LC) of the low pass filter LC that is configured with the smoothing coil L and the smoothing capacitor C which generate output voltage Vout is illustrated.

At the time of minimum temperature (a state of temperature lower than −25° C.), the equivalent series resistance (ESR) of the smoothing capacitor C that is configured by an aluminum electrolytic capacitor becomes a maximum, and thus, as illustrated in the frequency dependence L2 (LT), the phase delay Phase (LC) of the low pass filter LC becomes a value smaller than −180 degrees. This coincides with description in which the phase delay of the LC filer is smaller than 180 degrees due to the influence of the equivalent series resistance (ESR) of the output smoothing capacitor described in "'Application note surface mounted chopper type switching regulator IC SI-8000JD series' pp. 1-29, Sanken Electric Co., Ltd., 2010, January http://www.semicon.sanken-ele.co.jp/sk_content/si-80xxjdseries_an_jp.pdf [accessed on 2013Nov. 7]".

In the third diagram of FIG. 21, frequency dependence of the gain of the error amplifier 11 is illustrated. The frequency dependence L3 (LT) indicates the frequency dependence of the gain of the error amplifier 11 in a state where the phase compensation circuit 14 or the phase compensation circuit 14' is not connected to the error amplifier 11. As such, the gain Gain (EA) of the error amplifier 11 that is in a state where phase compensation is not performed, includes a first pole P1, a second pole P2, and the like, as illustrated in the third diagram of FIG. 21. The first pole P1 and the second pole P2 are caused by the delay of a front stage amplifier, the delay of a rear stage amplifier, and the like of a multiple stage amplifier that configures the error amplifier 11. In the first pole P1, the gain Gain (EA) of the error amplifier 11 is attenuated by 3 dB, and furthermore, if the frequency f is high, the gain Gain (EA) is attenuated by 20 dB/dec. Furthermore, in the second pole P2, the gain Gain (EA) of the error amplifier 11 is attenuated by 3 dB, and furthermore, if the frequency f is high, the gain Gain (EA) is attenuated by 40 dB/dec. In addition, if the frequency f is high, the gain Gain (EA) is decreased to a value equal to or less than 0 dB.

In the fourth diagram of FIG. 21, frequency dependence of the phase delay of the error amplifier 11 is illustrated. Frequency dependence L5 (LT) indicates the frequency dependence of the phase delay of the error amplifier 11 in a state where the phase compensation circuit 14 or the phase compensation circuit 14' is not connected to the error amplifier 11. The phase delay in a state where phase compensation is not performed in the first pole P1 reaches −45°. Furthermore, if the frequency f is high, the phase delay in a state where the phase compensation is not performed reaches −90°, and thereafter the phase delay in a state where phase compensation is not performed in the second pole P2 reaches −135°. Furthermore, if the frequency f is high, the phase delay in a state where the phase compensation is not performed exceeds −180°. There is a danger that in a crossover frequency in which the gain Gain (EA) in a state where the phase compensation is not performed is 0 dB, a sufficient phase margin may not be realized by the frequency dependence L5 (LT), and the stabilizing power supply circuit 1 that uses the semiconductor integrated circuit 10 according to the first embodiment may become unstable or abnormally oscillate.

In order to reduce the danger at the time of minimum temperature (a state of temperature lower than −25° C.), the time constant of the phase compensation circuit 14 or the phase compensation circuit 14' that is connected to the error amplifier 11 is set to a minimum value, and the poorest phase compensation characteristics are set. That is, since the time constant of the phase compensation circuit 14 or the phase compensation circuit 14' is set to a minimum value, the frequency dependence of the gain of the error amplifier 11 is changed from the frequency dependence L3 (LT) to the frequency dependence L4 (LT), as illustrated in the third diagram of FIG. 21. Thus, by this change, the first pole moves from the first pole P1 in a state where the phase compensation is not performed to a first pole P1' in which the weakest phase compensation is performed.

By the movement of the first pole, the frequency dependence of the phase delay of the error amplifier 11 is changed from the frequency dependence L5 (LT) to the frequency dependence L6 (LT), as illustrated in the fourth diagram of FIG. 21. As such, it can be understood that after the frequency dependence of the phase delay of the error amplifier 11 is changed from the frequency dependence L5 (LT) to the frequency dependence L6 (LT), a sufficient phase margin is realized by the frequency dependence L6 (LT), in a crossover frequency in which the gain Gain (EA) in a state where the phase compensation is performed becomes 0 dB.

At the time of minimum temperature (a state of a temperature lower than −25° C.), since the equivalent series resistance (ESR) of the smoothing capacitor C that is configured by an aluminum electrolytic capacitor has a maximum value, there is a danger that the output voltage ripple of the low pass filter including the smoothing coil L and the smoothing capacitor C will increase, the negative feedback control system of the switching regulator becoming unstable. However, at the time of minimum temperature (a state of temperature lower than −25° C.), since the phase compensation circuit 14 or the phase compensation circuit 14' is set to the poorest phase compensation characteristics by the detection control circuit 15, the gain Gain (EA) of the error amplifier 11 in which the poorest phase compensation characteristics are performed is set to a relatively large value, at a relatively high frequency of the output voltage ripple. Thus, the output voltage ripple of the low pass filter is sufficiently suppressed by the gain Gain (EA) with a relatively large value of the error amplifier 11 in which the poorest phase compensation characteristics are performed, and thus, it is possible to reduce a danger that the negative feedback control system of the switching regulator will become unstable.

Meanwhile, it is illustrated in the fourth diagram of FIG. 21 that the frequency fp (LT) of the first pole P1' according to the performance of the weakest phase compensation at the time of minimum temperature is a higher frequency than the frequency fp (HT) of the first pole P1" according to the performance of the strongest phase compensation at the time of maximum temperature, which is described in FIG. 22.

The frequency fp (LT) of the first pole P1' according to the performance of the weakest phase compensation at the time of minimum temperature (a state of temperature lower than −25° C.) illustrated in the fourth diagram of FIG. 21, is given by a time constant R3C10 with a minimum value in the phase compensation circuit 14 illustrated in FIG. 10, as represented by the following formula.

$$fp(LT)=1/2\pi R3VC1=1/2\pi R3C10 \quad \text{Formula (5)}$$

The frequency fp (LT) of the first pole P1' according to the performance of the poorest phase compensation at the time of minimum temperature (a state of temperature lower than −25° C.) illustrated in the fourth diagram of FIG. 21, is given by a time constant R3((1/C10)+(1/C11)+(1/C12)+(1/C13)) with a minimum value in the phase compensation circuit 14 illustrated in FIG. 13, as represented by the following formula.

$$fp(LT)=1/2\pi R3VC1=1/2\pi R3((1/C10)+(1/C11)+(1/C12)+(1/C13)) \quad \text{Formula (6)}$$

The frequency fp (LT) of the first pole P1' according to the performance of the poorest phase compensation at the time of minimum temperature (a state of temperature lower than −25° C.) illustrated in the fourth diagram of FIG. 21, is given by a time constant R3C10 with a minimum value in the phase compensation circuit 14 illustrated in FIG. 15, as represented by the following formula.

$$fp(LT)=1/2\pi R3VC1=1/2\pi R3C10 \quad \text{Formula (7)}$$

The frequency fp (LT) of the first pole P1' according to the performance of the poorest phase compensation at the time of minimum temperature (a state of temperature lower than −25° C.) illustrated in the fourth diagram of FIG. 21, is given by a time constant R30C2 with a minimum value in the phase compensation circuit 14' illustrated in FIG. 19, as represented by the following formula.

$$fp(LT)=1/2\pi VR4C2=1/2\pi R30C2 \quad \text{Formula (8)}$$

<<Phase Compensation Characteristics at the Time of Maximum Temperature>>

FIG. 22 is a diagram illustrating phase compensation characteristics at the time of maximum temperature (a state of temperature higher than +25° C.) of the stabilizing power supply circuit 1 that uses the semiconductor integrated circuit 10 according to the first embodiment which is described with reference to FIGS. 1 to 20.

In the first diagram of FIG. 22, frequency dependence L1 (HT) of the gain Gain (LC) of the low pass filter LC that is configured with the smoothing coil L and the smoothing capacitor C which generate output voltage Vout is illustrated. A cutoff frequency fc of the low pass filter LC is given by the above formula (4).

At a frequency f lower than the cutoff frequency fc, the gain Gain (LC) of the low pass filter LC becomes approximately 0 dB, and at a frequency f higher than the cutoff frequency fc, the gain Gain (LC) of the low pass filter LC is attenuated in an attenuation rate of approximately −40 dB/dec. Furthermore, a peak characteristic is illustrated, in which at the frequency f coinciding with the cutoff frequency fc, the gain Gain (LC) of the low pass filter LC rises to a value larger than 0 dB.

In the second diagram of FIG. 22, frequency dependence L2 (HT) of the phase delay Phase (LC) of the low pass filter LC that is configured with the smoothing coil L and the smoothing capacitor C which generate output voltage Vout is illustrated.

At the time of maximum temperature (a state of temperature higher than +25° C.), the equivalent series resistance (ESR) of the smoothing capacitor C that is configured by an aluminum electrolytic capacitor becomes a minimum, and thus, as illustrated in the frequency dependence L2 (HT), the phase delay Phase (LC) of the low pass filter LC reaches approximately −180 degrees. This coincides with description in which the phase delay is delayed by approximately 180 degrees, in the LC filer that uses the output smoothing capacitor having the small equivalent series resistance (ESR) described in "' Application to smoothing capacitor of switching power supply' pp. 65-69. http://itonet.co.jp/DataSheets/Sanyo Electric/OS-CON/pld/65.pdf [accessed on 2013 Nov. 7]".

In the third diagram of FIG. 22, frequency dependence of the gain of the error amplifier 11 is illustrated. The frequency dependence L3 (HT) indicates the frequency dependence of the gain of the error amplifier 11 in a state where the phase compensation circuit 14 or the phase compensation circuit 14' is not connected to the error amplifier 11. As such, the gain Gain (EA) of the error amplifier 11 that is in a state where the phase compensation is not performed, includes the first pole P1, the second pole P2, and the like, as illustrated in the third diagram of FIG. 22. The first pole P1 and the second pole P2 are caused by the delay of a front stage amplifier, the delay of a rear stage amplifier, and the like of a multiple stage amplifier that configures the error amplifier 11. In the first pole P1, the gain Gain (EA) of the error amplifier 11 is attenuated by 3 dB, and furthermore, if the frequency f is high, the gain Gain (EA) is attenuated by 20 dB/dec. Furthermore, in the second pole P2, the gain Gain (EA) of the error amplifier 11 is attenuated by 3 dB, and furthermore, if the frequency f is high, the gain Gain (EA) is attenuated by 40 dB/dec. In addition, if the frequency f is high, the gain Gain (EA) is decreased to a value equal to or less than 0 dB.

In the fourth diagram of FIG. 22, frequency dependence of the phase delay of the error amplifier 11 is illustrated. Frequency dependence L5 (HT) indicates the frequency dependence of the phase delay of the error amplifier 11 in a state where the phase compensation circuit 14 or the phase compensation circuit 14' is not connected to the error amplifier 11. The phase delay in a state where phase compensation is not performed in the first pole P1 reaches −45°. Furthermore, if the frequency f is high, the phase delay in a state where the phase compensation is not performed reaches −90°, and thereafter the phase delay in a state where phase compensation is not performed in the first pole P2 reaches −135°. Furthermore, if the frequency f is high, the phase delay in a state where the phase compensation is not performed exceeds −180°. There is a danger that in a crossover frequency in which the gain Gain (EA) in a state where the phase compensation is not performed is 0 dB, a sufficient phase margin may not be realized by the frequency dependence L5 (HT), and the stabilizing power supply circuit 1 that uses the semiconductor integrated circuit 10 according to the first embodiment may become unstable or abnormally oscillate. Particularly, the phase delay Phase (LC) of the low pass filter LC of −180° caused by the minimum equivalent series resistance (ESR) of the smoothing capacitor C that is configured by an aluminum electrolytic capacitor at the time of maximum temperature (a state of temperature higher than +25° C.), and the phase delay of the error amplifier 11 of −180° add up to a total phase delay of −360°, and thereby a danger of an unstable operation or abnormal oscillation increases significantly.

In order to reduce the danger at the time of maximum temperature (a state of temperature higher than +25° C.), the time constant of the phase compensation circuit 14 or the phase compensation circuit 14' that is connected to the error amplifier 11 is set to a maximum value, and the best phase compensation characteristics are set. That is, since the time constant of the phase compensation circuit 14 or the phase compensation circuit 14' is set to a maximum value, the frequency dependence of the gain of the error amplifier 11 is changed from the frequency dependence L3 (HT) to the frequency dependence L4 (HT), as illustrated in the third diagram of FIG. 22. Thus, by this change, the first pole moves from the first pole P1 in a state where the phase compensation is not performed to a first pole P1" in a state where the strongest phase compensation is performed.

By the movement of the first pole, the frequency dependence of the phase delay of the error amplifier 11 is changed from the frequency dependence L5 (HT) to the frequency dependence L6 (HT), as illustrated in the fourth diagram of FIG. 22. As such, it can be understood that after the frequency dependence of the phase delay of the error amplifier 11 is changed from the frequency dependence L5 (HT) to the frequency dependence L6 (HT), a sufficient phase margin is realized by the frequency dependence L6 (HT), in a crossover frequency in which the gain Gain (EA) in a state where the phase compensation is performed becomes 0 dB.

At the time of maximum temperature (a state of temperature higher than +25° C.), since the equivalent series resistance (ESR) of the smoothing capacitor C that is configured by an aluminum electrolytic capacitor has a minimum value, there is little danger that the phase delay of the low pass filter including the smoothing coil L and the smoothing capacitor C may reach −180°, the negative feedback control system of the switching regulator becoming unstable. Thus, even if at the time of maximum temperature, the phase compensation circuit 14 or the phase compensation circuit 14' is set to the best phase compensation characteristics by the detection control circuit 15, and the gain Gain (EA) of the error amplifier 11 is set to a relatively small value at a relatively high frequency of the output voltage ripple, it is possible to sufficiently reduce the output voltage ripple by the low pass filter with minimum equivalent series resistance (ESR) of the smoothing capacitor C. Furthermore, since a sufficient phase margin can be secured by a crossover frequency in which the gain Gain (EA) of the error amplifier 11 becomes 0 dB due to the best phase compensation characteristics at the time of maximum temperature, it is possible to effectively reduce a danger of an unstable operation or abnormal oscillation which is considerably increased.

Furthermore, it is illustrated in the fourth diagram of FIG. 22 that the frequency fp (HT) of the first pole P1" according to the performance of the strongest phase compensation at the time of maximum temperature is a lower frequency than the frequency fp (LT) of the first pole P1' according to the performance of the weakest phase compensation at the time of minimum temperature, which is described in FIG. 21.

Meanwhile, the stabilizing power supply circuit 1 that uses the semiconductor integrated circuit 10 according to the first embodiment illustrated in FIGS. 1 to 20 performs not only the weakest phase compensation at the time of minimum temperature (a state of temperature lower than −25° C.) illustrated in FIG. 21, and the strongest phase compensation at the time of maximum temperature (a state of temperature higher than +25° C.) illustrated in FIG. 22, but also the phase compensation operation that is further described below so as to perform the phase compensation characteristics of the four stages described above. That is, the stabilizing power supply circuit 1 that uses the semiconductor integrated circuit 10 according to the first embodiment illustrated in FIGS. 1 to 20 is configured in such a manner that the relatively weak phase compensation operation at the low temperature (a state of temperature higher than −25° C. and lower than +0° C.), and the relatively strong phase compensation operation at the high temperature (a state of temperature higher than +0° C. and lower than +25° C.) are performed.

The frequency fp (HT) of the first pole P1" according to the performance of the strongest phase compensation at the time of maximum temperature (a state of temperature higher than +25° C.) illustrated in the fourth diagram of FIG. 22, is given by a time constant R3(C10+C11+C12+C13) with a maximum value in the phase compensation circuit 14 illustrated in FIG. 10, as represented by the following formula.

$$fp(HT)=1/2\pi R3VC1=1/2\pi R3(C10+C11+C12+C13) \quad \text{Formula (9)}$$

The frequency fp (HT) of the first pole P1" according to the performance of the strongest phase compensation at the time of maximum temperature (a state of temperature higher than +25° C.) illustrated in the fourth diagram of FIG. 21, is given by a time constant R3C10 with a maximum value in the phase compensation circuit 14 illustrated in FIG. 13, as represented by the following formula.

$$fp(HT)=1/2\pi R3VC1=1/2\pi R3C10 \quad \text{Formula (10)}$$

The frequency fp (HT) of the first pole P1" according to the performance of the strongest phase compensation at the time of maximum temperature (a state of temperature higher than +25° C.) illustrated in the fourth diagram of FIG. 21, is given by a time constant R3(C10+7C) with a maximum value in the phase compensation circuit 14 illustrated in FIG. 15, as represented by the following formula.

$$fp(HT) = 1/2\pi R3VC1$$
$$= 1/2\pi R3(C10+7C) \quad \text{Formula (11)}$$

The frequency fp (HT) of the first pole P1" according to the performance of the strongest phase compensation at the time of maximum temperature (a state of temperature higher than +25° C.) illustrated in the fourth diagram of FIG. 21, is given by a time constant (R30+R31+R32+R33)C2 with a minimum value in the phase compensation circuit 14' illustrated in FIG. 19, as represented by the following formula.

$$fp(HT) = 1/2\pi VR4C2$$
$$= 1/2\pi(R30 + R31 + R32 + R33)C2 \quad \text{Formula (12)}$$

[Second Embodiment]

FIG. 23 is a diagram illustrating a configuration of an electronic apparatus that uses a stabilizing power supply circuit 1 which uses a semiconductor integrated circuit 10 according to a second embodiment.

A stabilizing power supply circuit 1 that uses a semiconductor integrated circuit 10 according to a second embodiment illustrated in FIG. 23 is different from the stabilizing power supply circuit 1 that uses the semiconductor integrated circuit 10 according to the first embodiment illustrated in FIG. 1, in that the stabilizing power supply circuit 1 that uses the semiconductor integrated circuit 10 according to the second embodiment illustrated in FIG. 23 is a voltage boosting type stabilizing power supply circuit.

First, a first difference is as follows. In order to operate the stabilizing power supply circuit 1 that uses the semiconductor integrated circuit 10 according to the second embodiment illustrated in FIG. 23 as a voltage boosting type stabilizing power supply circuit, a smoothing coil L in which magnetic energy is accumulated during an ON period $T_{ON}$ is connected between an input terminal Vin of the stabilizing power supply circuit 1 and an input terminal of an output control circuit 12. The input terminal of the output control circuit 12 is connected to a drain of an N channel MOS transistor MN1 and an anode of a diode Di, an output terminal of the output control circuit 12 is connected to a cathode of the diode Di, and a source of the N channel MOS transistor MN1 is connected to a ground voltage GND.

A second difference is that in the semiconductor integrated circuit 10 according to the second embodiment illustrated in FIG. 23, when compared with the stabilizing power supply circuit 1 that uses the semiconductor integrated circuit 10 according to the first embodiment illustrated in FIG. 1, the P channel MOS transistor MP1 is replaced with the N channel MOS transistor MN1, and thus a gate of the N channel MOS transistor MN1 is driven by an inverted output signal of an inverting output terminal of a comparator Cmp.

Except for the above-described differences, configurations of an error amplifier 11, the output control circuit 12, a PWM control circuit 13, two voltage dividing resistors R1 and R2, a phase compensation circuit 14, and a detection control circuit 15 that are included in the semiconductor integrated circuit 10 according to the second embodiment illustrated in FIG. 23 are the same as those included in the semiconductor integrated circuit 10 according to the first embodiment illustrated in FIGS. 1 to 22, and thus duplicated description will be omitted.

By the PWM control circuit 13, during an ON period $T_{ON}$ when magnetic energy is accumulated in a smoothing coil L, the N channel MOS transistor MN1 and the diode Di are controlled so as to be in an ON state and an OFF state, respectively, and during an OFF period $T_{OFF}$ when the magnetic energy accumulated in the smoothing coil L is consumed, the N channel MOS transistor MN1 and the diode Di are controlled so as to be in an OFF state and an ON state, respectively.

If an output voltage Vout is decreased by an increase of an output current Iout that flows into a load circuit 3, a fractional voltage Vm1 that is supplied to an inverting input terminal (−) of the error amplifier 11 is also decreased, and an error detection output voltage Vd2 at an output terminal Np2 of the error amplifier 11 is increased. As a result, in the PWM control circuit 13, an ON period $T_{ON}$ when a voltage level of a triangular wave signal of a triangular wave generator TWG that is supplied to a non-inverting input terminal (+) of a comparator Cmp is decreased to a level lower than a voltage level of an error detection output voltage Vd2 of the error amplifier 11 that is supplied to an inverting input terminal (−) of the comparator Cmp, is increased. Thus, as can be seen from the above-described Formula (2), according to the increase of the time of the ON period $T_{ON}$, the output voltage Vout of the stabilizing power supply circuit 1 that is configured as a voltage boosting type switching regulator increases, and the output voltage Vout is maintained substantially constant.

The voltage boosting type stabilizing power supply circuit 1 that uses the semiconductor integrated circuit 10 according to the second embodiment illustrated in FIG. 23 also performs a phase compensation operation according to a temperature change in the same manner as the voltage step-down type stabilizing power supply circuit 1 that uses the semiconductor integrated circuit 10 according to the first embodiment illustrated in FIGS. 1 to 22.

That is, if ambient temperature is high even in the voltage boosting type stabilizing power supply circuit 1 that uses the semiconductor integrated circuit 10 according to the second embodiment illustrated in FIG. 23, the temperature of the semiconductor integrated circuit 10 and the temperature of the smoothing capacitor C that is configured by an aluminum electrolytic capacitor also become higher. At the time of the high temperature, the resistance value of the equivalent series resistance (ESR) of the smoothing capacitor C that is configured by an aluminum electrolytic capacitor in the low pass filter is decreased, and the phase delay of the low pass filter that includes the smoothing coil L and a smoothing capacitor C reaches approximately 180 degrees. Meanwhile, since a phase delay of 180 degrees exists between the inverting input terminal (−) and the output terminal Np2 of the error amplifier 11, there is a danger that a total phase delay of the low pass filter and the error amplifier 11 will reach 360 degrees, and thereby the switching regulator becomes unstable and abnormal oscillation occurs.

In consideration of this danger, even in the voltage boosting type stabilizing power supply circuit 1 that uses the semiconductor integrated circuit 10 according to the second embodiment illustrated in FIG. 23, the detection control circuit 15 detects the high temperature state, controls the phase compensation circuit 14 according to the detected result, and sets the phase compensation circuit 14 so as to have good phase compensation characteristics. By the operation of the phase compensation circuit 14 that is set to good phase compensation characteristics, the phase delay of the error amplifier 11 of the frequency in which a total loop gain of the low pass filter and the error amplifier 11 becomes 0 dB, is controlled so as to be smaller than 180 degrees. As a result, a frequency margin of the frequency in which the total loop gain becomes 0 dB is secured, and thereby it is possible to reduce the danger that causes the unstable operation and the abnormal oscillation of the switching regulator in the high temperature state. The best phase compensation characteristics of the phase compensation circuit 14 are realized by setting the time constant of a compensation resistor R3 and a compensation capacitor VC1, which are connected in series, of the phase compensation circuit 14, to a large value, which is performed by the detection control circuit 15.

If ambient temperature is low even in the voltage boosting type stabilizing power supply circuit 1 that uses the semiconductor integrated circuit 10 according to the second embodiment illustrated in FIG. 23, the temperature of the semiconductor integrated circuit 10 and the temperature of the smoothing capacitor C that is configured by an aluminum electrolytic capacitor also become lower. At the time of the low temperature, the resistance value of the equivalent series resistance (ESR) of the smoothing capacitor C that is configured by an aluminum electrolytic capacitor in the low pass filter becomes significantly larger, the phase delay of the low pass filter that includes the smoothing coil L and a smoothing capacitor C is less than 180 degrees, and thereby a danger of unstable operation and abnormal oscillation is reduced. Meanwhile, due to the increased resistance value of the equivalent series resistance (ESR) of the smoothing capacitor C, the output voltage ripple of the low pass filter that includes the smoothing coil L and the smoothing capacitor C is increased, and there is a danger that the negative feedback control system of the switching regulator may become unstable. In consideration of the danger, even in the voltage boosting type stabilizing power supply circuit 1 that uses the semiconductor integrated circuit 10 according to the second embodiment illustrated in FIG. 23, the detection control circuit 15 detects the low temperature state, controls the phase compensation circuit 14 according to the detected result, and sets the phase compensation circuit 14 so as to have poor phase compensation characteristics. Through the operation of the phase compensation circuit 14 that is set to the poor phase compensation characteristics, the gain and the loop gain of the error amplifier 11 in high frequency components of the output voltage ripple are set so as to have a relatively large value. As a result, through the large loop gain in the high frequency components of the output voltage ripple, a strong negative feedback control is performed in the switching regulator, and thereby it is possible to reduce the danger that the negative feedback control system of the switching regulator will become unstable. The poor phase compensation characteristics of the phase compensation circuit 14 are realized by setting the time constant of a compensation resistor R3 and a compensation capacitor VC1, which are connected in series, of the phase compensation circuit 14, to a small value, by the detection control circuit 15.

If a load circuit 3 requires an operation power supply voltage with a high voltage as the output voltage Vout of the stabilizing power supply circuit 1, the voltage step-down type stabilizing power supply circuit 1 that uses the semiconductor integrated circuit 10 according to the first embodiment illustrated in FIGS. 1 to 22 is not used, but the voltage boosting type stabilizing power supply circuit 1 that uses the semiconductor integrated circuit 10 according to the second embodiment illustrated in FIG. 23 may in particular be used. However, in this case, the smoothing capacitor C of the low pass filter requires a high breakdown voltage so as not to be destroyed by the operation power supply voltage with a high voltage.

If a ceramic capacitor with a small equivalent series resistance (ESR) is used as the smoothing capacitor C of the low pass filter, there is a problem that the ceramic capacitor with a high breakdown voltage has a high cost, and the manufacturing cost for a stabilizing power supply circuit device is particularly increased.

In contrast to this, if an aluminum electrolytic capacitor with a large equivalent series resistance (ESR) is used as the smoothing capacitor C of the low pass filter, the aluminum electrolytic capacitor with a high breakdown voltage is relatively cheap, when compared with the ceramic capacitor with a high breakdown voltage. Thus, the voltage boosting type stabilizing power supply circuit 1 that uses the semiconductor integrated circuit 10 according to the second embodiment illustrated in FIG. 23 and that supplies an operation power supply voltage with a high voltage to the load circuit 3 allows use of a relatively cheap aluminum electrolytic capacitor to use as the smoothing capacitor C with a high breakdown voltage in the low pass filter. As a result, according to the second embodiment illustrated in FIG. 23, it is possible to reduce a manufacturing cost of a voltage boosting type stabilizing power supply circuit device that supplies an operation power supply voltage with a high voltage to the load circuit 3.

[Third Embodiment]

FIG. 24 is a diagram illustrating a configuration of an electronic apparatus that uses a stabilizing power supply circuit 1 which uses a semiconductor integrated circuit 10 according to a third embodiment.

A stabilizing power supply circuit 1 that uses a semiconductor integrated circuit 10 according to a third embodiment illustrated in FIG. 24 is different from the stabilizing power supply circuit 1 that uses the semiconductor integrated circuit 10 according to the first embodiment illustrated in FIG. 1, in that the stabilizing power supply circuit 1 that uses the semiconductor integrated circuit 10 according to the third embodiment illustrated in FIG. 24 is a series regulator type stabilizing power supply circuit.

That is, in order to operate the stabilizing power supply circuit 1 that uses the semiconductor integrated circuit 10 according to the third embodiment of FIG. 24 as a series regulator type stabilizing power supply circuit, the voltage drop of the output control circuit 12 is adjusted by the error amplifier 11 in such a manner that the output voltage Vout is constant even if the input voltage Vin varies, and the variation of the input voltage Vin is absorbed by the voltage drop of the output control circuit 12. Thus, the output control circuit 12 of the semiconductor integrated circuit 10 according to the third embodiment of FIG. 24 does not perform a switching operation in the same manner as in the first embodiment and the second embodiment which are described above, but performs a linear operation by which the voltage drop of the output control circuit 12 is linearly changed.

Thus, in the semiconductor integrated circuit 10 according to the third embodiment of FIG. 24, the PWM control circuit 13 for performing the switching operation of the first embodiment and the second embodiment which are described above is omitted. As a result, in the semiconductor integrated circuit 10 according to the third embodiment of FIG. 24, a control input terminal of a transistor MN1 which is a voltage drop element of an output control circuit 12 is driven directly by an error detection output voltage Vd2 at an output terminal Np2 of an error amplifier 11.

In an example of the semiconductor integrated circuit 10 according to the third embodiment of FIG. 24, the transistor which is the voltage drop element of the output control circuit 12 is configured by an N channel MOS transistor MN1, but can be configured by an NPN bipolar transistor. As another example, if the transistor which is the voltage drop element of the output control circuit 12 is configured by a P channel MOS transistor or a PNP bipolar transistor, a fractional voltage Vm1 of a connection node Np1 of two voltage dividing resistors R1 and R2 is supplied to a non-inverting input terminal (+) of the error amplifier 11, and a reference voltage Vref for error detection is supplied to an inverting input terminal (−) of the error amplifier 11.

If the output voltage Vout decreases according to an increase of an output current Iout that flows into the load circuit 3, the fractional voltage Vm1 that is supplied to the inverting input terminal (−) of the error amplifier 11 also decreases, and the error detection output voltage Vd2 at the output terminal Np2 of the error amplifier 11 increases. As a result, conductivity of the N channel MOS transistor MN1 which is a voltage drop element of the output control circuit 12 is increased and thereby the voltage drop of the voltage drop element is decreased, the output voltage Vout of the stabilizing power supply circuit 1 increases, and the output voltage Vout is maintained substantially constant.

In the series regulator type stabilizing power supply circuit 1 that uses the semiconductor integrated circuit 10 according to the third embodiment illustrated in FIG. 24, a parasitic inductance L' that cannot be disregarded in a power supply wire through which the output voltage Vout of the stabilizing power supply circuit 1 is supplied to the load circuit 3, exists. If a wire length of the power supply wire is lengthened, the inductance of the parasitic inductance L' also increases.

If the smoothing capacitor C with a large capacitance for reducing the output ripple voltage is connected in parallel to the load circuit 3, the low pass filter is configured with the parasitic inductance L' and the smoothing capacitor C. As a result, when a phase delay of the low pass filter reaches approximately 180 degrees, a phase delay of 180 degrees exists between the inverting input terminal (−) and the output terminal Np2 of the error amplifier 11, and thus the total phase delay of the low pass filter and the error amplifier 11 reaches 360 degrees, and there is a danger of instability and abnormal oscillation of a series regulator which performs linear operation. Thus, in consideration of the danger, even in the semiconductor integrated circuit 10 according to the third embodiment illustrated in FIG. 24, the phase compensation circuit 14 is connected to the error amplifier 11.

Furthermore, in the series regulator type stabilizing power supply circuit 1 that uses the semiconductor integrated circuit 10 according to the third embodiment illustrated in FIG. 24, an aluminum electrolytic capacitor of a low cost is used as the smoothing capacitor C for reducing the ripple voltage included in the output voltage Vout that is supplied to the load circuit 3. Even in this case, the resistance value of the equivalent series resistance (ESR) of the smoothing capacitor C that is configured by an aluminum electrolytic capacitor is significantly increased at the low temperature, and there is a danger of instability and abnormal oscillation of the series regulator. In consideration of this, the detection control circuit 15 is also connected to the phase compensation circuit 14 of the semiconductor integrated circuit 10 according to the third embodiment illustrated in FIG. 24. The detection control circuit 15 detects the low temperature state, controls the phase compensation circuit 14 according to the detected result, and sets the phase compensation circuit 14 so as to have poor phase compensation characteristics. By the operation of the phase compensation circuit 14 that is set so as to have poor phase compensation characteristics, the gain and the loop gain of the error amplifier 11 in high frequency components of the output voltage ripple are set to relatively large values. As a result, by the large loop gain in the high frequency components of the output voltage ripple, a strong negative feedback control is performed in the series regulator, and thereby it is possible to reduce the danger that the negative feedback control system of the series regulator will become unstable.

Meanwhile, at the time of high temperature, the resistance value of the equivalent series resistance (ESR) of the smoothing capacitor C that is configured by an aluminum electrolytic capacitor in the low pass filter is decreased, and the phase delay of the low pass filter that includes the parasitic inductance L' and the smoothing capacitor C reaches approximately 180 degrees. Meanwhile, since a phase delay of 180 degrees exists between the inverting input terminal (−) and the output terminal Np2 of the error amplifier 11, a total phase delay of the low pass filter and the error amplifier 11 reaches 360 degrees, the series regulator becomes unstable, and thereby there is a danger of abnormal oscillation. In consideration of the danger, in the stabilizing power supply circuit 1 that uses the semiconductor integrated circuit 10 according to the third embodiment illustrated in FIG. 24, the detection control circuit 15 detects the high temperature, controls the phase compensation circuit 14 according to the detected result, and sets the phase compensation circuit 14 so as to have good phase compensation characteristics. By the operation of the phase compensation circuit 14 that is set to the good phase compensation characteristics, the phase delay of the error amplifier 11 at the frequency in which the total loop gain of the low pass filter and the error amplifier 11 is 0 dB, is controlled so as to be smaller than 180 degrees. As a result, the frequency margin of the frequency in which the total loop gain is 0 dB is secured, and it is possible to reduce the danger of the unstable operation and the abnormal oscillation of the series regulator in a state of high temperature.

Meanwhile, according to the first embodiment to the third embodiment that are described above, if a ceramic capacitor is used for the smoothing capacitor C of the low pass filter, the resistance value of the equivalent series resistance (ESR) of the ceramic capacitor is small, irrespective of being in any one of the states of temperature from a minimum temperature (a state of temperature lower than −25° C.) to a maximum temperature (a state of temperature higher than +25° C.), and thus the detection control circuit 15 controls the phase compensation circuit 14 so as to have good phase compensation characteristics. However, with the good phase compensation characteristics of the phase compensation circuit 14 in any one of the states, particular adverse effects do not occur.

<<Mounting on Vehicle>>

FIG. 25 is a view illustrating a state where the destabilizing power supply 2, the load circuit 3, and the stabilizing power supply circuit 1 using any one of the semiconductor integrated circuits according to the first embodiment to the third embodiment that are described above are mounted on a vehicle 27.

That is, FIG. 25 illustrates that in the inside of an electronic control unit (ECU) 29 that controls an engine 28 which is a power source of a car 27 as a vehicle which moves over the ground, a semiconductor integrated circuit that is called a micro controller which is a load circuit 3 is mounted. Furthermore, in the inside of the electronic control unit (ECU) 29, the above-described destabilizing power supply 2, and the stabilizing power supply circuit 1 that uses one of the semiconductor integrated circuits according to the first embodiment to the third embodiment, are mounted.

That is, the load circuit 3 in the inside of the electronic control unit (ECU) 29 illustrated in FIG. 25 is a micro controller that operates using an output power supply voltage which is supplied from the stabilizing power supply circuit 1, and controls an ignition mechanism, a fuel system, an intake and exhaust system, starting control, or the like. That is, the ignition mechanism controls ignition timing of a plug, and the fuel system controls a fuel injecting apparatus (injection timing, injection quantity, the number of idle rotation), and a fuel pump. The intake and exhaust system controls throttle opening (drive-by-wire), supercharging pressure of a supercharger (turbocharger, supercharger), an exhausting device, and exhaust gas reduction quantity. A valve mechanism controls valve timing, and valve lift quantity, and the starting control controls a cell motor, and an immobilizer.

Particularly, multiple items of input information, such as the number of rotation and temperature of the engine, a gear position, and the throttle opening, are supplied to the micro controller that is the load circuit 3 in the inside of the electronic control unit (ECU) 29 illustrated in FIG. 25, and thus multiple items of engine control information, such as the ignition timing or injection timing, and the injection quantity are generated by the micro controller.

FIG. 26 is a diagram illustrating a configuration of the semiconductor integrated circuit 3 as the micro controller which is the load circuit 3 in the inside of the electronic control unit (ECU) 29 illustrated in FIG. 25.

As illustrated in FIG. 26, a semiconductor chip IC_Chip of the semiconductor integrated circuit 3 includes an analog circuit core 310 and a digital circuit core 320. For example, while an analog power supply voltage AVcc that is set to 5 volts and a relatively high voltage is supplied to the analog circuit core 310 from the stabilizing power supply circuit 1, an analog ground potential AVss is supplied to the analog circuit core 310. Furthermore, for example, while a digital power supply voltage Vcc that is set to approximately 1 volt and a relatively low voltage is supplied to the digital circuit core 320 from the stabilizing power supply circuit 1, a digital ground potential Vss is supplied to the digital circuit core 320.

<<Analog Circuit Core>>

The analog circuit core 310 includes an analog multiplexer (MPX) 311 and a sequential comparison type A/D converter (SAR_ADC) 312. A plurality of analog input signals AN0, AN1, AN2 . . . AN7 that are supplied to the analog multiplexer (MPX) 311 are multiple items of the input information, such as the number of rotation and temperature of the engine, a gear position, and the throttle opening. The plurality of analog input signals AN0, AN1, AN2 . . . AN7 are sequentially selected by the analog multiplexer (MPX) 311, and the selected analog input signal is supplied to an input terminal of the sequential comparison type A/D converter (SAR_ADC) 312 from an output terminal of the analog multiplexer (MPX) 311.

<<Digital Circuit Core>>

The digital circuit core 320 includes a central processing unit (CPU) 321, a random access memory (RAM) 322, a flash non-volatile memory device (NV_Flash) 323, a read only memory (ROM) 324, and a bus switch controller (BSC) 325.

That is, the central processing unit (CPU) 321 is connected to the random access memory (RAM) 322, the flash non-volatile memory device (NV_Flash) 323, the read only memory (ROM) 324, and the bus switch controller (BSC) 325, via a CPU bus CPU_Bus and control lines Cntr_Lines. Meanwhile, the central processing unit (CPU) 321 is connected to a plurality of peripheral circuits Periph_Cir1 and Periph_Cir2, via the CPU bus CPU_Bus, the control line Cntr_Lines, a peripheral bus Periph_Bus, and the bus switch controller (BSC) 325.

Thus, multiple input analog signals that are sequentially selected by the analog multiplexer (MPX) 311 of the analog circuit core 310 are sequentially converted into a plurality of digital signals by the sequential comparison type A/D converter (SAR_ADC) 312. The digital signals that are sequentially converted are stored in the random access memory (RAM) 322 via the peripheral bus Periph_Bus, the bus switch controller (BSC) 325, and the CPU bus CPU_Bus.

According to an ECU control program that is stored in at least one of the flash non-volatile memory device (NV_Flash) 323 and the read only memory (ROM) 324, the central processing unit (CPU) 321 calculates a plurality of items of engine control information such as ignition timing or injection timing, and injection quantity, from the plurality of digital signals that are stored in the random access memory (RAM) 322. The plurality of items of engine control information that are calculated by the central processing unit (CPU) 321 are supplied to the plurality of peripheral circuits Periph_Cir1 and Periph_Cir2, via the CPU bus CPU_Bus, the control line Cntr_Lines, the peripheral bus Periph_Bus, and the bus switch controller (BSC) 325.

Furthermore, the vehicle 27 on which the destabilizing power supply 2, the load circuit 3, and the stabilizing power supply circuit 1 that uses one of the semiconductor integrated circuits according to the first embodiment to the third embodiment that are described above and illustrated in FIG. 25 are mounted, is not limited to only a car that uses the internal combustion engine 28 as a power source.

For example, the vehicle 27 may be configured by an electric car that uses a motor which is driven by electric energy from a battery or a fuel cell, as a power source.

In the electric car, the electronic control unit (ECU) 29 controls an output of the motor by adjusting the electric energy from the battery or the fuel cell, according to the depressed amount of an accelerator pedal. In this control, the torque of the motor is basically proportional to the depressed amount of the accelerator pedal, but furthermore, at a high speed, it is necessary to generate a negative torque (deceleration torque) corresponding to engine breaking. In addition, it is necessary to generate torque in a travel direction when descending in the opposite direction to the travel direction (going down in a backward direction in an uphill climb), and it is necessary to generate torque in a backward direction when descending in a direction of forward travel (descending in the travel direction from an uphill climb). In the inside of the electronic control unit (ECU) 29 that controls the motor 28 of the electric car 27, the destabilizing power supply 2, the load circuit 3, and the stabilizing power supply circuit 1 that uses one of the semiconductor integrated circuits according to the first embodiment to the third embodiment that are described above, can be mounted.

Furthermore, a hybrid car that uses both the engine and the motor as power sources can also be used as the vehicle 27 illustrated in FIG. 25. That is, the load circuit 3 to which an output power supply voltage generated by the stabilizing power supply circuit 1 that uses one of the semiconductor integrated circuits according to the first embodiment to the third embodiment is supplied, includes the electronic control unit (ECU) 29 that controls at least one of the engine and the motor which are the power sources of the vehicle.

As described above, the invention that is created by the present inventor is specifically described based on the various embodiments, but the present invention is not limited thereto, and it is understood that various modifications can be made within a range without departing from gist thereof.

For example, in the voltage boosting type stabilizing power supply circuit 1 that uses the semiconductor integrated circuit 10 according to the second embodiment illustrated in FIG. 23, and the stabilizing power supply circuit 1 that uses the semiconductor integrated circuit 10 according to the third embodiment illustrated in FIG. 24, the detection control circuit 15 can be configured with the temperature measurement circuit 151 and the code generating circuit 152, as illustrated in FIG. 4. In another example, the detection control circuit 15 can be configured with the ripple voltage measurement circuit 153 and the code generating circuit 154, as illustrated in FIG. 8.

Furthermore, the semiconductor integrated circuit 10 according to the second embodiment illustrated in FIG. 23, and the semiconductor integrated circuit 10 according to the third embodiment illustrated in FIG. 24 can be configured by a form of a single semiconductor chip, or a form of a system-in-package (SIP) or a multi-chip module (MCP), in the same manner as the semiconductor integrated circuit 10 according to the first embodiment illustrated in FIG. 1.

Furthermore, in the semiconductor integrated circuit 10 according to the second embodiment illustrated in FIG. 23, and the semiconductor integrated circuit 10 according to the third embodiment illustrated in FIG. 24, the phase compensation circuit 14', the phase compensation characteristics of which are controlled by the detection control circuit 15, can also be connected between the inverting input terminal and the ground voltage GND of the error amplifier 11, in the same manner as the semiconductor integrated circuit 10 according to the first embodiment illustrated in FIG. 18.

In addition, in the phase compensation circuits 14 and 14' that are used for the semiconductor integrated circuit 10 according to the second embodiment illustrated in FIG. 23, and the semiconductor integrated circuit 10 according to the third embodiment illustrated in FIG. 24, the compensation resistor R3 is set as a fixed resistor, and the compensation capacitor C1 can be configured by a variable capacitor VC1 in which the capacitance value is variably controlled by the code signal Cnt1, which is a digital control signal, of the detection control circuit 15, as illustrated in FIG. 1. As another example of the phase compensation circuits 14 and 14', the compensation capacitor C2 is set as a fixed capacitor, and the compensation resistor R4 can be configured by a variable resistor VC4 in which the resistance value is variably controlled by the code signal Cnt1, which is a digital control signal, of the detection control circuit 15, as illustrated in FIG. 8.

The code generating circuit 152 and the code generating circuit 153 that perform the A/D conversion that determines the analog input voltage as four multi-value levels using three reference values in the detection control circuit 15 according to the first embodiment illustrated in FIG. 4 and FIG. 8, are not limited to the flash type A/D converter only, as illustrated in FIG. 5 and FIG. 9.

As the code generating circuit 152 and the code generating circuit 153 that perform the A/D conversion that determines the analog input voltage as four multi-value levels, the sequential comparison type A/D converter or a pipeline type A/D converter can be used.

The sequential comparison type A/D converter is configured with a voltage comparator, a sequential conversion register, and a local D/A converter. Prior to an initial A/D converting operation, a reference value of ½ level is generated by the sequential conversion register and the local D/A converter, and the reference value of ½ level is supplied to a non-inverting input terminal of the voltage comparator. An analog input voltage is supplied to an inverting input terminal of the voltage comparator, an initial A/D converting operation is performed, and one bit of the most significant bit (MSB) is stored in the sequential conversion register by the initial A/D converting operation. If the one bit of the most significant bit (MSB) is a high level "1", the reference value is changed to ¾ level by the sequential conversion register and the local D/A converter, and if the one bit of the most significant bit (MSB) is a low level "0", the reference value is changed to ¼ level by the sequential conversion register and the local D/A converter. Thereafter, the second A/D converting operation is performed, the one bit of the least significant bit (LSB) is stored in the sequential conversion register by the second A/D converting operation, and the A/D conversion of the four multi-value levels is completed.

The pipeline type A/D converter is configured with a plurality of basic circuit blocks, which are connected in series to each other, each including a sample and hold circuit, a local A/D converter, a local D/A converter, a subtractor, and an amplifier. In the basic circuit block of a first stage, an analog input voltage is sampled and held by the sample and hold circuit, and a first A/D conversion is performed by the local A/D converter with respect to an analog output voltage of the sample and hold circuit. A value resulting from the first A/D conversion performed by the local A/D converter is converted into a first analog reference value by the local D/A converter, the first analog reference value is subtracted from the analog output voltage by the subtractor, a subtracted output signal is amplified by the amplifier, and the amplified output signal is supplied to an input terminal of the basic circuit block of a second stage as a residual signal. Furthermore, even in the basic circuit block of the second stage, the same operation as that of the basic circuit block of the first stage described above is performed, and the same operations as those of basic circuit blocks of the third to the final stages are performed. The pipeline type A/D converter includes a plurality of basic circuit blocks that are connected in series to each other, thereby being able to perform the multi-value level A/D conversion of four levels or more, in the same manner as the sequential comparison type A/D converter described above.

What is claimed is:

1. A semiconductor integrated circuit that is used for a stabilizing power supply circuit which supplies an output power supply voltage to a parallel connection of a smoothing capacitor and a load which are connected to an output terminal from an input power supply voltage which is supplied to an input terminal, comprising:
    an error amplifier that detects an error of the output power supply voltage;
    an output control circuit that is connected between the input terminal and the output terminal;
    a phase compensation circuit that is connected to the error amplifier; and
    a detection control circuit that is connected to the phase compensation circuit, wherein
    the output control circuit is controlled by the error amplifier responding to the error of the output power supply voltage, thereby generating the output power supply voltage, and
    the detection control circuit detects temperature variation of the smoothing capacitor and resistance variation of an equivalent series resistance of the smoothing capacitor due to the temperature variation, and variably controls the phase compensation circuit according to the detected result.

2. The semiconductor integrated circuit according to claim 1, wherein
    in a state where the temperature of the smoothing capacitor is lower than a predetermined temperature, the detection control circuit sets a time constant of the phase compensation circuit to a smaller time constant than a predetermined time constant, and
    in a state where the temperature of the smoothing capacitor is higher than the predetermined temperature, the detection control circuit sets the time constant of the phase compensation circuit to another time constant larger than the predetermined time constant.

3. The semiconductor integrated circuit according to claim 2, wherein
    in a state where the temperature of the smoothing capacitor is lower than the predetermined temperature, a pole frequency that is set by phase compensation of the small time constant is set to a higher frequency than a predetermined frequency, and
    in a state where the temperature of the smoothing capacitor is higher than the predetermined temperature, a pole frequency that is set by phase compensation of the large time constant is set to a lower frequency than the predetermined frequency.

4. The semiconductor integrated circuit according to claim 3, wherein
    the detection control circuit detects the temperature variation or the resistance variation of the equivalent series resistance of the smoothing capacitor, in at least four stages, thereby variably controlling phase compensation characteristics of the phase compensation circuit in at least four stages.

5. The semiconductor integrated circuit according to claim 4, wherein
    the detection control circuit performs an A/D conversion that determines an analog input signal having the temperature variation or the resistance variation as at least four multi-value levels, using at least three reference values.

6. The semiconductor integrated circuit according to claim 5, wherein
    the A/D conversion is performed by any one of a flash type A/D converter, a sequential comparison type A/D converter, and a pipeline type A/D converter.

7. The semiconductor integrated circuit according to claim 4, wherein
    the detection control circuit uses a rate of change of a forward voltage drop of a PN junction diode with respect to temperature, thereby detecting variation of the temperature of the smoothing capacitor which is ambient temperature of the stabilizing power supply circuit.

8. The semiconductor integrated circuit according to claim 4, wherein
    the detection control circuit detects variation of a voltage amplitude level of a ripple voltage included in the output power supply voltage, thereby detecting the resistance variation of the equivalent series resistance of the smoothing capacitor due to the temperature variation.

9. The semiconductor integrated circuit according to claim 4, wherein
    a smoothing coil of a low pass filter is connected between the output terminal, and the parallel connection of the smoothing capacitor and the load,
    the output control circuit includes a first switching element that is connected between the input terminal and the output terminal, and a second switching element that is connected between the output terminal and a ground voltage,
    the semiconductor integrated circuit further includes a switching control circuit that controls switching of the first switching element and the second switching element of the output control circuit, according to an error detection output signal of the error amplifier,
    a period in which the first switching element is controlled so as to be in an ON state and the second switching element is controlled so as to be in an OFF state, by the switching control circuit is an ON period in which magnetic energy is accumulated in the smoothing coil of the low pass filter,
    a period in which the first switching element is controlled so as to be in an OFF state and the second switching element is controlled so as to be in an ON state, by the switching control circuit is an OFF period in which the magnetic energy accumulated in the smoothing coil of the low pass filter is consumed, and
    the switching control circuit respectively sets the ON period and the OFF period to a predetermined value according to the error detection output signal of the error amplifier, and thereby the output power supply voltage that is dropped to a voltage lower than the input power supply voltage is generated by the stabilizing power supply circuit.

10. The semiconductor integrated circuit according to claim 4, wherein
one end of a smoothing coil is connected to the input terminal to which the input power supply voltage is supplied, and the other end of the smoothing coil is connected to the output control circuit,
the output control circuit includes a first switching element that is connected between the other end of the smoothing coil and the output terminal, and a second switching element that is connected between the other end of the smoothing coil and a ground voltage,
the semiconductor integrated circuit further includes a switching control circuit that controls switching of the first switching element and the second switching element of the output control circuit, according to an error detection output signal of the error amplifier,
a period in which the second switching element is controlled so as to be in an ON state and the first switching element is controlled so as to be in an OFF state, by the switching control circuit is an ON period in which magnetic energy is accumulated in the smoothing coil,
a period in which the second switching element is controlled so as to be in an OFF state and the first switching element is controlled so as to be in an ON state, by the switching control circuit is an OFF period in which the magnetic energy accumulated in the smoothing coil is consumed, and
the switching control circuit respectively sets the ON period and the OFF period to the predetermined value according to the error detection output signal of the error amplifier, and thereby the output power supply voltage that is boosted to a voltage higher than the input power supply voltage is generated by the stabilizing power supply circuit.

11. The semiconductor integrated circuit according to claim 4, wherein
the output terminal is connected to the parallel connection of the smoothing capacitor and the load, and
the stabilizing power supply circuit operates as a series regulator in which a voltage drop of the output control circuit is adjusted by the error detection output signal of the error amplifier in such a manner that the output power supply voltage is substantially constant even if the input power supply voltage varies, and variation of the input power supply voltage is absorbed by the voltage drop of the output control circuit.

12. The semiconductor integrated circuit according to claim 4, wherein
the phase compensation circuit includes a compensation resistor and a compensation capacitor that are connected in series to at least one of an input terminal and an output terminal of the error amplifier, and
any one of the compensation resistor and the compensation capacitor of the phase compensation circuit is a variable element that is variably controlled by the detection control circuit.

13. The semiconductor integrated circuit according to claim 12, wherein
the variable element comprises one of a variable resistor element and a variable capacitor element that are variably controlled by the detection control circuit.

14. The semiconductor integrated circuit according to claim 13, wherein
the error amplifier, the output control circuit, the switching control circuit, the phase compensation circuit, and the detection control circuit are integrated into a single semiconductor chip of the semiconductor integrated circuit.

15. The semiconductor integrated circuit according to claim 13, wherein
the error amplifier, the output control circuit, the switching control circuit, the phase compensation circuit, and the detection control circuit are formed in a single resin-sealed package of the semiconductor integrated circuit that is configured with one of a system-in-package and a multi-chip module.

16. The semiconductor integrated circuit according to claim 4, wherein
the load includes an electronic control unit that controls any one of an engine and a motor which are power sources of a vehicle.

17. A method of operating a semiconductor integrated circuit that is used for a stabilizing power supply circuit which supplies an output power supply voltage to a parallel connection of a smoothing capacitor and a load which are connected to an output terminal from an input power supply voltage which is supplied to an input terminal, and that includes an error amplifier which detects an error of the output power supply voltage, an output control circuit that is connected between the input terminal and the output terminal, a phase compensation circuit that is connected to the error amplifier, and a detection control circuit that is connected to the phase compensation circuit, the method comprising:
causing the output control circuit to generate the output power supply voltage by being controlled by the error amplifier responding to the error of the output power supply voltage; and
causing the detection control circuit to detect temperature variation the smoothing capacitor and resistance variation of an equivalent series resistance of the smoothing capacitor due to the temperature variation, and to variably control the phase compensation circuit according to the detected result.

18. The method according to claim 17, wherein
in a state where the temperature of the smoothing capacitor is lower than a predetermined temperature, the detection control circuit sets a time constant of the phase compensation circuit to a smaller time constant than a predetermined time constant, and
in a state where the temperature of the smoothing capacitor is higher than the predetermined temperature, the detection control circuit sets the time constant of the phase compensation circuit to another time constant larger than the predetermined time constant.

19. The method according to claim 18, wherein
in a state where the temperature of the smoothing capacitor is lower than the predetermined temperature, a pole frequency that is set by phase compensation of the small time constant is set to a higher frequency than a predetermined frequency, and
in a state where the temperature of the smoothing capacitor is higher than the predetermined temperature, a pole frequency that is set by phase compensation of the large time constant is set to a lower frequency than the predetermined frequency.

20. The method according to claim 19, wherein
the detection control circuit detects the temperature variation or the resistance variation of the equivalent series resistance of the smoothing capacitor, in at least four stages, thereby variably controlling phase compensation characteristics of the phase compensation circuit in at least four stages.

* * * * *